United States Patent [19]

Kageyama et al.

[11] Patent Number: 5,954,436
[45] Date of Patent: Sep. 21, 1999

[54] PRINTING APPARATUS AND DOUBLE-SIDE PRINTING CONTROL METHOD

[75] Inventors: Seiji Kageyama, Yokohama; Chikahiko Nagata, Kanagawa-ken, both of Japan

[73] Assignee: Hitachi, Ltd., Tokyo, Japan

[21] Appl. No.: 08/114,096

[22] Filed: Aug. 31, 1993

Related U.S. Application Data

[63] Continuation-in-part of application No. 08/003,943, Jan. 19, 1993, Pat. No. 5,265,209, which is a continuation of application No. 07/605,280, Oct. 30, 1990, abandoned.

[30] Foreign Application Priority Data

Aug. 31, 1992 [JP] Japan ................................. 4-232295

[51] Int. Cl.$^6$ ....................................................... B41J 3/60
[52] U.S. Cl. ........................ 400/188; 395/102; 395/111; 395/116
[58] Field of Search ............................... 400/188, 61, 76; 395/102, 111, 116, 117, 112, 115

[56] References Cited

FOREIGN PATENT DOCUMENTS

| 383577 | 8/1990 | European Pat. Off. ............... 400/188 |
| 60-5333 | 1/1985 | Japan ................................. 400/188 |
| 261751 | 11/1986 | Japan ................................. 400/188 |
| 62-18115 | 8/1987 | Japan ................................. 400/188 |
| 63-247042 | 10/1988 | Japan ................................. 400/188 |
| 8148 | 1/1990 | Japan ................................. 400/624 |
| 2-63870 | 3/1990 | Japan ................................. 400/188 |
| 153393 | 7/1991 | Japan ................................. 400/624 |
| 211070 | 9/1991 | Japan ................................. 400/188 |
| 1067 | 1/1992 | Japan ................................. 400/188 |
| 7174 | 1/1992 | Japan ................................. 400/188 |

*Primary Examiner*—Eugene Eickholt
*Attorney, Agent, or Firm*—Antonelli, Terry, Stout & Kraus, LLP

[57] ABSTRACT

A printing apparatus executes a series of print commands from a host computer and controls a printer engine equipped with a rotation-type double-side printing mechanism. The printing apparatus comprises page buffers, a drawing-processing unit for drawing data on the page buffers. and a printing-processing unit for processing printing of a drawn data. The printing-processing unit determines whether the drawn data to be printed is first or second-half page is to be performed, and immediately starts printing of first-half if first-half page is determined or puts printing of the second-half page in a wait state if second-half page is determined. The printing-processing unit releases the printing of the second-half page from the wait state when a predetermined condition has been detected. The predetermined condition can be that the number of sheets retained in the printing mechanism has reached a predetermined maximum number or that a final page of a document has been detected by receiving a command indicating the end of a double side printing. The predetermined condition can also be that a change of sheet-sizes, a change of paper supply units or a change of paper-eject units has been detected.

111 Claims, 60 Drawing Sheets

FIG. 6

| COMMAND NAME | COMMAND ARGUMENT | FUNCTION | DATA-ERROR JUDGING CONDITION | INITIAL VALUE |
|---|---|---|---|---|
| SINGLE/DOUBLE-SIDE PRINTING SPECIFICATION | n: SINGLE/DOUBLE-SIDE PRINTING SPECIFYING PARAMETER<br>n: 0, 1 | PRINTING AFTER COMMAND EXECUTION IS PERFORMED IN THE FOLLOWING MODES:<br>{ n = 0: SINGLE-SIDE PRINTING<br>  n = 1: DOUBLE-SIDE PRINTING } | n ≠ 0, 1 | n = 0 |
| PAPER-SIZE SPECIFICATION | n: PAPER-SIZE CODE | ① A PAPER SIZE IS SPECIFIED IN ACCORDANCE WITH THE PAPER-SIZE CODE<br>n = 0: A3   n = 7: LETTER<br>n = 1: A4   n = 8: LEISURE<br>n = 2: A5   n = 9: MINI<br>n = 3: A6   n =10: LEGAL<br>n = 4: B4<br>n = 5: B5<br>n = 6: B6<br>② SPECIFYING A VALUE OF THE PAPER-SIZE CODE NOT SUPPORTED BY THE PRINTER ENGINE GIVES RISE TO A COMMAND-ARGUMENT DATA ERROR. DESCRIPTION OF THE COMMAND-ARGUMENT DATA ERROR IS DISPLAYED ON THE PANEL AND THE HOST COMPUTER IS NOTIFIED OF THE ERROR | n > 10 | n = 1 |
| COPY-COUNT SPECIFICATION | n: THE NUMBER OF COPIES TO BE PRINTED<br>1 ≤ n ≤ 255 | THE NUMBER OF COPIES TO BE PRINTED IS SPECIFIED IN ACCORDANCE WITH n. | n < 1<br>n > 255 | n = 1 |
| PAPER VERTICAL/HORIZONTAL-DIRECTION SPECIFICATION | n: PAPER VERTICAL/ HORIZONTAL DIRECTION<br>n = 0, 1 | THE VERTICAL/HORIZONTAL DIRECTION OF THE PAPER IS SPECIFIED IN ACCORDANCE WITH n.<br>n = 0: VERTICAL DIRECTION<br>n = 0: HORIZONTAL DIRECTION | n ≠ 0, 1 | n = 0 |
| PRINTING-DIRECTION SPECIFICATION | n: PRINTING DIRECTION<br>n = 0, 1 | THE PRINTING DIRECTION IS SPECIFIED IN ACCORDANCE WITH n.<br>{ n = 0: PORTRAIT<br>  n = 0: LANDSCAPE } | n ≠ 0, 1 | n = 0 |

FIG. 7

| COMMAND NAME | COMMAND ARGUMENT | FUNCTION | DATA-ERROR JUDGING CONDITION | INITIAL VALUE |
|---|---|---|---|---|
| PAPER-SUPPLY UNIT SPECIFICATION | n: PAPER-SUPPLY UNIT CODE | ① A PAPER-SUPPLY UNIT IS SPECIFIED IN ACCORDANCE WITH THE PAPER-SUPPLY UNIT CODE n.<br>n = 0: NO PAPER-SUPPLY UNIT SPECIFICATION<br>1: FIRST PAPER-SUPPLY UNIT<br>2: SECOND PAPER-SUPPLY UNIT<br>3: THIRD PAPER-SUPPLY UNIT<br>4: FOURTH PAPER-SUPPLY UNIT<br>5: MANUALLY SUPPLIED<br>② SPECIFYING A VALUE OF THE PAPER-SIZE CODE NOT SUPPORTED BY THE PRINTER ENGINE GIVES RISE TO A COMMAND-ARGUMENT DATA ERROR. DESCRIPTION OF THE COMMAND-ARGUMENT DATA ERROR IS DISPLAYED ON THE PANEL AND THE HOST COMPUTER IS NOTIFIED OF THE ERROR | n < 0<br>n < 5 | n = 1 |
| PAPER-EJECT UNIT SPECIFICATION | n: PAPER-EJECT UNIT CODE | ① A PAPER-EJECT UNIT IS SPECIFIED IN ACCORDANCE WITH THE PAPER-EJECT UNIT CODE n.<br>n = 0: FIRST PAPER-EJECT UNIT<br>n = 1: SECOND PAPER-EJECT UNIT<br>② SPECIFYING A VALUE OF THE PAPER-SIZE CODE NOT SUPPORTED BY THE PRINTER ENGINE GIVES RISE TO A COMMAND-ARGUMENT DATA ERROR. DESCRIPTION OF THE COMMAND-ARGUMENT DATA ERROR IS DISPLAYED ON THE PANEL AND THE HOST COMPUTER IS NOTIFIED OF THE ERROR | n ≠ 0, 1 | n = 0 |
| DOUBLE-SIDE PRINTING TERMINATION SPECIFICATION | NONE | ① THIS COMMAND SPECIFIES THE END OF A COMPOSITION IN THE DOUBLE-SIDE PRINTING MODE<br>② THIS COMMAND IS NOT EFFECTIVE IF ISSUED IN THE SINGLE-SIDE PRINTING MODE | NONE | NONE |

FIG. 8

| COMMAND EXECUTION CASE / COMMAND TYPE | RIGHT-SIDE SPECIFICATION | | | REVERSE-SIDE SPECIFICATION | | |
|---|---|---|---|---|---|---|
| | IS COMMAND EFFECTIVE | COMMAND-EXECUTION SPECIFICATION | DEFAULT COMMAND-EXECUTION SPECIFICATION | IS COMMAND EFFECTIVE | COMMAND-EXECUTION SPECIFICATION | DEFAULT COMMAND-EXECUTION SPECIFICATION |
| PAPER-SUPPLY UNIT SPECIFICATION | EFFECTIVE | EXECUTED ACCORDING TO THE SPECIFICATION | • THE VALUE FOR THE PREVIOUS PAGE IS USED<br>• IF THE CURRENT PAGE IS THE INITIAL PAGE, THE INITIAL VALUE IS USED | EFFECTIVE | • THE CURRENT REVERSE-SIDE PAGE IS SUPPLIED AS A BLANK PAGE<br>• THE CURRENT REVERSE-SIDE PAGE IS THEN PROCESSED AS A RIGHT-SIDE PAGE. A PAPER-SUPPLY UNIT IS SELECTED IN ACCORDANCE WITH THE SPECIFICATION | NOTHING IS DONE AS LONG AS PAPER-SUPPLY UNIT SPECIFICATION IS CONCERNED |
| PAPER-EJECT UNIT SPECIFICATION | EFFECTIVE | EXECUTED ACCORDING TO THE SPECIFICATION | • THE VALUE FOR THE PREVIOUS PAGE IS USED<br>• IF THE CURRENT PAGE IS THE INITIAL PAGE, THE INITIAL VALUE IS USED | EFFECTIVE | • THE CURRENT REVERSE-SIDE PAGE IS SUPPLIED AS A BLANK PAGE<br>• THE CURRENT REVERSE-SIDE PAGE IS THEN PROCESSED AS A RIGHT-SIDE PAGE. A PAPER-EJECT UNIT IS SELECTED IN ACCORDANCE WITH THE SPECIFICATION | NOTHING IS DONE AS LONG AS PAPER-EJECT UNIT SPECIFICATION IS CONCERNED |
| PAPER-SIZE SPECIFICATION | EFFECTIVE | EXECUTED ACCORDING TO THE SPECIFICATION | • THE VALUE FOR THE PREVIOUS PAGE IS USED<br>• IF THE CURRENT PAGE IS THE INITIAL PAGE, THE INITIAL VALUE IS USED | EFFECTIVE | • IF THE SPECIFIED PAPER SIZE MATCHES CORRESPONDING RIGHT-SIDE PAGE, THE PROCESSING IS EXECUTED<br>• IF NOT, THE PAPER IS EJECTED WITH ITS REVERSE-SIDE PAGE LEFT BLANK. THE CURRENT REVERSE-SIDE PAGE IS THEN PROCESSED AS A RIGHT-SIDE PAGE | THE VALUE FOR THE CORRESPONDING RIGHT-SIDE PAGE IS INHERITED |
| COPY-COUNT SPECIFICATION | EFFECTIVE | • EXECUTED ACCORDING TO THE SPECIFICATION<br>• WHEN THE NUMBER OF RIGHT-SIDE PAGES TO BE PRINTED IS SMALLER THAN THE NUMBER OF CORRESPONDING REVERSE-SIDE PAGES TO BE PRINTED, AS MANY RIGHT-SIDE PAGES AS THE DIFFERENCE IN COUNT BETWEEN THE RIGHT-SIDE PAGES AND THE CORRESPONDING REVERSE-SIDE PAGES ARE OUTPUT AS BLANK PAGES | • AS MANY RIGHT-SIDE PAGES AS CORRESPONDING REVERSE-SIDE PAGES ARE PRINTED<br>• WHEN THE NUMBER OF CORRESPONDING REVERSE-SIDE PAGES TO BE PRINTED IS ALSO OMITTED, THE COPY COUNT FOR THE PREVIOUS RIGHT-SIDE PAGE IS INHERITED<br>• IF THE CURRENT PAGE IS THE FIRST ONE, THE INITIAL VALUE IS USED | EFFECTIVE | • EXECUTED ACCORDING TO THE SPECIFICATION<br>• WHEN THE NUMBER OF REVERSE-SIDE PAGES TO BE PRINTED IS SMALLER THAN THE NUMBER OF CORRESPONDING RIGHT-SIDE PAGES TO BE PRINTED, AS MANY REVERSE-SIDE PAGES AS THE DIFFERENCE IN COUNT BETWEEN THE REVERSE-SIDE PAGES AND THE CORRESPONDING RIGHT-SIDE PAGES ARE OUTPUT AS BLANK PAGES | • AS MANY REVERSE-SIDE PAGES AS CORRESPONDING RIGHT-SIDE PAGES ARE PRINTED<br>• WHEN THE NUMBER OF CORRESPONDING RIGHT-SIDE PAGES TO BE PRINTED IS ALSO OMITTED, THE NUMBER OF COPIES TO BE PRINTED FOR THE PREVIOUS REVERSE-SIDE PAGE IS INHERITED |
| PAPER VERTICAL/HORIZONTAL-DIRECTION SPECIFICATION | EFFECTIVE | EXECUTED ACCORDING TO THE SPECIFICATION | • THE VALUE FOR THE PREVIOUS PAGE IS USED<br>• IF THE CURRENT PAGE IS THE FIRST ONE, THE INITIAL VALUE IS USED | EFFECTIVE | • IF THE SPECIFIED DIRECTION MATCHES THE CORRESPONDING RIGHT-SIDE PAGE, THE PROCESSING IS EXECUTED<br>• IF NOT, THE PAPER IS EJECTED WITH ITS REVERSE-SIDE PAGE LEFT BLANK. THE CURRENT REVERSE-SIDE PAGE IS THEN PROCESSED AS A RIGHT-SIDE PAGE | THE VALUE FOR THE PREVIOUS PAGE IS INHERITED |

FIG. 11

| TASK NUMBER | TASK NAME | S: SYSTEM TASK U: USER TASK | PRIORITY | FUNCTION |
|---|---|---|---|---|
| 0 | PARENT TASK | - - | - | |
| 1 | IDLE TASK | S | 10 | TASK FOR PERFORMING PROCESSING IN AN IDLE STATE |
| 2 | MODE SENSE TASK | S | 0 | TASK FOR EXECUTING A MODE SENSE COMMAND |
| 3 | SUSPEND TASK | U | 0 | TASK FOR PUTTING THE PRINTING CONTROL APPARATUS IN A SUSPENDED STATE |
| 4 | ERROR ANALYSIS TASK | U | 0 | TASK FOR DETECTING AND PROCESSING AN ERROR IN THE EVENT OF AN ASYNCHRONOUS ERROR |
| 5 | CANCEL TASK | S | 0 | TASK FOR EXECUTING A CANCEL COMMAND |
| 6 | DRAWING TASK | U | 9 | TASK FOR EXECUTING A PRINT COMMAND |
| 7 | FIRST PRINTING TASK | U | 1 | TASKS FOR PERFORMING PRINTING PROCESSING FOR PAGE BUFFERS FOR WHICH DRAWING PROCESSING HAS BEEN COMPLETED |
| 8 | SECOND PRINTING TASK | | | |
| : | | | | |
| 16 | TENTH PRINTING TASK | | | |
| 17 | SCREEN PRINTING TERMINATION TASK | U | 1 | TASK FOR PERFORMING TERMINATION PROCESSING OF COMPOSITION PRINTING IN SCREEN PRINTING |
| 18 | PRINTING PROTOCOL CONTROL TASK | U | 8 | TASK FOR SWITCHING THE PRINTING PROTOCOL |
| 19 | TASK LOADER | S | 7 | TASK FOR LOADING A TASK |
| 20 | FIRST COMMAND FILE INTERRUPT TASK | U | 8 | TASKS FOR WRITING AND PRESERVING A SERIES OF PRINT COMMANDS FOR PRINT PAGES INTO A FILE |
| 21 | SECOND COMMAND FILE INTERRUPT TASK | | | |
| 22 | COMMAND FILE READ TASK | U | 9 | TASK FOR READING A COMMAND FROM A PRESERVED COMMAND FILE AND STORING IT INTO A COMMAND BUFFER |
| 23 | SWITCH TASK | S | 4 | TASK FOR ACCEPTING PROCESSING REQUESTS ISSUED TO A FILE SYSTEM FROM A TASK AND ASSIGNING THE REQUESTS TO TASKS |
| 24 | FILE RESOURCE MANAGEMENT TASK | S | 3 | TASK FOR MANAGING FILE RESOURCES |
| 25 | LOGICAL DRIVER TASK | S | 2 | TASK FOR CONVERTING LOGICAL ACCESS PARAMETERS INTO PHYSICAL ACCESS PARAMETERS AND THEN ACTIVATING A PHYSICAL DRIVER TASK |
| 26 | PHYSICAL DRIVER TASK | S | 1 | TASK FOR CREATING AN SCSI COMMAND BLOCK AND CONTROLLING AN HD |
| 27 | RECORD ACCESS TASK | S | 5 | TASK FOR READING, WRITING AND DELETING DATA IN RECORD UNITS |
| 28 | SUB-MANAGER TASK | S | 6 | TASK FOR CONTROLLING A NEXT ACCESS WAIT TIME IN THE EVENT OF A REQUEST TO OPEN A FILE WHICH HAS BEEN OPENED |

FIG. 12
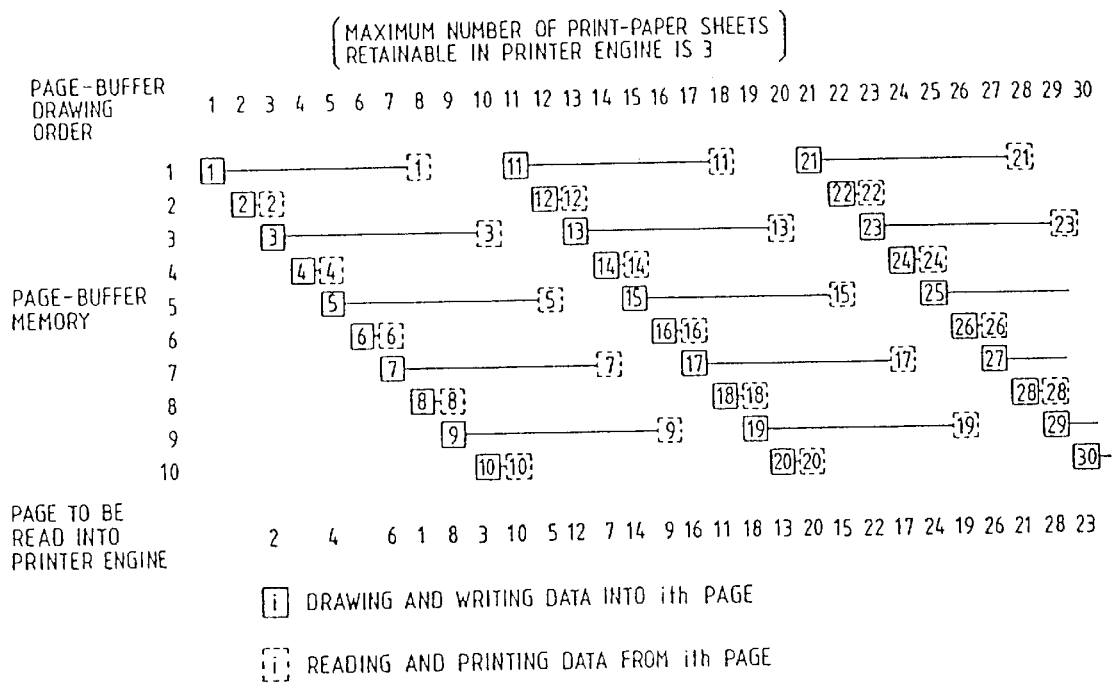
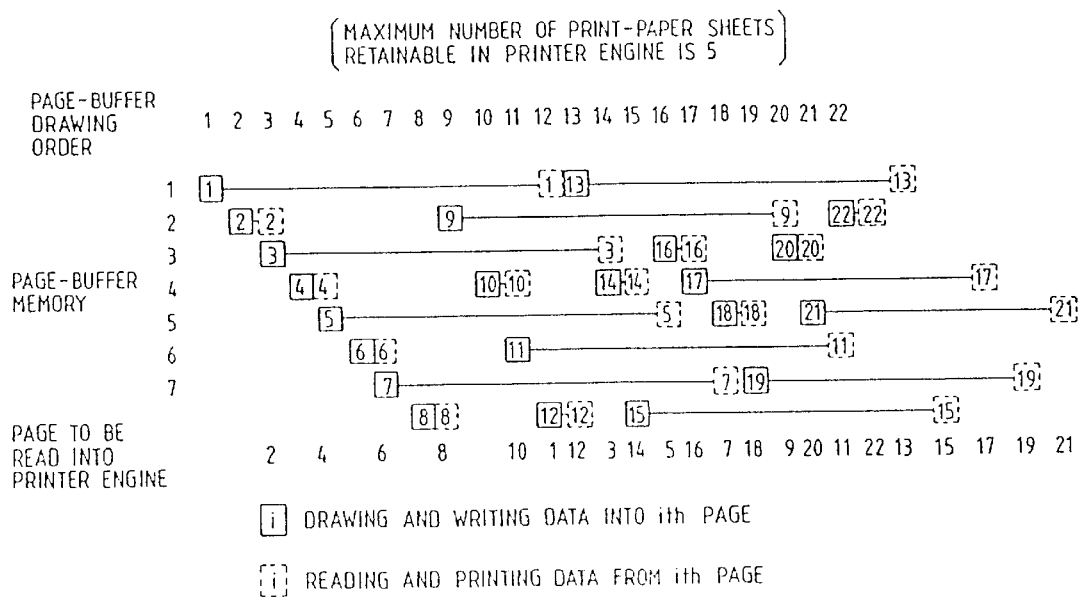

FIG. 14

PAGE-BUFFER CONTROL TABLE 1141

| |
|---|
| NUMBER OF DRAWN PAGE BUFFER |
| NUMBER OF PRINTED PAGE BUFFER |
| NUMBER OF PAGE BUFFER CURRENTLY BEING INPUT-OUTPUT |
| START ADDRESSES OF PAGE BUFFERS 0 TO N-1 |
| ADDRESS OF WORK MEMORY FOR DRAWING TASK |
| PAGE-BUFFER SIZE |
| CURRENT VALUES OF PRINTING CONDITIONS |
| TOTAL NUMBER OF PAGE BUFFERS N |
| COMMAND UNRESOLVE INFORMATION |

⎫
⎬ INFORMATION COMMON TO ALL PAGE BUFFERS
⎭

1500 — TASK RELATED INFORMATION
1400 — PRINTING CONDITIONS
1700 — PRINTER MEMORY CONTROL SET INFORMATION

⎫ INFORMATION FOR PAGE BUFFER 0 ⎭

TASK RELATED INFORMATION
PRINTING CONDITIONS
PRINTER MEMORY CONTROL SET INFORMATION

⎫ INFORMATION FOR PAGE BUFFER 1 ⎭

⋮

TASK RELATED INFORMATION
PRINTING CONDITIONS
PRINTER MEMORY CONTROL SET INFORMATION

⎫ INFORMATION FOR PAGE BUFFER N-1 ⎭

FIG. 15

TASK RELATED INFORMATION — 1500

| |
|---|
| DRAWING/PRINTING CONDITIONS — 1501 |
| NUMBER OF DRAWING TASK CURRENTLY ACCESSING THIS PAGE BUFFER — 1502 |
| NUMBER OF PRINTING TASK CURRENTLY ACCESSING THIS PAGE BUFFER — 1503 |
| FORWARD-LOOKING POINTER TO A TASK WAITING FOR THIS PAGE BUFFER TO BECOME AVAILABLE — 1504 |
| BACKWARD-LOOKING POINTER TO A TASK WAITING FOR THIS PAGE BUFFER TO BECOME AVAILABLE |

FIG. 16

1400 — PRINTING CONDITIONS

| |
|---|
| PAPER-SUPPLY UNIT CODE — 1401 |
| PAPER-EJECT UNIT CODE — 1402 |
| PAPER-SIZE CODE — 1403 |
| PAPER VERTICAL/HORIZONATAL DIRECTION CODE — 1404 |
| SIGLE/DOUBLE-SIDE PRINTING SPECIFICATION CODE — 1405 |
| RIGHT/REVERSE-SIDE PRINTING SPECIFICATION CODE — 1406 |
| PRINT-PAGE SEQUENCE NUMBER — 1407 |
| TOTAL NUMBER OF SHEETS TO BE PRINTED — 1408 |
| NUMBER OF SHEETS ALREADY PRINTED — 1409 |
| TOTAL NUMBER OF BLANK-PRINTING SHEETS TO BE PRODUCED — 1410 |
| NUMBER OF BLANK-PRINTING SHEETS ALREADY PRODUCED — 1411 |
| PRINTING DIRECTION (PORTRAIT/LANDSCAPE) — 1412 |
| DOUBLE-SIDE PRINTING EJECT FLAGS — 1413 |
| DRAWING-ERROR PROCESSING MODE — 1414 |
| CHARACTER EXPANSION MODE — 1415 |

COMMAND UNRESOLVE INFORMATION

| UNRESOLVE FLAG |
| UNRESOLVE COMMAND START ADDRESS |
| UNRESOLVE COMMAND END ADDRESS |

FIG. 22

PRINTING CONDITIONS ~1900

| PAPER-SUPPLY UNIT CODE |
| PAPER-EJECT UNIT CODE |
| PAPER-SIZE CODE |
| PAPER VERTICAL/HORIZONTAL DIRECTION CODE |
| 1901 — THE TOTAL NUMBER OF SHEETS TO BE PRINTED |
| 1902 — THE NUMBER OF SHEETS ALREADY PRINTED |
| 1903 — THE NUMBER OF BLANK-PRINTING SHEETS TO BE PRODUCED |
| 1904 — THE NUMBER OF BLANK-PRINTING SHEETS ALREADY PRODUCED |
| 1905 — THE NUMBER OF PAPER SHEETS RETAINED IN THE PRINTER ENGINE |
| 1906 — RIGHT-SIDE PRINTING POST REQUIRED FLAGS |
| 1907 — RIGHT-SIDE PRINTING POST WAITING TASK NUMBER |
| 1908 — REVERSE-SIDE PRINTING POST REQUIRED FLAGS |
| 1909 — REVERSE-SIDE PRINTING POST WAITING TASK NUMBER |
| 1910 — MULTI-PAGE COPY COMMUNICATION ECB FOR FIRST PRINTING TASK |
| ⋮ |
| 1911 — MULTI-PAGE COPY COMMUNICATION ECB FOR TENTH PRINTING TASK |
| 1912 — DOUBLE-SIDE PRINTING PAPER RUN-OUT ERROR GENERATION FLAG |
| 1913 — RIGHT-SIDE PRINTING ENABLE TASK END WAIT ECB |

(NOTE 1): applies to 1901–1904

NOTE 1: AN AREA IS ALLOCATED FOR EACH PRINTING TASK

FIG. 23

TASK RELATED INFORMATION
— 1940

| NUMBER OF A TASK CURRENTLY USING THE PRINTER |
|---|
| FORWARD-LOOKING POINTER TO A TASK WAITING FOR THE PRINTER TO BECOME AVAILABLE |
| BACKWARD-LOOKING POINTER TO A TASK WAITING FOR THE PRINTER TO BECOME AVAILABLE |

FIG. 24

PAPER-EJECT END MONITORING INFORMATION
— 1950

| SEQUENCE NUMBER OF PAGE MOST RECENTLY EJECTED BY 1st PAPER-EJECT UNIT |
|---|
| SEQUENCE NUMBER OF PAGE MOST RECENTLY EJECTED BY 2nd PAPER-EJECT UNIT |
| ⋮ |
| SEQUENCE NUMBER OF PAGE MOST RECENTLY EJECTED BY 5th PAPER-EJECT UNIT |
| SEQUENCE NUMBER OF PAGE MONITORED BY 1st PAPER-EJECT END MONITORING TIMER |
| PAPER-EJECT UNIT SPECIFIED FOR 1st PAPER-EJECT END MONITORING TIMER |
| SEQUENCE NUMBER OF PAGE MONITORED BY 2nd PAPER-EJECT END MONITORING TIMER |
| PAPER-EJECT UNIT SPECIFIED FOR 2nd PAPER-EJECT END MONITORING TIMER |
| ⋮ |
| SEQUENCE NUMBER OF PAGE MONITORED BY 25th PAPER-EJECT END MONITORING TIMER |
| PAPER-EJECT UNIT SPECIFIED FOR 25th PAPER-EJECT END MONITORING TIMER |

FIG. 25

PAPER-SUPPLY UNIT STATUS AND PAPER-EJECT UNIT STATUS     1933

| BIT<br>BYTE | 7 | 6 | 5 | 4 | 3 | 2 | 1 | 0 |
|---|---|---|---|---|---|---|---|---|
| 1 | PAPER ABSENCE/<br>PRESENCE | PAPER VERTICAL/<br>HORIZONTAL DIRECTION | R | PAPER SIZE OF FIRST PAPER-SUPPLY UNIT | | | | |
| 2 | DITTO | DITTO | R | PAPER SIZE OF SECOND PAPER-SUPPLY UNIT | | | | |
| 3 | DITTO | DITTO | R | PAPER SIZE OF THIRD PAPER-SUPPLY UNIT | | | | |
| 4 | DITTO | DITTO | R | PAPER SIZE OF FOURTH PAPER-SUPPLY UNIT | | | | |
| 5 | DITTO | DITTO | R | PAPER SIZE OF FIFTH PAPER-SUPPLY UNIT | | | | |
| 6 | DITTO | DITTO | R | PAPER SIZE OF SIXTH PAPER-SUPPLY UNIT | | | | |
| 7 | DITTO | DITTO | R | PAPER SIZE OF SEVENTH PAPER-SUPPLY UNIT | | | | |
| 8 | MANUAL PAPER SUPPLY | R | | | | | | |
| 9 | STATUS OF FIRST PAPER-EJECT UNIT | | R | STATUS OF SECOND PAPER-EJECT UNIT | | R | | |
| 10 | STATUS OF THIRD PAPER-EJECT UNIT | | R | STATUS OF FOURTH PAPER-EJECT UNIT | | R | | |
| 11 | STATUS OF FIFTH PAPER-EJECT UNIT | | R | R | | | | |
| 12 | PRESENTLY SELECTED PAPER-SUPPLY UNIT | | | | PRESENTLY SELECTED PAPER SIZE | | | |
| 13 | R | | | | PRESENTLY SELECTED PAPER-EJECT UNIT | | STATUS OF PRESENTLY SELECTED PAPER-EJECT UNIT | |

PAPER-ABSENCE/PRESENCE BIT OF BYTES 1 TO 7: INDICATES THE PAPER ABSENCE/PRESENCE (0/1) FOR
                                            THE PAPER-SUPPLY UNIT
PAPER-VERTICAL/HORIZONTAL-DIRECTION BIT OF BYTES 1 TO 7: INDICATES THE PAPER VERTICAL/
                                                        HORIZONTAL (0/1) DIRECTION FOR
                                                        THE PAPER-SUPPLY UNIT
MANUAL-PAPER-SUPPLY BIT OF BYTE 8 INDICATES CASSETTE/MANUAL (0/1) PAPER SUPPLY
STATUS-OF-PAPER-EJECT-UNIT BITS OF BYTES 9 TO 11: 0 -- THE SPECIFIED TRAY DOES NOT EXIST
                                                  1 -- THE TRAY IS AVAILABLE (NO PAPER ON THE
                                                       TRAY)
                                                  2 -- THE TRAY IS OCCUPIED (THERE ARE AT LEAST
                                                       ONE SHEET OF PAPER ON THE TRAY)
                                                  3 -- THE TRAY IS FULL (AS MANY PIECES OF PAPER
                                                       AS THE PRESCRIBED NUMBER OF ALL ALLOWABLE
                                                       PAPER SHEETS EXIST ON THE TRAY)
PRESENTLY-SELECTED-PAPER-SIZE BITS OF BYTE 12: INDICATES A PAPER-SIZE CODE
PRESENTLY-SELECTED-PAPER-SUPPLY-UNIT BITS OF BYTE 12: INDICATES A PAPER-SUPPLY-UNIT CODE
PRESENTLY-SELECTED-PAPER-EJECT-UNIT BITS OF BYTE 13: INDICATES A PAPER-EJECT-UNIT CODE
PRESENTLY-SELECTED-PAPER-EJECT-UNIT-STATUS BITS OF BYTE 13: THE SAME AS THE STATUS-OF-PAPER-
                                                            EJECT-UNIT BITS OF BYTES 9 TO 11

FIG. 45

| SVC NAME | SVC CODE | INPUTS | OUTPUTS | FUNCTIONS | REMARKS |
|---|---|---|---|---|---|
| PAGE-BUFFER RESERVE | 30 | (1) PAGE-BUFFER NUMBER (2) PAPER SIZE | RETURN CODE<br>0 OR GREATER: THE NUMBER OF THE RESERVED HEAD PAGE BUFFER<br>-1: ABNORMAL | (1) THE NUMBER OF PAGE BUFFERS TO BE RESERVED FOR THE REQUESTED PAPER SIZE IS DETERMINED<br>(2) IF (MAXIMUM PAGE-BUFFER NUMBER-INPUT PAGE-BUFFER NUMBER+1)<THE NUMBER OF REQUIRED PAGE BUFFERS, THE INPUT PAGE-BUFFER NUMBER IS RESET TO ZERO<br>(3) A SERIES OF AS MANY PAGE BUFFERS AS REQUIRED WITH THE INPUT PAGE-BUFFER NUMBER TAKEN AS A BASE POINT ARE CHECKED FOR AVAILABILITY. IF NOT AVAILABLE, THE SEARCH FOR AVAILABILITY IS REPEATED BY INCREMENTING THE BASE POINT BY ONE. THE SEARCH IS THEREAFTER REPEATED UNTIL A SERIES OF AVAILABLE PAGE-BUFFERS ARE FOUND. IF A SERIES OF AVAILABLE PAGE BUFFERS ARE FOUND, THE SVC ISSUING TASK IS CATALOGED AS A USER OF SUCH A RESOURCE. WHEN THE INPUT PAGE-BUFFER SIZE IS GREATER THAN THE A4 SIZE, THE SEARCH FOR A SERIES OF AVAILABLE PAGE BUFFERS IS CARRIED OUT WITH AN EVEN PAGE-BUFFER NUMBER SUCH AS 0, 2, 4 AND SO ON USED AS A BASE POINT. THE EVEN PAGE-BUFFER NUMBER USED AS A SEARCH BASE POINT IS REFERRED TO HEREAFTER AS AN INITIAL BASE POINT. FOR EXAMPLE, AN INPUT PAGE-BUFFER NUMBER OF 3 IS CHANGED TO AN INITIAL BASE POINT OF 4. THE SEARCH FOR A SERIES OF AVAILABLE PAGE BUFFERS IS THEN CARRIED OUT WITH AN INITIAL BASE POINT OF 4 INSTEAD OF 3.<br>(4) IF A SERIES OF AVAILABLE PAGE BUFFERS CAN BE RESERVED, THE DRAWING PAGE-BUFFER NUMBER IN THE PAGE-BUFFER CONTROL TABLE IS UPDATED TO A PAGE-BUFFER NUMBER USED AS A BASE POINT IN THE SEARCH THAT FOUND THE AVAILABLE BUFFERS<br>(5) IF A SERIES OF AS MANY AVAILABLE PAGE BUFFERS AS REQUIRED CANNOT BE RESERVED EVEN IF ALL PAGE BUFFERS HAVE BEEN SEARCHED, AN ENQUEUE MACRO IS ISSUED. THE ENQUEUE MACRRO PUTS THIS SVC ISSUING TASK ON A QUEUE IN A STATE WAITING FOR A SERIES OF AS MANY PAGE BUFFERS AS REQUIRED TO BECOME AVAILABLE. THE FIRST SERIES OF PAGE BUFFERS AMONG THOSE STARTING WITH THE INITIAL BASE POINT, WHICH BECOME AVAILABLE, WILL BE ALLOCATED FOR THE SVC ISSUING TASK | |
| PAGE-BUFFER FREE | 31 | DITTO | RETURN CODE<br>0: NORMAL<br>1: ABNORMAL | (1) THE NUMBER OF PAGE BUFFERS TO BE FREED FOR THE REQUESTED PAPER SIZE IS DETERMINED<br>(2) AS MANY PAGE BUFFERS AS REQUIRED WITH THE INPUT PAGE-BUFFER NUMBER USED AS A BASE POINT ARE MADE AVAILABLE AND ITS RESOURCE USER IS DECATALOGED<br>(3) IF THERE IS A TASK ON A QUEUE IN A STATE WAITING FOR A SERIES OF PAGE BUFFERS THAT CAN BE SATISFIED BY THE FREED PAGE BUFFERS, A DEQUEUE MACRO IS ISSUED FOR THE TASK | |
| PAGE-BUFFER RE-RESERVE | 32 | DITTO | RETURN CODE<br>0 OR GREATER: THE NUMBER OF THE RESERVED HEAD PAGE BUFFER<br>-1: ABNORMAL | (1) THE NUMBER OF PAGE BUFFERS TO BE RE-RESERVED FOR THE REQUESTED PAPER SIZE IS DETERMINED<br>(2) IF (MAXIMUM PAGE-BUFFER NUMBER-INPUT PAGE-BUFFER NUMBER + 1) < THE NUMBER OF REQUIRED PAGE BUFFERS, THE INPUT PAGE-BUFFER NUMBER IS RESET TO ZERO<br>(3) IF THE NUMBER OF PAGE BUFFERS ALREADY ALLOCATED BY A PREVIOUSLY ISSUED PAGE-BUFFER RESERVE SVC IS DIFFERENT FROM THE NUMBER OF PAGE BUFFERS REQUIRED BY THIS PAGE-BUFFER RE-RESERVE SVC, THE SERIES OF PAGE BUFFERS ALLOCATED BY THE PAGE-BUFFER RESERVE SVC ARE MADE AVAILABLE<br>(4) IF THE NUMBER OF THE TASK ISSUING THIS PAGE-BUFFER RE-RESERVE SVC IS DIFFERENT FROM THE NUMBER OF THE TASK ISSUING A PREVIOUS PAGE-BUFFER RESERVE SVC AND USIG THE ALLOCATED PAGE BUFFERS, THE PROCESSING OF THIS SVC IS TERMINATED BY ISSUING A RETURN CODE OF -1<br>(5) THEREAFTER, THE SAME OPERATIONS AS STEPS (3) TO (5) FOR THE PAGE-BUFFER RESERVE SVC ARE EXECUTED | THIS PAGE-BUFFER RE-RESERVE SVC IS ISSUED FOR ALLOCATING PAGE BUFFERS WITH A DIFFERENT PAPER SIZE FROM THAT OF A PAGE-BUFFER RESERVE SVC ISSUED PREVIOUSLY |

FIG. 46

| SVC NAME | SVC CODE | INPUTS | OUTPUTS | FUNCTIONS | REMARKS |
|---|---|---|---|---|---|
| READY-STATUS VERIFY | 60 | NONE | LBP STATUS<br>0: NORMAL<br>1: LBP POWER-OFF<br>2: LBP WARMING UP<br>3: UNDERGOING TEST PRINT<br>4: ABNORMAL | THE POWER-ON AND READY STATUS OF THE LBP ARE VERIFIED THROUGH AN SP (SLAVE PROCESSOR). THEREAFTER, A RESPONSE FROM THE LBP IS EXPECTED | OUTPUT LBP STATUS: LBP WARMING UP AND LBP UNDERGOING TEST PRINT |
| PRINT REQUEST FOR SINGLE-/DOUBLE-SIDE PRINTING | 61 | (1) PRINT REQUEST MODE:<br>0: SINGLE-SIDE PRINTING<br>1: DOUBLE-SIDE RIGHT-SIDE PRINTING<br>2: DOUBLE-SIDE REVERSE-SIDE PRINTING<br>(2) POINTER TO A STRUCTURE | RETURN CODE<br>0: NORMAL<br>1: ABNORMAL | SIX PARAMETERS OF GIVEN WRITE POSITIONS COMPRISING A START ADDRESS, THE NUMBER OF LEFT-MARGIN BITS, A WRITE SKIP LONG WORD, THE NUMBER OF TOP-MARGIN LUSTERS, AN X-DIRECTION DATA LONG WORD AND THE NUMBER OF Y-DIRECTION DATA LUSTERS ARE SET IN PMC (PRINTER MEMORY CONTROLLER) REGISTERS AND THEN A PRINT REQUEST FOR A PRINT REQUEST MODE IS ISSUED THROUGH THE SP | |
| PAPER-SUPPLY UNIT VERIFY | 62 | NONE | POINTER TO A STRUCTURE REPRESENTING A TABLE OF PAPER-SUPPLY UNIT STATUS | (1) A REQUEST FOR VERIFICATION OF THE PAPER-SUPPLY UNIT'S STATUS OF THE LBP IS ISSUED THROUGH THE SP<br>(2) VERIFICATION RESULTS ARE SET IN THE TABLE OF POWER-SUPPLY UNIT STATUS | |
| PAPER-SUPPLY UNIT INSTRUCTIONS | 63 | (1) PAPER-SIZE CODE<br>(2) PAPER-SUPPLY UNIT CODE<br>(3) PAPER VERTICAL-/HORIZONTAL-DIRECTION CODE<br>0: VERTICAL<br>1: HORIZONTAL | RETURN CODE<br>0: NORMAL<br>1: ABNORMAL | THE GIVEN PARAMETERS COMPRISING THE PAPER-SIZE CODE, THE PAPER-SUPPLY UNIT CODE AND THE PAPER VERTICAL/HORIZONTAL-DIRECTION CODE ARE EXAMINED. THE PARAMETERS SUCH AS THE PAPER-SUPPLY UNIT CODE IS CHECKED AGAINST THE TABLE OF PAPER-SUPPLY UNIT STATUS. IF THE SPECIFIED PAPER-SUPPLY UNIT INCLUDES A CASSETTE FOR THE SPECIFIED PAPER SIZE, THE REQUEST IS ISSUED THROUGH THE SP. WHEN SUCH A CASSETTE DOES NOT EXIST OR NO PAPER-SUPPLY UNIT IS SPECIFIED, A PAPER-SUPPLY UNIT IS DETERMINED FROM THE SPECIFIED PAPER SIZE AND THE REQUEST FOR THE PAPER-SUPPLY UNIT IS ISSUED THROUGH TE SP | |

FIG. 47

| SVC NAME | SVC CODE | INPUTS | OUTPUTS | FUNCTIONS | REMARKS |
|---|---|---|---|---|---|
| PRINTER RESERVE | 64 | NONE | NONE | (1) IF THE PRINTER IS AVAILABLE AS EVIDENCED BY A PRINT-COMMAND ENABLE FLAG SET TO A "1", THE PRINTER IS RESERVED. THE TASK ISSUING THIS PRINTER RESERVE SVC IS CATALOGED AS A PRINTER RESOURCE USER. A PRINT-COMMAND ENABLE/DISABLE FLAG IS RESET TO A "0". CONTROL IS RETURNED TO THE TASK ISSUING THIS PRINTER RESERVE SVC (2) IF THE PRINTER IS NOT AVAILABLE, THE TASK ISSUING THIS PRINTER RESERVE SVC IS PUT IN A WAIT STATE | |
| PRINTER FREE | 65 | NONE | NONE | THE PRINTER IS RELEASED. THE PRINT-COMMAND ENABLE/DISABLE FLAG IN THE PRINTER CONTROL TABLE IS SET TO A VALUE FOR THE ENABLED STATUS. THE TASK-NUMBER AREA FOR THE PRINTING TASK USING THE PRINTER IS CLEARED. IF THERE ARE TASKS WAITING FOR THE PRINTER TO BECOME AVAILABLE, A DEQUEUE MACRO IS ISSUED FOR RELEASING A TASK AT THE HEAD OF A QUEUE WAITING FOR THE PRINTER TO BECOME AVAILABLE FROM THE AVAILABLE-PRINTER WAIT STATE | |
| ERROR-CODE VERIFY | 66 | NONE | ERROR CODE<br>-1: NORMAL<br>A VALUES OTHER THAN -1: INDICATES AN ERROR CODE | (1) THE READY STATUS OF THE PRINTER IS VERIFIED. IF THE PRINTER IS READY, AN ERROR CODE OF -1 IS RETURNED TO INDICATE A NORMAL CONDITION (2) IF THE PRINTER IS NOT IN A READY STATE, ITS ERROR CAUSE IS EXAMINED AND AN ERROR CODE IS RETURNED TO INDICATE THE CAUSE OF THE ERROR (3) IF MORE THAN ONE ERROR OCCUR AT THE SAME TIME, A CODE FOR THE ERROR WITH THE HIGHEST PRIORITY IS RETURNED | |
| PRINTER INITIALIZE | 67 | NONE | NONE | (1) A NEGATED START SIGNAL IS ISSUED TO THE SP (2) THE PMC (PRINTER MEMORY CONTROLLER) IS RESET | |
| PAPER-EJECT UNIT VERIFY | 68 | NONE | POINTER TO A STRUCTURE OF A TABLE OF PAPER-EJECT UNIT STATUS | (1) A REQUEST FOR VERIFICATION OF THE PAPER-EJECT UNIT'S STATUS OF THE LBP IS ISSUED THROUGH THE SP (2) VERIFICATION RESULTS ARE SET IN THE TABLE OF PAPER-EJECT UNIT STATUS | |
| PAPER-EJECT UNIT INSTRUCTIONS | 69 | PAPER-EJECT UNIT CODE | RETURN CODE<br>0: NORMAL<br>1: ABNORMAL | THE PAPER-EJECT UNIT CODE IS CHECKED AGAINST THE TABLE OF PAPER-EJECT UNIT STATUS. IF THE SPECIFIED PAPER-EJECT UNIT EXISTS AND IS ENABLED, THE REQUEST IS ISSUED THROUGH THE SP. IF THE SPECIFIED PAPER-EJECT UNIT DOES NOT EXIST OR IT EXISTS BUT CANNOT EJECT PAPER, A RETURN CODE INDICATING AN ABNORMAL CONDITION IS ISSUED | |
| RIGHT-SIDE PRINTING WAIT | 80 | NONE | NONE | A CURRENTLY PRINTING TASK IS PUT IN A RIGHT-SIDE PRINTING WAIT STATE FROM AN EXECUTION WAIT STATE AND CATALOGED IN A RIGHT-SIDE PRINTING WAIT QUEUE. THE RIGHT-SIDE PRINTING WAIT STATE IS ONE OF ENQUEUE STATES. CONTROL IS THEN TRANSFERRED TO THE DISPATCHER | |
| RIGHT-SIDE PRINTING WAIT RELEASE | 81 | RELEASE MODE<br>0: RELEASE ONE TASK<br>1: RELEASE ALL TASKS | NONE | TASKS CATALOGED IN THE RIGHT-SIDE PRINTING WAIT QUEUE ARE REMOVED FROM THE QUEUE AND PUT IN AN EXECUTION WAIT STATE FROM A RIGHT-SIDE PRINTING WAIT STATE. FOR AN INPUT VALUE OF ZERO, ONLY THE TASK AT THE HEAD OF THE RIGHT-SIDE PRINTING WAIT QUEUE IS REMOVED FROM THE QUEUE AND PUT IN AN EXECUTION WAIT STATE FROM A RIGHT-SIDE PRINTING WAIT STATE. IN THE CASE OF AN INPUT VALUE OF UNITY, HOWEVER, ALL TASKS CATALOGED IN THE RIGHT-SIDE PRINTING WAIT QUEUE ARE REMOVED FROM THE QUEUE AND PUT IN AN EXECUTION WAIT STATE FROM A RIGTH-SIDE PRINTING WAIT STATE ONE AFTER ANOTHER STARTING WITH THE TASK AT THE HEAD OF THE QUEUE | |

FIG. 48

| SVC NAME | SVC CODE | INPUTS | OUTPUTS | FUNCTIONS | REMARKS |
|---|---|---|---|---|---|
| FIRST-HALF PRINTING COMPLETE PAPER EJECT | 82 | NONE | RETURN CODE<br>{ 0: NORMAL<br>1: ABNORMAL } | ONE PIECE OF PAPER COMPLETING FIRST-HALF PRINTING IS SUPPLIED FROM THE SECOND PAPER-SUPPLY PATH AND EJECTED TO THE PAPER-EJECT UNIT WITH THE PAGE FOR SECOND-HALF PRINTING LEFT BLANK. THIS REQUEST IS ISSUED THROUGH THE SUB-CPU | |
| PRINTER-STATUS CHANGE | 83 | PRINTER STATUS<br>{ 0: STAND-BY<br>1: NON-STAND-BY<br>2: PAUSE } | RETURN CODE<br>{ 0: NORMAL<br>1: ABNORMAL } | THE STATE OF THE PRINTER ENGINE IS PUT IN THE SPECIFIED PRINTER STATUS | |
| TIMER-COUNT SET | 70 | (1) MEASUREMENT ITEM NUMBER<br>(2) TIMER-COUNT VALUE | NONE | THE SPECIFIED TIMER-COUNT VALUE IS SET AT A LOCATION FOR THE SPECIFIED MEASUREMENT ITEM NUMBER IN THE TIMER MONITOR TABLE AND THE TIMER IS ACTIVATED. IT SHOULD BE NOTED THAT THE UNIT OF THE SPECIFIED TIMER-COUNT VALUE IS 50 ms | |
| TIMER-COUNT SET | 71 | MEASUREMENT ITEM NUMBER | DITTO | THE TIMER MONITOR PROCESSING FOR THE SPECIFIED MEASUREMENT ITEM NUMBER IN THE TIMER MONITOR TABLE IS HALTED | |

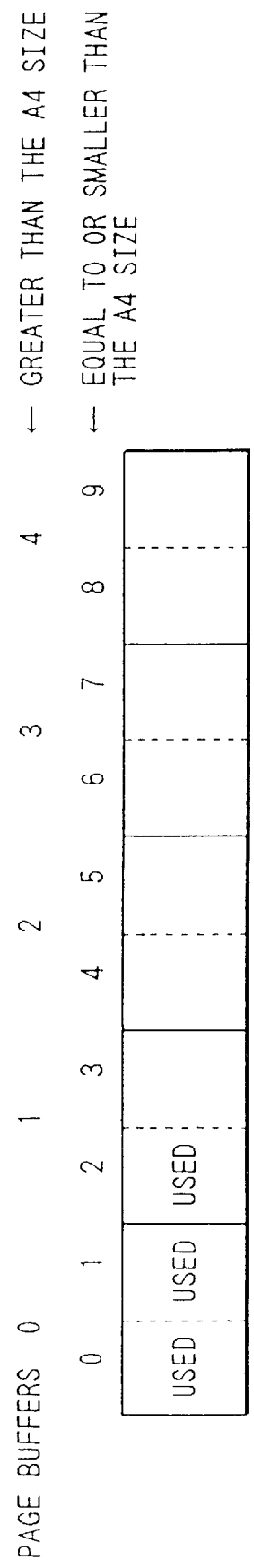

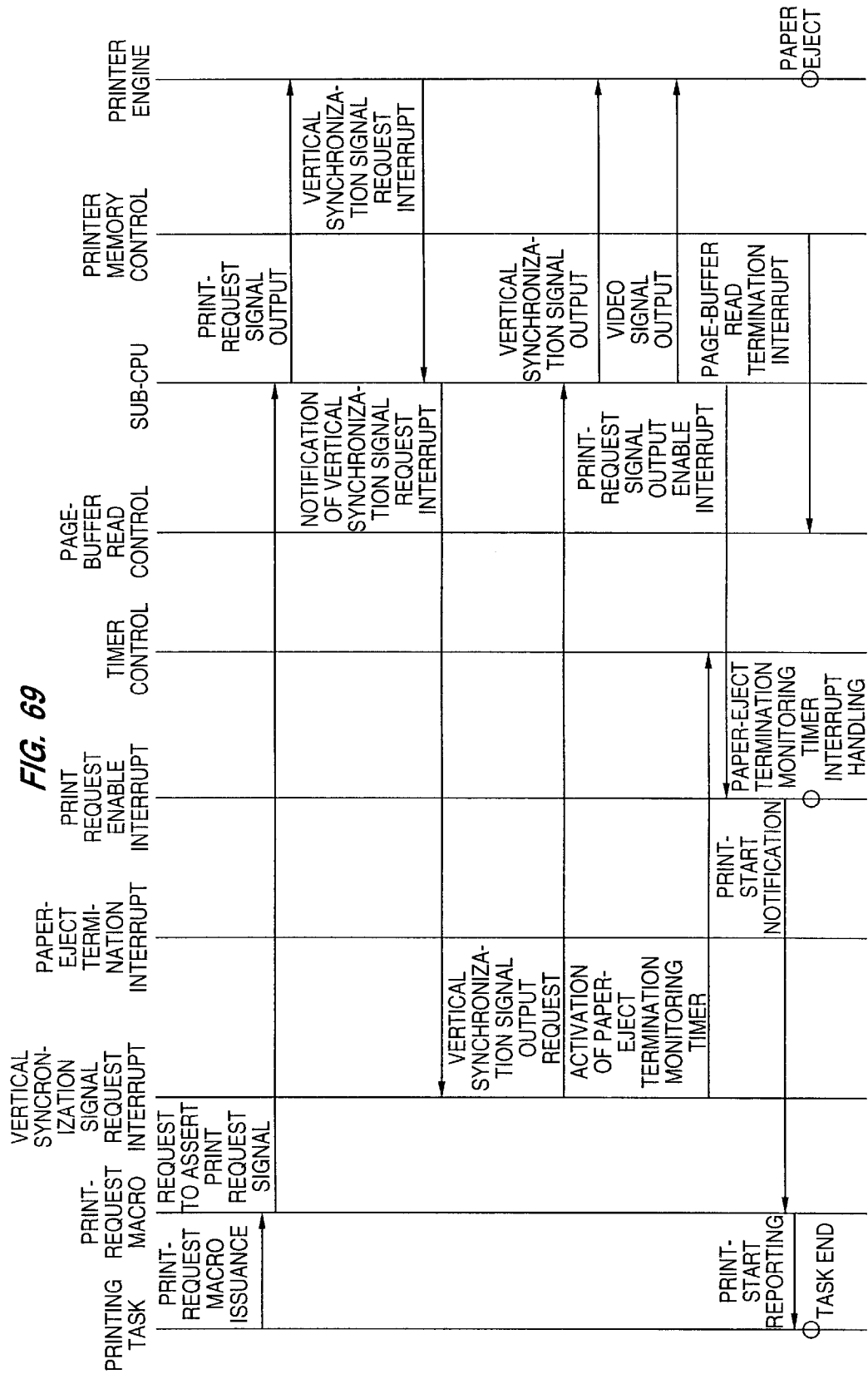

PRINTING APPARATUS AND DOUBLE-SIDE PRINTING CONTROL METHOD

This application is a continuation-in-part of application Ser. No. 08/003,943, filed Jan. 19, 1993, now U.S. Pat. No. 5,265,209 which is a continuation of application Ser. No. 07/605,280, filed Oct. 30, 1990, now abandoned.

BACKGROUND OF THE INVENTION

The present invention relates to a double-side printing apparatus and its control method which are applied to a page printer equipped with a double-side printing mechanism such as a laser printer, an LCD (Liquid Crystal Diode) printer, an LCS (Liquid Crystal Shutter) printer.

In recent years, double-side printing has been coming into wide use. Double-side printing is the printing of data of different pages on the right and reverse-side of a sheet. Japanese Patent Laid-open No. HEI 1-160731, HEI 4-1067 and HEI 4-7174 disclose controllers for page printers with a double-side printing mechanisms. However, In these apparatuses, sizes of a right-side page and a reverse-side page which is printed on a sheet must be the same size. On the other hand, Japanese Patent laid-open No. 2-63870 discloses a printer that prints data of a plurality of pages on each of the right and reverse sides of sheets.

In such apparatuses, printing operation stops or causes an error due to a mixture of different sheets in the printer if the sizes are different between the right-side page and the reverse-side page to be printed on a sheet. That is, the conventional apparatus cannot handle print data that indicate different sizes between the right-side page and the reverse-side page to be printed on a sheet. The print data are also called document data and includes a series of print commands. In other words, an user must always be concerned about the sizes of the pages between the right-side and the reverse-side.

Also, when the printing controller receives the document data of only one document and the document data is ended with only a right or reverse side page, more than one printed pages including the last page are kept in the printer until the printing control apparatus receives the next document data because the last page is not clearly indicated by the document data. That is, a user cannot obtain the complete sheets of the document until the next document data has been received. Also some kinds of printers indicate "printer error" message (such as a paper-jam message) due to their mechanism when a sheet has been kept in the printer for a period of time.

In addition, since the above described conventional technology has been developed not for circulation-type double-side printing mechanisms but intermediate tray-type double-side printing mechanisms, double-side printing control with freedom equal to or higher than the conventional technology cannot be implemented. The following items are not taken into account:

(1) A function that allows changes of a paper size and the number of copies in one document or for each page.

(2) A processing specification and a processing procedure for handling double-side printing in which a paper size, the number of copies, the paper direction (vertical/horizontal), a paper-supply unit and a paper-eject unit and the like is indicated in reverse-side printing, specially for continuing the printing operation without interruption when logical consistency in paper size, the number of copies and paper direction between the right and reverse sides is broken.

(3) A processing procedure on the detection of the following events:

(a) The number of sheets retained in the printer engine reaching a maximum limit.

(b) The end of a document.

(c) A change of paper size.

(d) A change of paper-supply unit or paper-eject unit.

(e) Circulation end of a sheet for first half printing.

In a printer with a circulation-type double-side printing mechanism as shown in FIGS. 3 and 4, first, the reverse (or right) side of a sheet is printed along a paper-supply path 1 and a paper-eject path 2 (first half printing), and second, the right (or reverse) side of the sheet is printed along a paper-supply path 2 and a paper-eject path 1 (second half printing). The "circulation end of the first half printing" is defined as a state in which sheets have been completed the first half printing and circulation within the printer engine, and the next second half printing through the paper-supply path 2 is allowed. (4) A multi-copy processing procedure for a case in which the number of copies is more than two, in particular, for a case in which the number of copies exceeds the maximum number of retained sheets in the printer engine.

SUMMARY OF THE INVENTION

It is a first object of the present invention to provide a printing method for handling printing in case of the paper size and the number of copies are different between right side and reverse side.

It is a second object of the present invention to prevent sheets being kept inadvertently in the printer.

It is a third object of the present invention to provide a double-side printing control method and apparatus having high freedom for use a rotation type double side printing mechanism.

In order to solve the above problems, the present invention provides the following method.

(1) receiving the data which indicates formats of the right side and a reverse side of a sheet (2) drawing right and reverse side images on a memory according to the data (3) printing the right side image on the right side of the sheet according to the right side format indicated by the data (4) detecting whether the formats of the right side and the reverse side are acceptable as double side printing (5) printing the reverse side image on the reverse side on the sheet when the formats are acceptable as double side printing, and on another sheet when the formats are not acceptable as double side printing Also the present invention provides the following printing apparatus comprising:

(1) page buffers for storing the data of a plurality of pages to be printed;

(2) a drawing processing unit for drawing the data on the page buffers in accordance with print commands from a host computer, and requesting to start printing of the pages sequentialy when each page of the data have been drawn on the page buffers (3) means for detecting whether the drawn page is a first half page or a second half page (4) means for starting printing of the data of the first half page if the first half page is detected by said detecting means, or setting a wait state if the second half page is detected (5) means for releasing the wait state to start the second half page when a predetermined condition is detected The predetermined condition may be when the number of sheets which is retained in the printer engine reaches a maximum limit. In this case, the printing task for the second-half printing page is put in the wait state until the number of sheets reaches the maximum limit. Also, the predetermined condition may be when the last page of a document is detected by the drawing processing unit based on reception of a command indicating the end of double-side printing from the host system. In this case, if the last page is detected, tasks in the second-half printing wait state are freed from the second-half printing wait state one after another. More typically, it can be used as the predetermined condition that a change of paper size, paper-supply unit or paper-eject unit is detected. In this case, the drawing processing unit detects whether the change of paper size, paper-supply unit or paper-eject unit is detected in accordance with indication of a paper size, a paper-supply unit or a paper-eject unit in the commands received from the host system, and registers it in a control table. Then, the printing processing unit references the contents of the control table, and releases all printing tasks in the second-half printing wait state to the second-half printing wait state one after another if the change of paper size, paper-supply unit or paper-eject unit is detected, and data of the the released tasks is printed. The printing processing of subsequent pages affected by the change is continued after the data of released tasks has been printed. The above described conditions can be used together.

According to the present invention, the reverse-side page is left blank by activating the printing task for the reverse side and occupying the page buffers. The printing can be continued with the right-side of the modified sheet. In this way, the printing with a difference in paper size between the right and reverse sides of a sheet can be done. Also, residual sheets completing the first-half printing is ejected, and the double-side printing of the document including the first-half can be finished. That is, the double-side printing method provided by the present invention accepts various paper size, any number of copies and changes of vertical/horizontal direction.

BRIEF DESCRIPTION OF THE DRAWINGS

FIG. 6 is a table showing specifications of printing-conditions specifying commands related to a double-side printing method provided by the present invention;

FIG. 7 is a table showing specifications of printing-conditions specifying commands related to a double-side printing method provided by the present invention;

FIG. 8 is a table showing specifications of processing for printing conditions specified for the right and reverse sides of a piece of print paper according to the present invention;

FIG. 11 is a table summarizing tasks of the software provided by the present invention;

FIG. 12 is diagrams each showing a relation between a drawing order and a printing order adopted by the present invention;

FIG. 14 is a diagram showing the configuration of a page-buffer control table provided by the present invention;

FIG. 15 is a diagram showing the configuration of a task related information entry of the page-buffer table provided by a present invention;

FIG. 16 is a diagram showing the configuration of printing conditions entry of the page-buffer table provided by the present invention;

FIG. 22 is a diagram showing the configuration of printing conditions entry of the printer control table provided by the present invention;

FIG. 23 is a diagram showing the configuration of task related information entry of the inter control table provided by the present invention;

FIG. 24 is a diagram showing the configuration of paper-eject end monitoring information entry of the printer control table provided by the present invention;

FIG. 25 is a diagram showing the configuration of paper-supply unit status and paper-eject unit status entry of the printer control table provided by the present invention;

FIG. 45 is an explanatory table showing functions of page-buffer control macros provided by the present invention;

FIG. 46 is an explanatory table showing functions of printer control macros provided by the present invention;

FIG. 47 is an explanatory table showing functions of printer control macros provided by the present invention;

FIG. 48 is an explanatory table showing functions of printer control macros provided by the present invention;

FIG. 49 is a diagram used for explaining a page-buffer reserve function provided by the present invention;

FIG. 69 is a diagram for explaining a processing for supporting a plurality of paper-eject units.

DETAILED DESCRIPTION OF THE PREFERRED EMBODIMENTS

The present invention will become apparent from the following detailed description of preferred embodiments with reference to accompanying diagrams. First of all, the construction of a printing system according to the present invention is shown in FIGS. 1 and 2.

Figure 1:
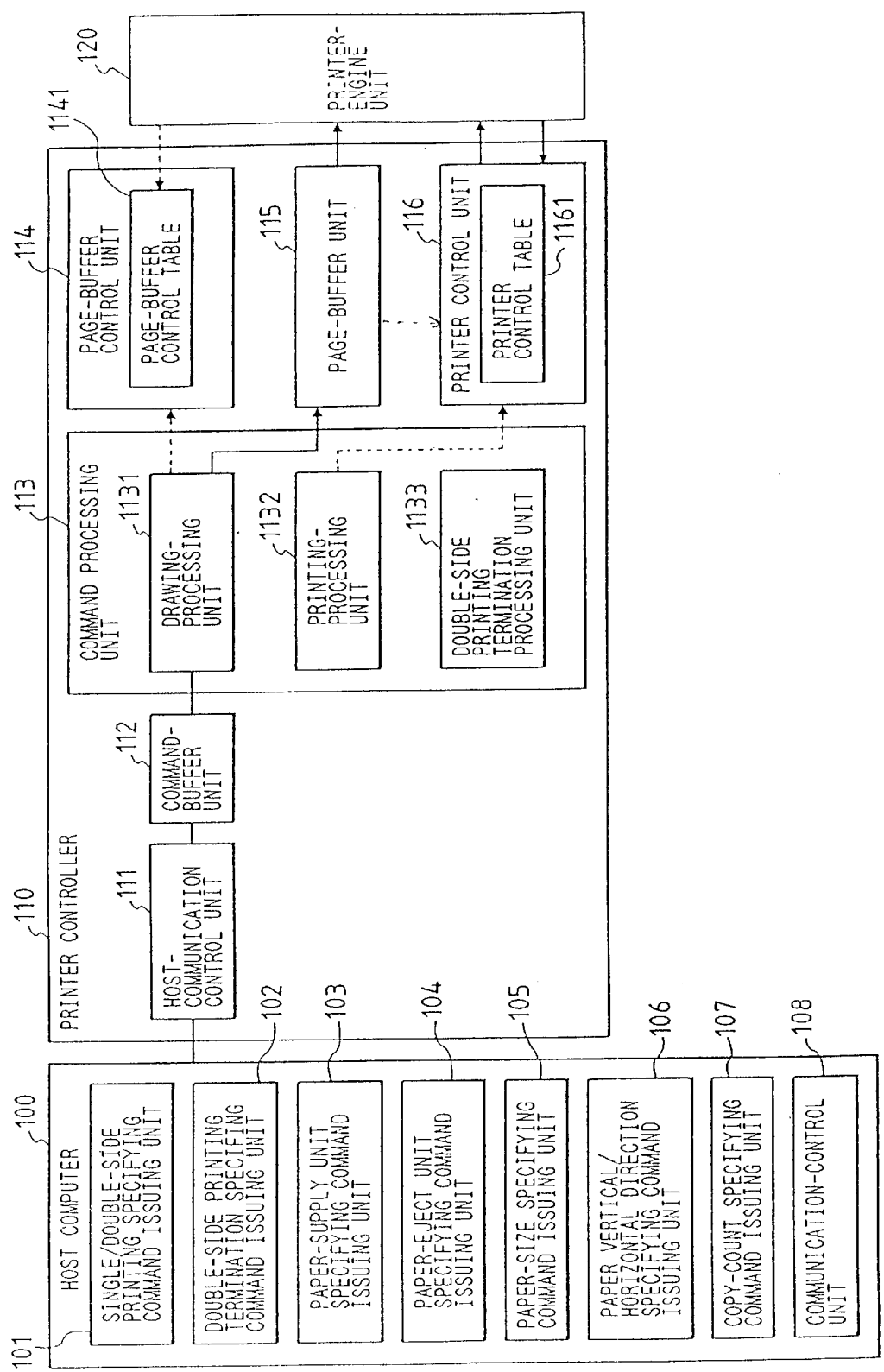
FIG. 1 is a configuration diagram of a printing system provided by the present invention.
Figure 2:
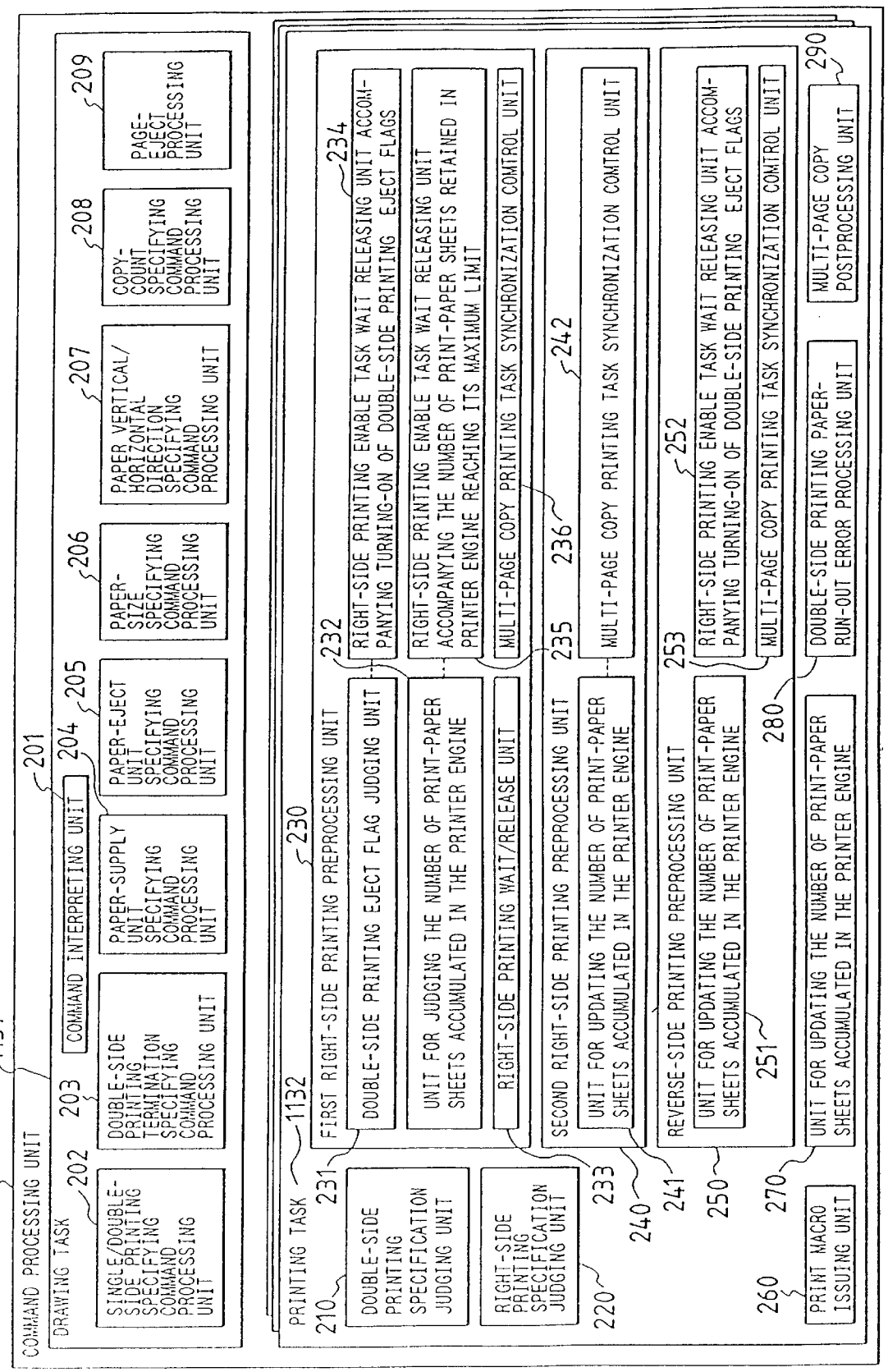
FIG. 2 is a configuration diagram of a command processing unit provided by the present invention.
Figure 3:
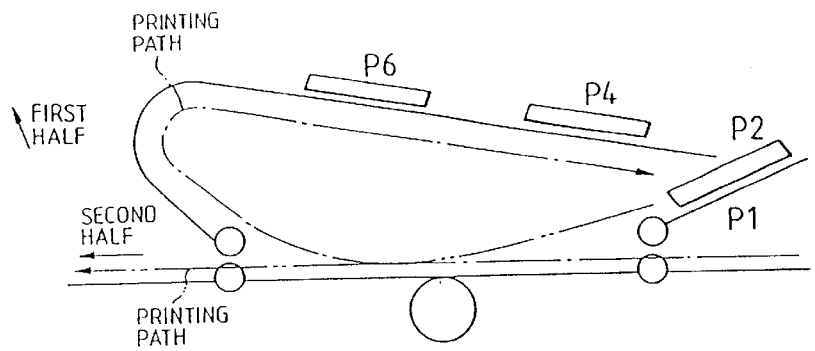
FIG. 3 is an explanatory diagram used for explaining a rotation-type double-side printing mechanism.

As shown in FIG. 1, the printing system comprises a host computer 100, a printer controller 110 and a printer engine unit 120 equipped with a rotation-type double-side printing mechanism. The printer controller 110 comprises a host-communication control unit 111, a command-buffer unit 112, a command processing unit 113, a page-buffer control unit 114, a page-buffer unit 115 and a printer-control unit 116.

The host computer 100 transmits print commands to the host-communication control unit 111, and the received print commands are stored in the command-buffer unit 112. In some cases, a print command is also called simply as a command. The command processing unit 113 processes the command stored in the command-buffer unit 112. Processing results includes characters, pictures and drawing data such as images, and they are stored in the page-buffer unit 115. The printer-control unit 116 reads out the data stored in the page-buffer unit 115, converts it into a signal, a format of which is acceptable to the printer-engine unit 120, and outputs the data to the printer-engine unit 120. The printer-engine unit 120 prints the data on sheets in accordance with the signal by using an electronic photograph mechanism, a wire-dot printing mechanism or the like.

The host computer comprises units 101 to 108. A single/double-side printing specifying command issuing unit 101 issues single/double-side printing specifying commands. A double-side printing termination specifying command issuing unit 102 issues double-side printing termination specifying commands. A paper-supply unit specifying command issuing unit 103 issues paper-supply unit specifying commands. A paper-eject unit specifying command issuing unit 104 issues paper-eject unit specifying commands. A paper-size specifying command issuing unit 105 issues paper-size specifying commands. A paper vertical/horizontal direction specifying command issuing unit 106 issues paper vertical/horizontal direction specifying commands. A copy-count specifying command issuing unit 107 issues copy-count specifying commands. These commands are sent to the printer controller 110 in order to specify a single/double-side printing operation, the termination of a double-side printing operation, a paper-supply unit, a paper-eject unit, a paper size, a paper vertical/horizontal direction, and the number of copies to be printed. A communication-control unit 108 carries out communication with the printer controller 110.

The command processing unit 113 also comprises a drawing-processing unit 1131, a printing-processing unit 1132 and a double-side printing termination processing unit 1133. The page-buffer unit 114 comprises a page-buffer control table unit 1141 The printer-control unit 116 comprises a printer-control table unit 1161. These tables are described in detail later. The command processing unit 113, the page-buffer control unit 114 and the printer-control unit 116 in the printing control apparatus 110 are designed for the double-side printing control of the present invention.

As shown in FIG. 2, the drawing-processing unit 1131 comprises a command interpreting unit 201, a single/double-side printing specifying command processing unit 202, a double-side printing termination specifying command processing unit 203, a paper-supply unit specifying command processing unit 204, a paper-eject unit specifying command processing unit 205, a paper-size specifying command processing unit 206, a paper vertical/horizontal direction specifying command processing unit 207, a copy-count specifying command processing unit 208 and a page-eject processing unit 209. The drawing-processing unit 1131 can be also called a drawing task unit because the drawing is implemented by tasks. Processing procedures of the units 201 to 209 will be described later in detail in FIGS. 26 to 34.

Also as shown in FIG. 2, the printing-processing unit 1132 comprises a double-side printing specification judging unit 210, a right-side printing specification judging unit 220, a reverse-side printing preprocessing unit 250, a first right-side printing preprocessing unit 230, a second right-side printing preprocessing unit 240, a printing macro issuing unit 260, a unit 270 for updating the number of sheets accumulated in the printer engine, a double-side printing paper-run-out error processing unit 280 and a multi-page copy postprocessing unit 290. The printing-processing unit 1132 can be also called a printing task unit because the printing is implemented as tasks. The first right-side printing preprocessing unit 230 comprises a double-side printing eject flag judging unit 231, a unit 232 for judging the number of sheets accumulated in the printer engine, a right-side printing wait/release unit 233, a right-side printing enable task wait releasing unit 234, a right-side printing enable task wait releasing unit 235 and a multi-page copy printing task synchronization control unit 236. The right-side printing enable task wait releasing unit 234 is activated when a double-side printing eject flag is turned on. The right-side printing enable task wait releasing unit 235 is activated when the number of sheets retained in the printer engine 120 reaches to a limit. Also, the reverse-side printing preprocessing unit 250 comprises a unit for judging the number of sheets accumulated in the printer engine, a right-side printing enable task wait re leasing unit 252 and a right-side printing enable task wait releasing unit 253. The right-side enable task wait releasing unit 252 is activated when a double-side printing eject flag is turned on. The right-side printing enable task wait releasing unit 253 is activated when the number of sheets retained in the printer engine 120 reaches to a limit. Processing procedures of these units in the printing task unit 1132 will be described in detail later in FIGS. 36 to 45.

The command processing unit 113 also comprises a double-side printing termination processing unit 1133, which can be also cal led a double-side printing termination task unit because a termination is implemented as a task. The task is performed by the double-side printing termination command processing unit 203, and executes termination processing of double-side printing. A processing procedure of the double-side printing termination processing unit 113 will be described later in detail in FIG. 35.

The present printer controller 110 is designed in order to implement double-side printing control achieving the following two purposes:

(1) The command reception and the drawing processing are carried out in almost same way with the single-side printing control apparatus for preventing program modifications of software used in the existing single-side printing control technique. For this reason, the double-side control is implemented mainly in the printing processing.

(2) It is not necessary that a mechanism for waiting printing of the second-half which is drawn late is in the printer-engine unit 120.

Figure 5:
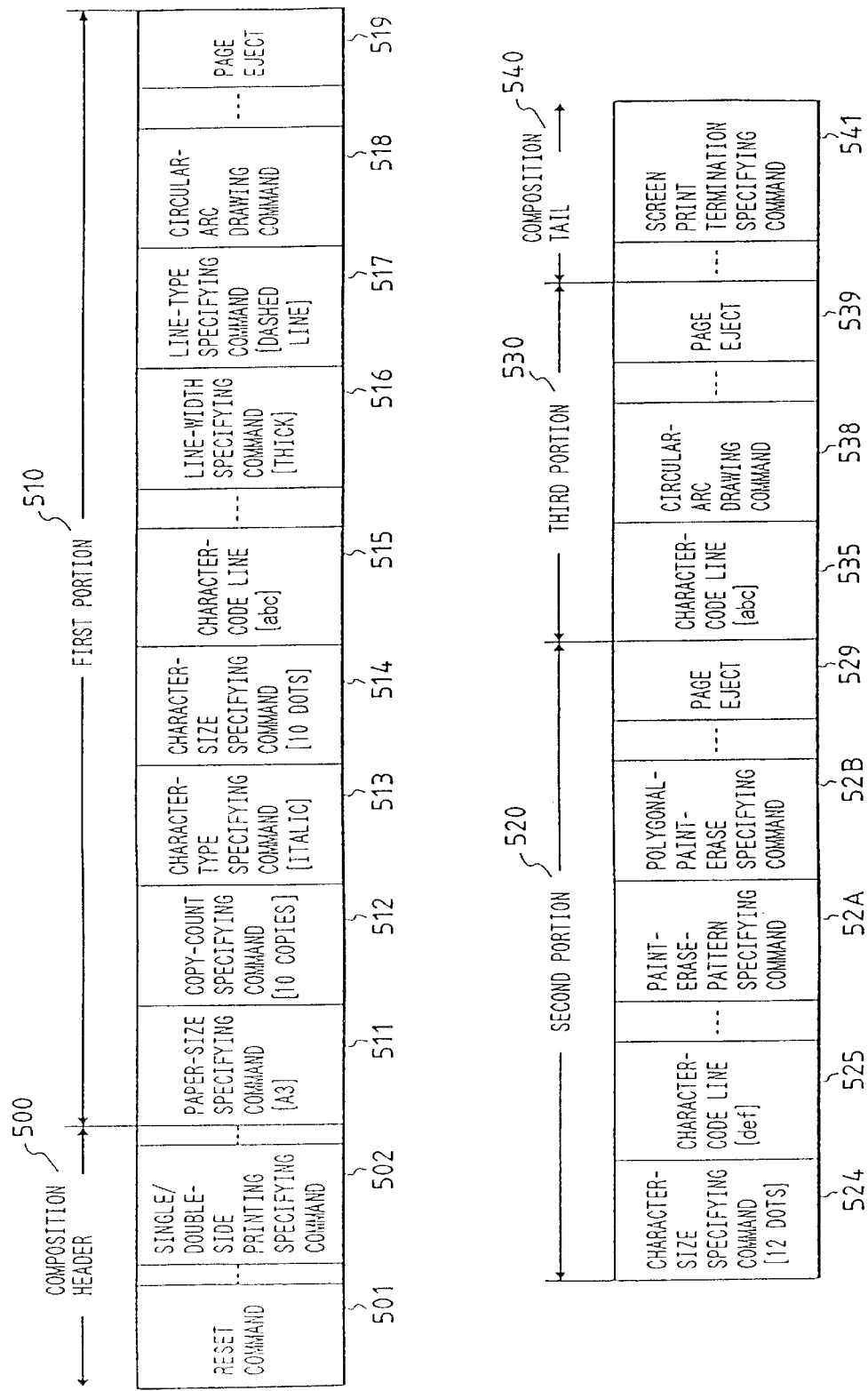
FIG. 5 is an explanatory diagram used for explaining a series of print commands used in the present invention.

A series of print commands transmitted by the host computer 100 to the printer controller 110 are described in FIG. 5. The series of print commands comprises a composition-head portion 500, a first-page portion 510, a second-page portion 520, a third-page portion 530, and a composition-end portion 540. The composition-head portion 500 further comprises a reset command 501 for initializing attribute parameters and a single/double-side printing specifying command for specifying either the single or double-side printing. The first-page portion 510, the second-page portion 520 and the third-page portion 530 comprise set commands 511 to 514, 516, 517, 524 and 52A for setting various parameters specifying drawing and printing data of the first to third pages. These portions also comprises a series of various drawing commands 515, 518, 525, 52B, 535 and 538 and page-eject commands 519, 529 and 539 each for denoting a page limiter. The composition-end portion 540 comprises at least a double-side printing termination specifying command which indicates the end of a composition in the case of double-side printing.

In this embodiment, the set commands of various attribute parameters are described as a paper-size specifying command 511, a copy-count specifying command 512, a character-type specifying command 513, character-size specifying commands 514 and 524, a line-width specifying command 516, a line-type specifying command 517 and a paint-erase-pattern specifying command 52A. However, any attribute parameters related to drawing and printing can also be set by using set commands of various attribute parameters. Also, the drawing commands are described as a series of character codes 515, 525 and 535 for requesting drawing of a series of characters, circular-arc commands 518 and 538 and a polygonal paint erase command 52B. However, drawing of any arbitrary character, graphic and image can also be specified by the drawing command. Also, the page-eject commands 519, 529 and 539 for explicitly denoting page limiters are placed on each page limit. However, the page limiters can also be denoted implicitly. Examples of implicit page limiters include the paper-size specifying command, the page-count specifying command, a printing-direction (portrait/landscape) specifying command and automatic page-eject. The automatic page-eject is a mechanism for the following functions of the printing control apparatus when character drawing is specified on lines beyond the range of one page:

(a) printing one-page data on lines within the range of a page.

(b) printing data exceeding the range of one page on the next page.

FIGS. 6 and 7 shoes specifications of commands specifying a variety of double-side printing conditions. Command names, command parameters, command functions, data-error criteria or criteria for judging parameter specification errors and parameter initial values are shown in the figures. The single/double-side printing specification command, the paper-size specifying command, the page-count specifying command, the paper vertical/horizontal direction specifying command and the printing-direction specifying command are shown in FIG. 6, and the paper-supply specifying command, the paper-eject specifying command, the double-side printing termination specifying command are shown in FIG. 7.

FIG. 8 shows specifications of processings in case that conditions of printing data on the right and re verse side pages of a sheet are specified. That is, specifications for right and reverse side pages for specifying paper-supply unit, paper-eject unit, paper-size, copy-count and paper vertical/horizontal direction. In this embodiment, all the specifications are permitted on both the right and reverse side pages as shown in the FIG. 8. However, if a specification of the reverse side page and a specification of the right side page contradict each other, particular processing will be done. An example is ejecting a sheet with blank on the reverse side page and printing data for the reverse-side page on the right side page of the next sheet.

Figure 9:
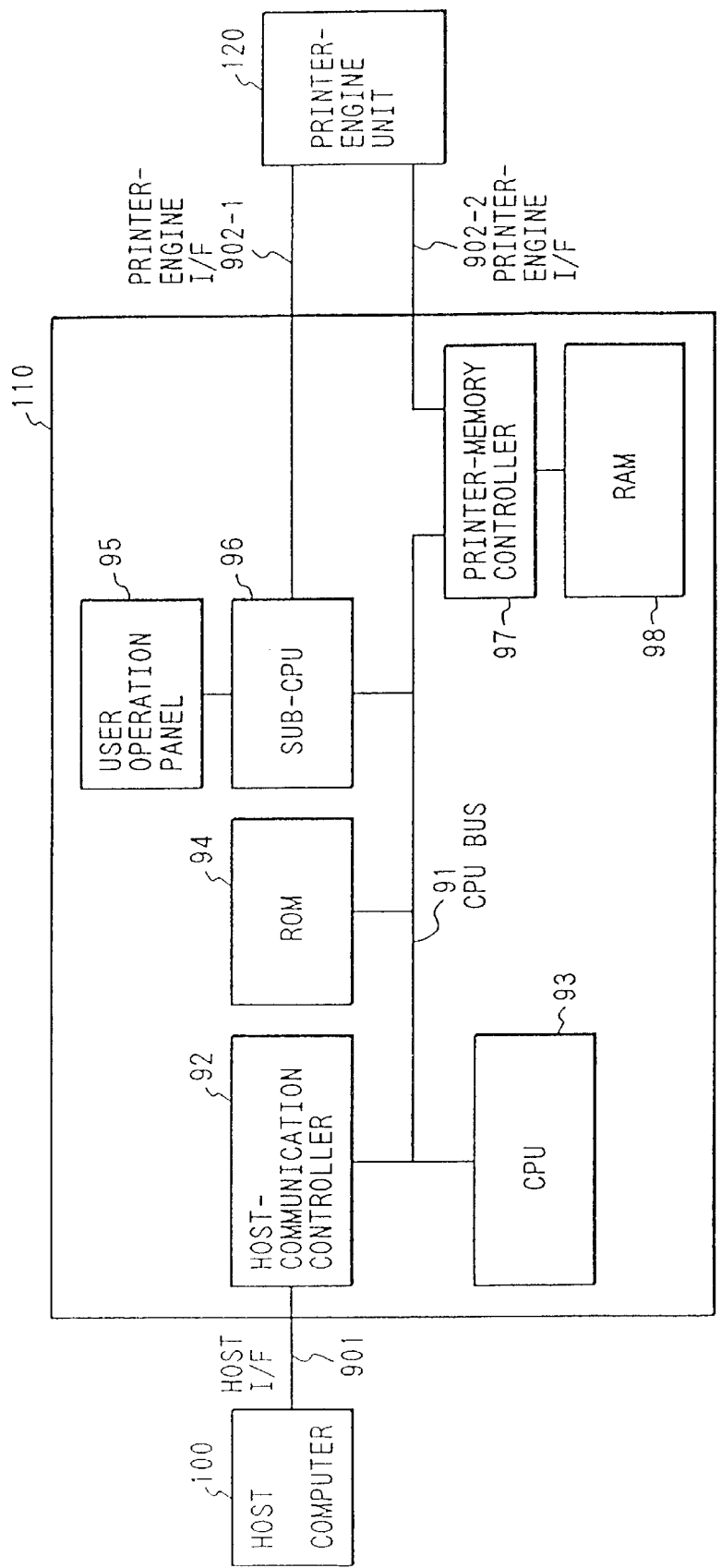
FIG. 9 is a diagram showing the configuration of hardware provided by the present invention.

FIG. 9 shows a hardware construction of the printer controller 110. The printer controller 110 comprises a CPU bus 91, a host-communication controller 92, a CPU 93, a ROM unit 94, a user operation panel 95, a sub-CPU 96, a printer memory controller 97 and a RAM unit 98. The CPU bus 91 further comprises a variety of input/output signals of the CPU 93 including an address signal, a data signal and control signals.

The CPU 93 controls input/output operations with peripheral controllers including the host-communication controller 92, the sub-CPU 96 and the printer memory controller 97, and with memory units including the ROM unit 94 and the RAM unit 98 through the CPU bus 91.

The host-communication controller 92 controls communication between the host computer 100 and the printer controller 110 in accordance with an I/F protocol called a host I/F. The SCSI (Small Computer System Interface), RS232, RS422, GP-IB (General Purpose Interface Bus), Centronics, HDLC (High-Level Data Link Control) and Ethernet can be used as a physical I/F of this communication (the host I/F). Hardware logic of the host-communication controller 92 is designed in accordance with the type of the physical I/F.

The ROM unit 94 stores an IPL (Initial Program Loading) program of the printer controller 110 and some character fonts. The RAM unit 98 includes (a) an area for storing a control program of the printing control apparatus, (b) an area for storing character fonts not stored in the ROM unit 94, (c) a command buffer, (d) a page buffer, (e) a variety of tables including a page-buffer control table, a printer control table and a task control table. The above items (a) and (b) are down-loaded from the host computer 100 by the IPL program. The items (a) and (b) can also be stored in the ROM unit 94 instead of the RAM unit 98. As an alternative, all items can be stored in the RAM unit 98, and no character font is stored in the ROM unit 94.

The sub-CPU 96 controls input/output processing with with the user operation panel 95 and the printer-engine unit 120 in accordance with indication of the CPU 93.

The printer memory controller 97 reads out data stored in the RAM unit 98 (normally the contents of the page buffers) and outputs them to the printer-engine unit 120. In the case of a RAM unit 98 made of DRAM the printer memory controller 97 also controls the DRAM unit 98 (refresh operations for example). An embedded DMA (Direct Memory Access) facility is used for the read-out operation. After one page of data have been read out from the page buffer, the printer memory controller 97 asserts an interrupt signal (one of the signals of the CPU bus 91), and the CPU 93 starts interrupt processing for ending the read out operation.

The printer controller 110 communicates with the printer-engine unit 120 through a signal line 902-1 by using the sub-CPU 96, and through a printer line 902-2 by using the printer memory controller 97 in accordance with an I/F protocol called the printer-engine I/F.

In the case of a shuttle printer used as the printer-engine unit 120, the printer memory controller 97 converts the format of the contents in the page buffers and outputs them to the printer-engine unit 120 through the signal line 902-2. In this case, the the signal line 902-1 is used for receiving a signal indicating a page-head position from the printer-engine unit 120. In the case of a laser printer used as the printer-engine unit 120, the printer memory controller 97 converts the contents of the page buffers from parallel to serial, and outputs them to the printer-engine unit 120 through the signal line 902-2. In this case, the signal line 902-1 is used by the sub-CPU 96 for transmitting a command indicating an instruction and an inquiry to the printer-engine unit 120 including a command for receiving a response status from the printer-engine unit 120, a status transmission/reception signal and a control signal for controlling a procedure of read-out from the page buffers to the printer-engine unit 120.

Figure 10:
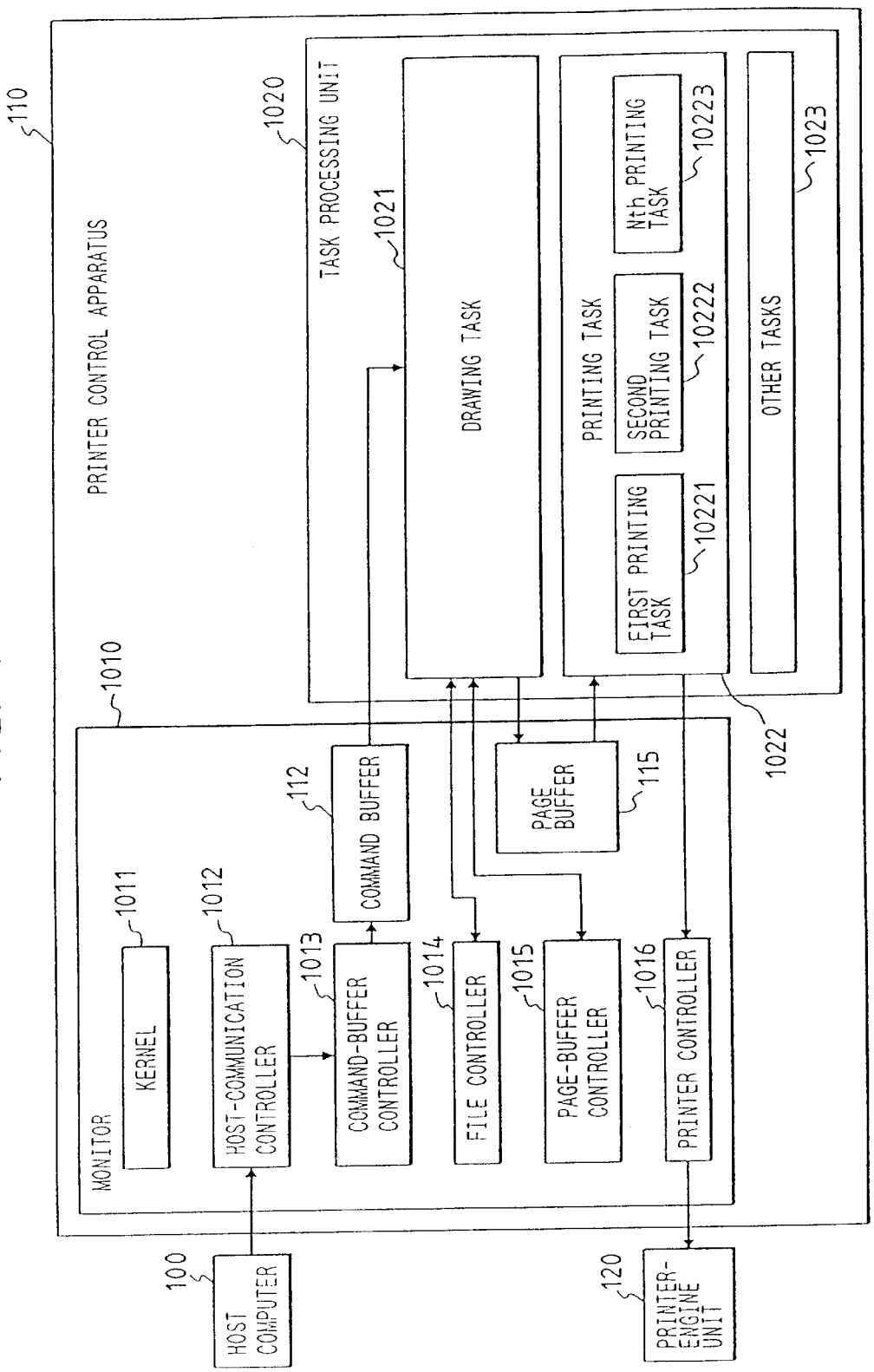
FIG. 10 is a diagram showing the organization of software provided by the present invention.

FIG. 10 shows software executed by the printing control apparatus 110. The software comprises a monitor 1010 and a task processing unit 1020.

The monitor 1010 further comprises a kernel 1011, a host-communication controller 1012, a command-buffer controller 1013, a file controller 1014, a page-buffer controller 1015, a printer controller 1016, a command buffer unit 112 and a page-buffer unit 115. The kernel 1011 comprises a main routine of an interrupt control program, a main routine of a supervisor-call (SVC) controller, a task controller and a timer controller. The host-communication controller 1012 exchanges various commands between the host computer 100 and the printer controller 110. For example, the host-communication controller 1012 receives a series of print commands from the host computer 100 and reports various events occurring in the printer controller 110 to the host computer 100. The various events include an error, termination of printing for a page and termination of printing for a document. The command-buffer controller 1013 controls pointers including a write-start pointer, a write-end pointer and a read pointer, which are used for operations of writing and reading in command buffer 112. The host-communication controller 1012 controls the command-buffer controller 1013 to store a print command into the command buffer 112. Also, a drawing task 1021 of the task processing unit 1020 controls the command-buffer controller 1013 to read a command from the command buffer 112, and the drawing task 1021 process the command as described later. The file controller 1014 controls files stored in a secondary storage device of the print controller 110. That is, the file controller 1014 controls accesses to data stored in each file, and manages substance of a file which is organization of a plurality of blocks. Each task in the task processing unit 1020 manipulates files by using a variety of SVC functions for file control available in the file controller 1014. The double-side printing control can be carried out even if the file controller 1014 is not available. The file controller 1014 enhances the performance and use of the system. The page-buffer controller 1015 manages available spaces in the page-buffer unit 115. That is, the page-buffer controller 1015 obtains and releases spaces in the page-buffer unit 115. The page-buffer controller 1015 obtains necessary space required by the paper size when it become necessary to draw in the page-buffer unit 115, and releases the obtained space after an read-out operation has completed. The printer controller 1016 manages available spaces in the printer-engine unit 120 and printer-engine adapters (the sub-CPU 96 and the printer memory controller 97), and controls input/output operations of the printer-engine unit 120.

The task processing unit 1020 comprises the drawing task 1021, a printing task unit 1022 and another task processor 1023. Tasks implemented in the printing control apparatus 110 are listed in a table shown in FIG. 11. The table includes task numbers, task names, task classifications of system (S) and user (U), functions of tasks and priorities of tasks. As shown in FIG. 10, the printing task unit 1022 further comprises a first printing task 10221, a second printing task 10222, and an Nth printing task 10223. Each of the printing tasks 10221 to 10223 is activated by the drawing task 1021 when the drawing task 1021 has completed an drawing operation in the page-buffer unit 115. The activated printing tasks 10221 to 10223 each execute printing processing of each page buffer(storing data of one page) in the page-buffer unit 115 for which the drawing processing has been completed. The printing processing is executed by issuing a variety of SVC instructions to the printer controller 1016. A plurality of printing tasks 10221 to 10223 are required for executing concurrent processing on different buffer pages. The number of printing tasks is the maximum which can be executed with the concurrent processing. In this embodiment, the printing tasks for sheets that can exist in the printer-engine unit 120 (from the paper-supply unit to the paper-eject unit) are provided. The number of printing tasks varies depending on the specification of the printer-engine unit 120.

The processing carried out by each unit in the software is the same as those disclosed earlier by Japanese Patent Laid-open No. HEI 2-70465 and Japanese Patent Laid-open No. HEI 3-178466 (U.S. patent application Ser. No. 07/605, 280) except that the present invention is extended to double-side printing control. That is, a plurality of tasks shown in FIG. 11 are executed by the concurrent processing which allows the enhanced printing throughput. The command-buffer unit 112 and the page-buffer unit 115 can be memory belonging to neither the monitor 1010 nor the task processing unit 1020.

The elements of the software shown in FIG. 10 are associated with elements of the hardware shown in FIG. 9 as follows.

(1) The program of the monitor 1010 (except the command-buffer unit 112 and the page-buffer unit 115) is stored in the ROM unit 94 and the RAM unit 98 for the CPU 93 to be executed by the CPU 93.

(2) The command-buffer unit 112 and the page-buffer unit 115 are located in the RAM unit 98.

(3) The tasks of the task processing unit 1020 (the drawing task 1021, the first printing task 10221, the second printing task 10222, and the Nth printing task 10223) and the program of the task processor 1023 are stored in the ROM unit 94 or the RAM unit 98 to be executed by the CPU 93.

The elements of FIGS. 1 and 2 correspond to the elements of the software shown in FIG. 10 as follows.

(1) The host-communication control unit 111 of FIG. 1 corresponds to the host-communication controller 1012 of FIG. 10.

(2) The command-buffer unit 112 and the page-buffer unit 115 of FIG. 1 correspond to the command-buffer unit 112 and the page-buffer unit 11 of FIG. 10 respectively.

(3) The command processing unit 113 of FIG. 1 corresponds to the task related to the command processing in the task processing unit 1020 of FIG. 10.

(4) The drawing-processing unit (drawing task unit) 1131 of FIGS. 1 and 2 corresponds to the drawing task 1021 of FIG. 10.

(5) The printing-processing unit (printing task unit) 1132 of FIGS. 1 and 2 corresponds to the printing task 1022 of FIG. 10.

(6) The double-side printing termination processing unit 1133 of FIG. 1 corresponds to the other task processor 1023 of FIG. 10.

FIG. 12 shows relations between a drawing order and a printing order for executing the drawing and printing tasks by the concurrent processing of double-side printing of FIG. 12. The drawing task sequentially carries out drawing on page buffers in accordance with the drawing order shown in FIG. 12. The printing tasks also read out the page buffer for which the drawing has been completed in accordance with the order of. FIG. 12. The upper diagram of FIG. 12 shows a case in which the number of page buffers is 10 and the maximum number of sheets retainable in the printer engine is 3. The lower diagram shows a case in which the number of page buffers is 8 and the maximum number of sheets retainable in the printer engine is 5. The drawing and printing orders are set in the same way for any case with a different page-buffer count and a different retainable-sheet count. In the following description, it is assumed that the first-half printing is printed on the reverse side of a sheet (even-numbered page) and the second-half printing is printed on the right side of the sheet(odd-numbered page). A reversed case can also be implemented as well.

In the examples shown in FIG. 12, first of all, print data is drawn into page buffers sequentially one after another starting with the first page. Then, the odd-numbered pages (right sides) including the first, third and fifth pages are put in a printing wait state, and the even-numbered pages (reverse sides) including the second, fourth and sixth pages, are printed sequentialy. In the upper example shown in FIG. 12, the number of sheets retained in the printer engine reaches 3 when the second, fourth and sixth pages have been printed on three sheets, then the first page is printed on the a right side of a first sheet (a right side of the second page) and the first sheet is ejected. Since an empty place is available for another sheet at that time, the eighth page is printed, and the number of sheets retained in the printer engine back to 3 again. At this time, the third page is printed on the a right side of a second sheet (a right side of the fourth page), the second sheet is ejected. Thereafter, the printing continues with the tenth page, the fifth page, the twelfth page and so on. As a rule, at the end of a printing process for an odd-numbered page, the sheet is ejected.

In the case of the lower example of FIG. 12, since the maximum number of sheets retainable in the printer engine is 5, the read-out to the printer engine is done sequentialy for five pages including the second page, the fourth page, the sixth page, the eighth page and the tenth page. At that time, since the number of sheets retainable in the printer engine reaches 5 (the maximum limit), the first page is printed on right side of the first sheet. After the printing process of the first page has done, A sheet for the next even-numbered page(the twelfth page) is put into an empty place in the printer engine caused by ejecting the first sheet. Thereafter, printing continues with the thirteenth page, the fourteenth page, the fifth page, the sixteenth page and so on.

Figure 13A:
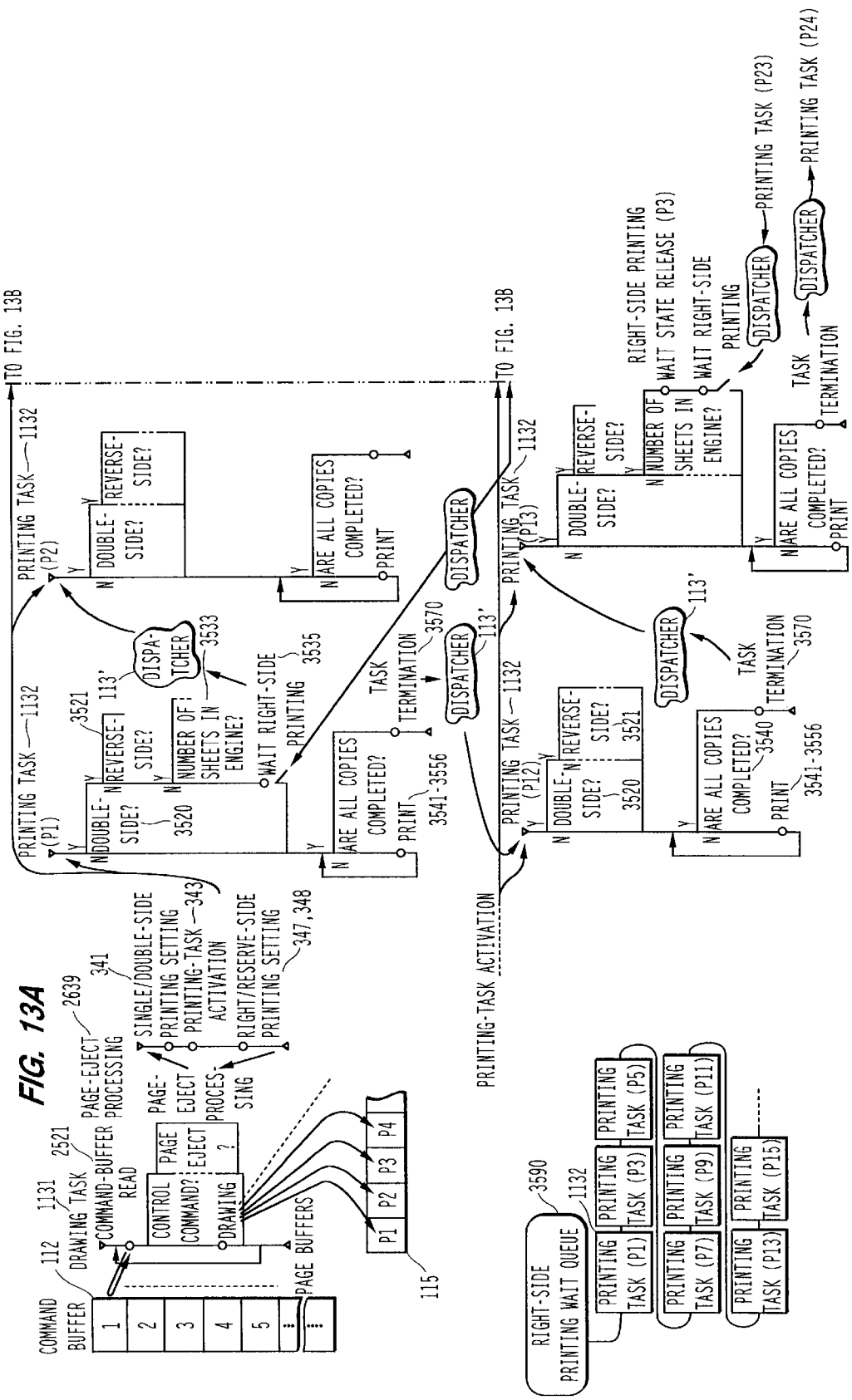
FIG. 13 is a diagram showing the principle of operation of a drawing task and printing tasks for double-side printing provided by the present invention.
Figure 13B:
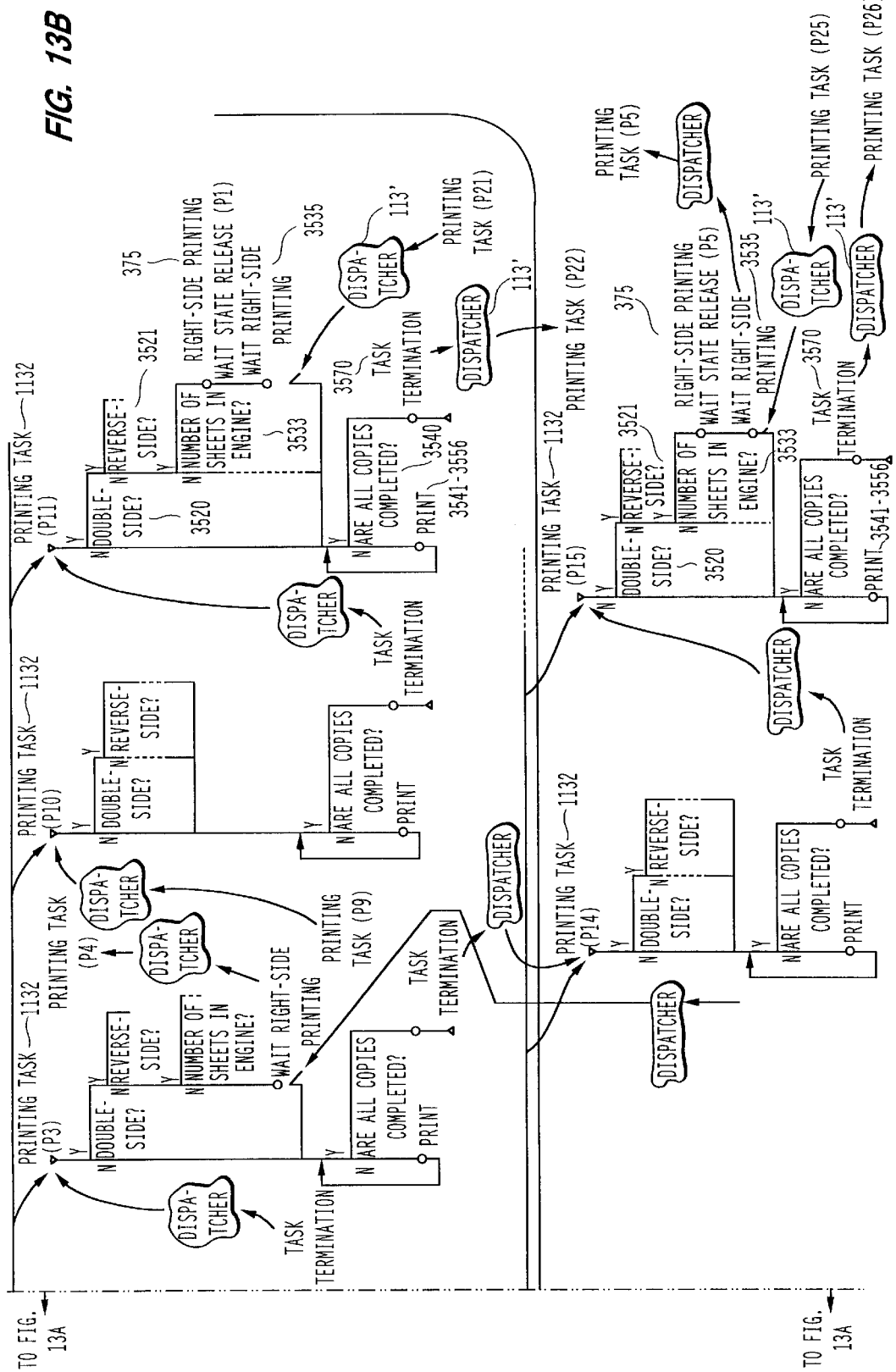

FIG. 13. shows an operation of the concurrent processing by the drawing task and the printing task in double-side printing. P1, P2, etc. are sequence numbers of pages. The figure shows an operation procedure for a case in which the number of copies to be printed is 1 and the maximum number of sheets retainable in the printer engine is 5 for example. The operation procedure is described as follows:

(1) The drawing task 1131 reads out a series of print commands one after another from the command-buffer 112, and draws images on the page-buffer unit 115 according to the read commands. After each part of the page buffer 115 has been drawn, the drawing task 1131 sets indication of right or reverse on the page-buffer control table unit 1141 and activates the print task 1132 which corresponds to the drawn part of the page buffer 115. A plurality of activated printing tasks 1132 are connected to an execution wait queue at that time and assigned sequentially to the CPU for execution by the dispatcher 113'. The drawing task 1131 and the printing tasks 1132 are shown in the figure to appear as if they were executed concurrently. In actuality, however, a printing task 1132 does not require much CPU processing time, the drawing task 1131 is executed during available time indicated by "print" in the figure.

(2) Printing tasks 1132 for the right-side pages (P1, P3, P5 and so on) are each put on a right-side printing wait queue 3590 by issuing right-side printing a wait macro to be described later until the number of sheets retained in the printer engine reaches to the maximum number (one of conditions for switching the printing between the reverse-side printing and to the right-side printing). In the processing of the right-side printing wait macro, the task dispatcher is invoked to pass execution control to the printing task for the reverse-side page after the task issuing the macro has been put in a waiting state for the right-side printing.

(3) A right-side printing wait release macro and the right-side printing wait macro are issued when the maximum number of the retained sheets in the printer engine has been detected. The maximum number of sheets retainable in the printer engine is is one of conditions for switching the printing from the reverse-side printing to the right-side printing. The right-side printing wait release macro releases sequentialy a print task at the head of the right-side printing wait queue. The right-side printing wait macro puts another print task on the right-side printing wait queue as described above.

(4) The printing tasks 1132 for the reverse-side pages (P2, P4, P6 and so on) read out each drawn contents of the page buffer 112 associated with the reverse-side pages for printing.

(5) Repeating the above steps, the printing tasks for the right-side pages (P1, P3, P5, -and P9) are put on the right-side printing wait queue, and the printing tasks for the reverse-side pages (P2, P4, P6, -and P10) carry out printing on reverse-side pages. The number of sheets held in the printer engine reaches the maximum limit at the end of the processing of the printing task 1132 for the page P10. At that time, the right-side printing wait release macro and the right-side printing wait macro are issued. The right-side printing wait release macro releases the print task 1132 for the page P1 at the head of the right-side printing wait queue.

(6) As the printing of the page P1 is completed, the first sheet is ejected, allowing the printing task 1132 for the page P12 to start a printing process while the printing task 1132 for the page P13 is still on the right-side printing wait queue. Thereafter, much like the printing task for the page P1, a right-side printing wait release macro releases the print task 1132 for the page P3 which is now at the head of the right-side printing wait queue, allowing the printing for the page P3 to be commenced. In this way, the double-side printing is continued to the second sheet.

(7) Other events that can be detected as such a condition include the end of a document, a change of paper size, a change of paper-supply unit, a change of paper-eject unit and running-out of sheets for first-half printing as well as the maximum number of sheets retainable in the printer engine.

The drawing and printing tasks carry out the concurrent processing shown in FIGS. 26 to 45 according to tables shown in FIGS. 14 to 25. FIGS. 14 to 18 show a variety of page-buffer control tables. FIGS. 19 to 25 show a variety of printer control tables.

First, the contents of the page-buffer control table unit 1141 are shown in FIGS. 14 to 18. The page-buffer control table unit 1141 is used for preventing an idle time of the page-buffer unit 115 and preventing an incorrect order of access from the tasks to the page-buffer unit 115, during the writing of the page buffer unit 115 by the drawing task and reading of the page buffer unit 115 by the printing task.

FIG. 14 shows an overall structure of the page-buffer control table unit 1141. The page-buffer control table unit 1141 contains common information for all page buffers and individual information for each page buffers. The common information comprises the number of the page buffer to be written next by the the drawing task(the next drawing page-buffer number), the number of the page buffer to be read out next by the printing task(the next printing page-buffer number), the number of the page buffer which is currently in a print-out process, the start addresses of the page buffers 0, 1, -and N-1, the address of work memory for drawing, a page-buffer size, current values of printing-condition, the total number of page buffers N and command unresolve information. The current values of the printing-condition are default values for setting printing conditions for page buffers by the drawing task. The individual information for each page buffers includes task related information 1500, printing conditions 1400 and printer memory control set information 1700. The details of these pieces of information are shown in FIGS. 15 to 17. The details of the command unresolve information are shown in FIG. 18.

FIG. 15 shows the task related information 1500 for describing states of drawing and printing of the page. The task related information 1500 comprises the number of a drawing task currently accessing the associated page buffer 1501, the number of a printing task currently accessing the associated page buffer 1502, a forward-looking pointer to a task waiting for the associated page buffer to become available 1503 and backward-looking pointer to a task waiting for the associated page buffer to become available 1504.

FIG. 16 shows the printing conditions 1400. The printing conditions 1400 comprise a paper-supply unit code 1401, a paper-eject unit code 1402, a paper-size code 1403, a paper vertical/horizontal direction code 1404, a single/double-side printing specification code 1405, a right/reverse-side printing specification code 1406, a print page sequence number 1407, the total number of sheets to be printed 1408, the number of sheets already printed 1409, the total number of blank-printing sheets to be produced 1410, the number of blank-printing sheets already produced 1411, a printing direction (portrait/landscape) 1412, a double-side printing eject flags 1413, a drawing-error processing mode 1414 and a character expansion mode 1415.

Figures 17, 18:
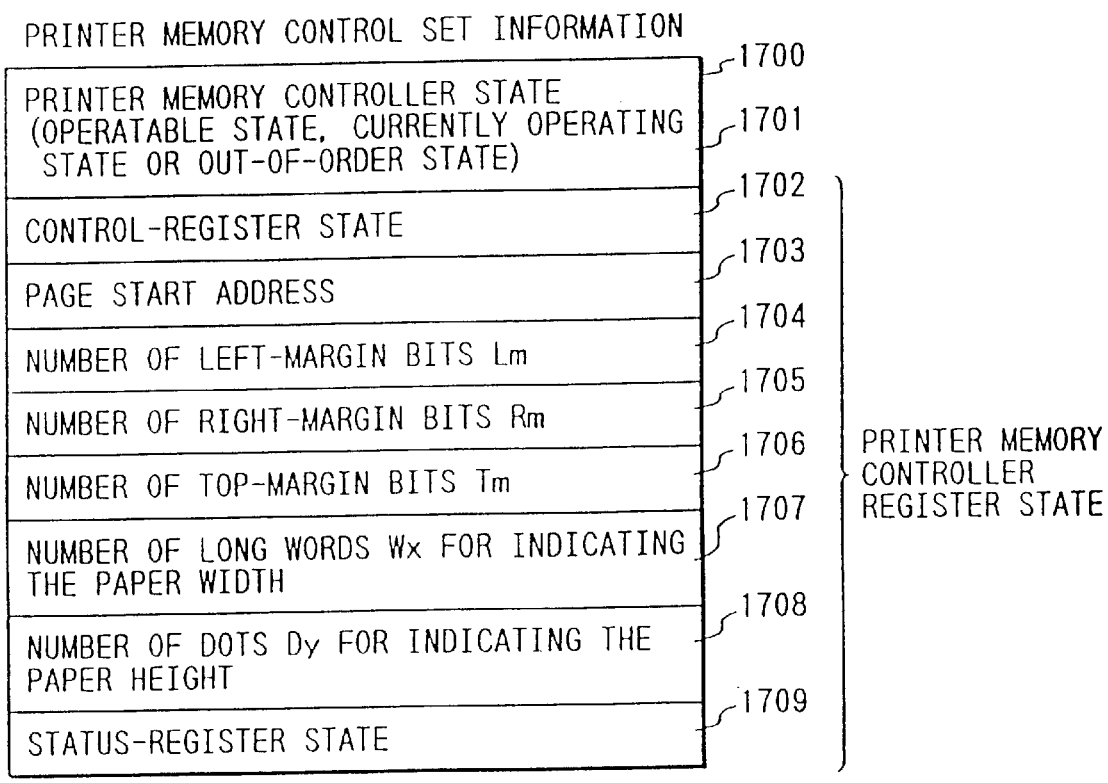
FIG. 17 is a diagram showing the configuration of printer memory control set information entry of the page-buffer table provided by the present invention.
FIG. 18 is a diagram showing the configuration of command unresolved information entry of the page-buffer table provided by the present invention.

FIG. 17 shows the printer memory control set information 1700. The printer memory control set information 1700 comprises a printer memory controller state 1701 for indicating an operatable state, a currently operating state or an out-of-order state, a control-register state 1702, a page start address 1703, the number of left-margin bits (Lm) 1704, the number of right-margin bits (Rm) 1705, the number of top-margin bits (Tm) 1706, the number of long words (Wx) 1707 for indicating the paper width, the number of dots (Dy) 1708 for indicating the paper height and a status-register state 1709.

FIG. 18 shows the command unresolve information. The command unresolve information comprises unresolve flags, an unresolve command start address and an unresolve command end address.

Basically, the contents of the page-buffer control table 1141 are the same as those disclosed earlier by Japanese Patent Laid-open No. HEI 2-70465 and Japanese Patent Laid-open No. HEI 3-178466. In the present invention, the printing conditions are extended as shown in FIG. 16. That is, the total number of blank printing sheets to be produced 1410, the number of blank-printing sheets already produced 1411 and the double-side printing eject flags 1413 are newly added. In addition, the single/double-side printing specification code 1405 and the right/reverse-side printing specification code 1406 are used in the present invention even though they are also available but not used in the case of the single-side printing. The total number of blank printing sheets to be produced 1410 and the number of blank-printing sheets already produced 1411 are provided so that printing can be continued even if there is a discrepancy in the number of sheets to be printed between the right and reverse-side pages. On the other hand, the double-side printing eject flags 1413 serve as a means of communication with a printing task whenever a drawing task detects a change in paper-supply unit, a change in paper-eject unit or a change in paper size, as a condition for switching the printing from a reverse-side page to a right-side page.

The single/double-side printing specification code 1405 is used for specifying the single or double-side printing for a sheet. On the other hand, the right/reverse-side printing specification code 1406 is provided for specifying the right or reverse-side printing for a sheet. The double-side printing eject flags 1413 comprise three bits which have values described as follows:

| | |
|---|---|
| 0: | No eject for double-side printing |
| Other than 0: | Eject for double-side printing |
| Bit 0: | A flag indicating a change in paper-supply unit |
| Bit 1: | A flag indicating a change in paper-eject unit |
| Bit 2: | A flag indicating a change in paper size |

Comprising three bits as described above, the double-side printing eject flags 1413 can be used to identify a change in the paper-supply unit, a change in paper-eject unit and a change in paper size even if they occur simultaneously. For a value of the double-side printing eject flags 1413 other than zero, the printing control apparatus 110 once ejects all sheets from the printer-engine unit 120. The paper-supply unit, the paper-eject unit and/or the paper size are then changed as necessary before resuming the double-side printing.

FIG. 16 shows the printing conditions 1400. The printing conditions 1400 are written in sub-command processing for specifying printing conditions by the drawing task in accordance with instructions given by a sub-command for specifying printing conditions received from the host computer 100. The drawing task uses the following pieces of information on the printing conditions during drawing sub-command processing in order to perform drawing processing on the associated page buffer:

paper-size code paper vertical/horizontal direction code right/reverse-side printing specification code printing direction (portrait/landscape)

drawing-error processing mode character expansion mode

The drawing processing is carried out by using memory-frame description parameters for drawing which are obtained by converting the paper-size code and the paper vertical/horizontal direction code. The memory-frame description parameters for drawing are described in the above mentioned inventions disclosed previously.

The drawing task writes the following pieces of information about each page buffer for double-side printing.

direction of single/double-side printing direction of right/reverse-side printing double-side printing eject flags A printing task carries out printing processing on the drawn page buffer by using the following pieces of information:

paper-supply unit code paper-eject unit code paper-size code paper vertical/horizontal direction code print page sequence number the total number of sheets to be printed the number of sheets already printed single/double-side printing specification right/reverse-side printing specification double-side printing eject flags In the printing processing, a printer memory controller is driven by using the printer memory controller set information 1700 (shown in FIG. 17). The information 1700 is information converted from the paper-size code and the paper vertical/horizontal direction code.

FIGS. 19 to 25 show the contents of the printer control table 1161. The printer control table 1161 is used for administering the utilization of the printer (the sub-CPU 96 and the printer-engine unit 120) by the printing tasks and status of inputs and outputs exchanged with the printer-engine unit and, hence, controlling input/output operations and a resource of the printer.

Figure 19:
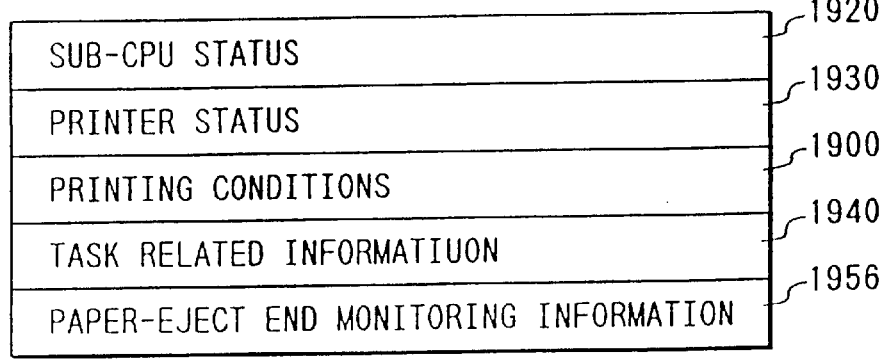
FIG. 19 is a diagram showing the configuration of a printer control table provided by the present invention.

FIG. 19 shows an overall structure of the printer control table 1161. The printer control table 1161 comprises sub-CPU status 1920, printer status 1930, printing conditions 1900, task related information 1940 and paper-eject end monitoring information 1950.

Figure 20:
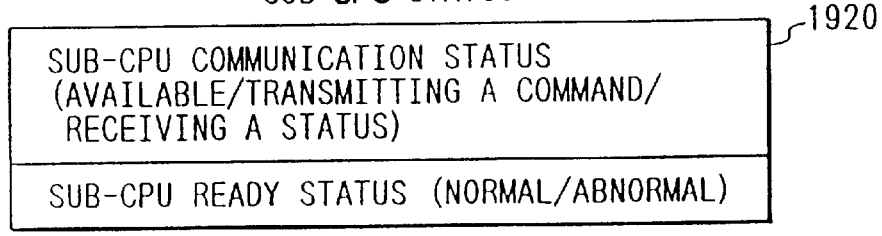
FIG. 20 is a diagram showing the configuration of 2 sub-CPU status entry of the printer control table provided by the present invention.

FIG. 20 shows details of the sub-CPU status 1920. The sub-CPU status 1920 comprises sub-CPU communication status (available/transmitting a command/receiving a status) and sub-CPU ready status (normal/abnormal).

Figure 21:
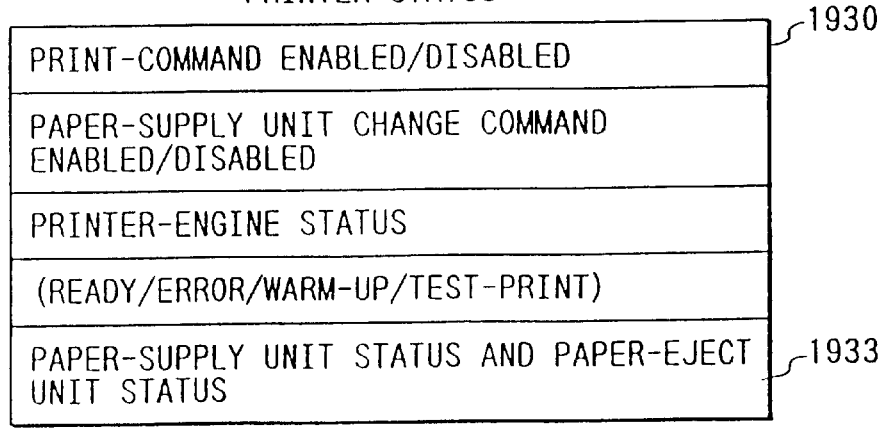
FIG. 21 is a diagram showing the configuration of printer status entry of the printer control table provided by the present invention.

FIG. 21 shows details of the printer status 1930. The printer status 1930 comprises printing-task print-command enabled/disabled status, paper-supply/eject unit change command enabled/disabled status, printer-engine status (ready/error/warm-up/test-print), paper-supply unit status and paper-eject unit status.

FIG. 22 shows details of the printing conditions 1900. The fields of the printing conditions 1900 include printing-condition fields of the page-buffer control table for a page buffer corresponding to the printing task in question. Corresponding code values of the printing-condition fields are copied and received before the printing task issues a series of printer-control macros using those code values. The printing task then executes printing processing on the page buffer to be printed while referencing those code values. The codes to be copied include the paper-supply unit code 1401, the paper-eject unit code 1402, the paper-size code 1403, the paper vertical/horizontal direction code 1404, the total number of sheets to be printed 1408, the number of sheets already printed 1409, the total number of blank-printing sheets to be produced 1410 and the number of blank-printing sheets already produced 1411 which are all shown in FIG. 16.

FIG. 23 shows details of the task related information 1940. The task related information further comprises the number of a task currently using the printer, a forward-looking pointer to a task waiting for the printer to become available and a backward-looking pointer to a task waiting for the printer to become available.

FIG. 24 shows details of the paper-eject end monitoring information 1950. The paper-eject end monitoring information 1950 includes sequence numbers of pages most recently ejected by 1st to 5th paper-eject units, sequence numbers of pages monitored by 1st to 25th paper-eject end monitoring timers and paper-eject units specified for the 1st to 25th paper-eject end monitoring timers.

FIG. 25 shows details of the paper-supply unit status and the paper-eject unit status 1933 of the printer status 1930. The paper-supply unit status and paper-eject unit status 1933 are stored as 13-byte data and used to control the present status of paper-supply and paper-eject units. Reference notation R shown in the figure denotes an unused bit which is reserved for future applications.

Basically, the contents of the printer control table 1161 described above are the same as those disclosed earlier in Japanese Patent Laid-open No. HEI 2-70465 and Japanese Patent Laid-open No. HEI 3-178466 except that, in the case of the present invention, the following codes are added to the printing conditions in order to implement the double-side printing control. Refer to FIG. 22.

(1) The number of sheets retained in the printer engine 1905

(2) Right-side printing post required flags 1906
(3) Right-side printing post waiting task number 1907
(4) Reverse-side printing post required flags 1908
(5) Reverse-side printing post waiting task number 1909
(6) Multi-page copy communication ECBs 1910, 1911 etc. each provided for a printing task
(7) The total number of blank-printing sheets to be produced
(8) The number of blank-printed sheets already produced 1904
(9) Double-side printing paper run-out error generation flag
(10) Right-side printing enable task end wait ECB 1913

Item (1) is used to monitor the number of sheets in the paper engine for controlling the switching of the reverse-side page and the right-side page. Items (2) to (6) are used by printing tasks associated with page buffers for implementing communication control when performing a double-side multi-page copy operation for the page buffers. Items (7) and (8) are provided for allowing double-side printing to be continued even if the number of copies for the right side is different from that for the reverse side of the same sheets in a double-side multi-page copy operation. Items (9) and (10) are used for handling an error caused by a paper-runout in the double-side printing.

In addition, the paper-eject end monitoring information includes:

(a) the sequence number of a page most recently ejected by each paper-eject unit; and
(b) a page sequence number monitored by each paper-eject end monitoring timer and a paper-eject unit specified for each paper-eject end monitoring timer as shown in FIG. 24.

In double-side printing, page sequence numbers are counted only for right-side pages ejected by a paper-eject unit. Page sequence numbers for reverse-side pages ejected and retained temporarily in the printer engine are not counted. The counting is done as follows:

(i) If the sheet of print paper is not the end of a composition the sequence number of the page most recently ejected is incremented by one.
(ii) If the sheet of print paper is the end of a composition, the sequence number of the page most recently ejected is incremented by one, provided the reverse-side page of the sheet is also printed, as in the case (i). If only the right-side page is printed, however, the sequence number of the page most recently ejected itself is used as it is. Unlike the case (i), the sequence number of the page most recently ejected is thus not incremented.

Figure 52:
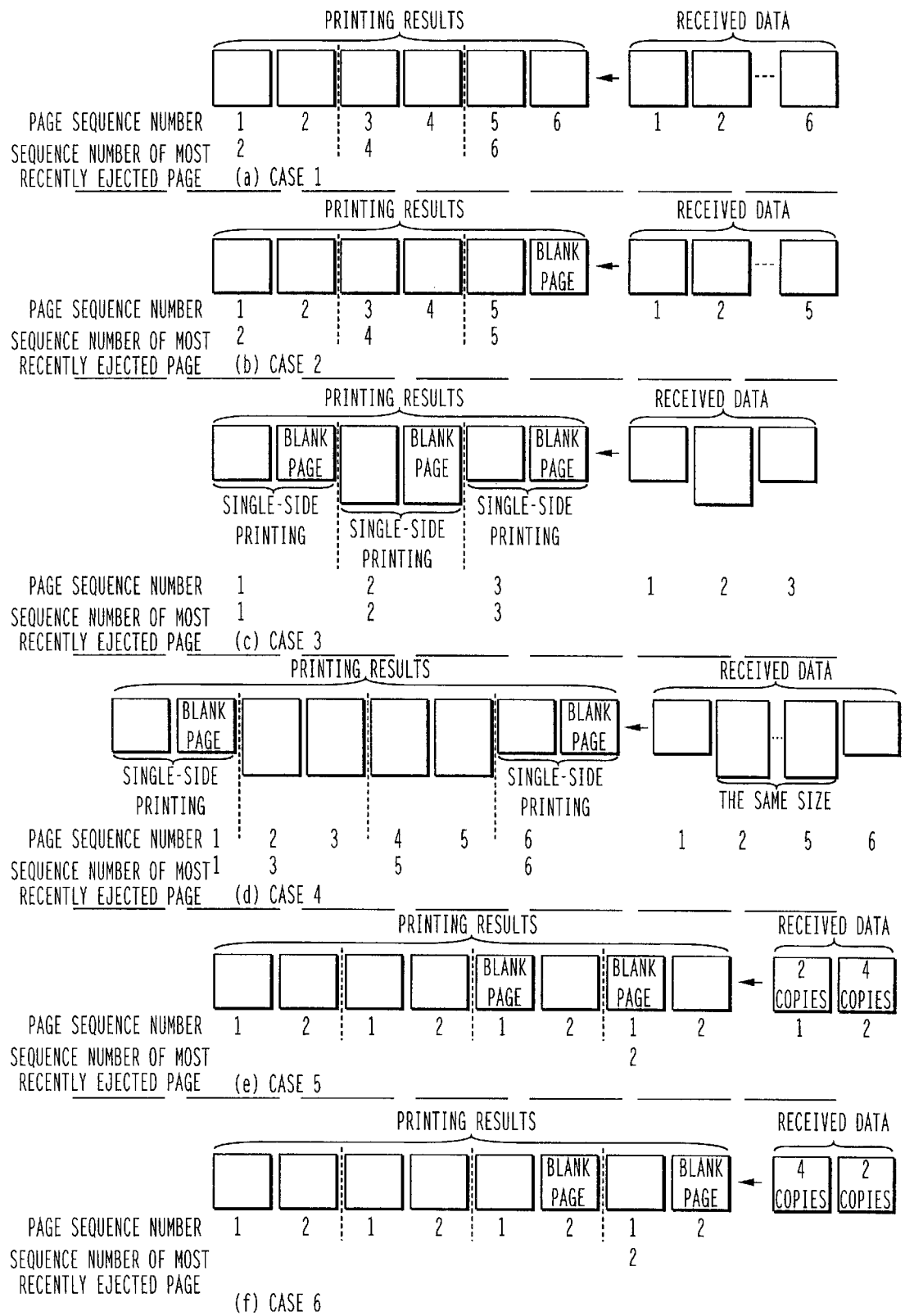
FIG. 52 is a diagram for explaining management of serial numbers of latest ejected pages.

FIG. 52 shows an example of management of serial numbers of the latest ejected pages in the double side printing. A case 1 is a case for printing 6 pages of received data on double sides of equal sized sheets. In this case, a serial number of the latest ejected page is "6" which is added 1 to a serial number of page "5" when a ejection of a right side page (a serial number of page is "5") is detected because this page is not the end of the document. A case 2 is a case for printing 5 pages of received data on double sides of equal sized sheets. In this case, a serial number of the latest ejected page is "5" which is the same as a serial number of page "5" when a ejection of a right side page (a serial number of page is "5") is detected because this page is the end of the document. A case 3 is a case for printing 3 pages of received data on sheets. The size of sheets changes from 1 to 2 and from 2 to 3. In this case, the latest ejected page changes in the same way as a serial number of page because all page is printed on right side of sheets (single side printing). A case 4 is a case for printing 6 pages of received data on double sides of sheets. The size of sheets changes from 1 to 2 and from 5 to 6. In this case, the latest ejected page changes as shown in the figure because page "1" and "6" is printed on right side of sheets with blank reverse side (single side printing) and page "2" and "5" is printed on double sides of sheets. A case 5 and case 6 are cases for printing 2 pages of received data on double sides of equal sized sheets. However, a number of copies to be printed for each page is different from another. In the case 5, the serial number of the latest ejected page is renewed to "2" when 2 copies of printing for page "1" and 2 copies of blank-printing for page "1" have been detected. In the case 6, the serial number of the latest ejected page is renewed to "2" when 4 copies of printing for page "1" has been detected.

When an error that needs re-printing (a paper jam etc.) occurs, the printing apparatus re-prints the pages from next number of the serial number of the latest ejected page for efficient re-printing without duplicate printing. The print controller controls the printer engine for the re-printing using the series of the print command re-sent from the computer or stored in the printing apparatus.

FIGS. 26 to 45 show processing procedures for the drawing and printing tasks, which are required in the double-side printing control of the present printing system. The explanation begins with description of key points for the drawing and printing tasks. The processing procedure of the drawing task is almost the same for both the double and single-side printing modes. Essential points of the processing procedure of the drawing task for double-side printing are listed as follows:

(1) In page-eject processing unit 209 inputs indication of the single/double side printing and indication of the right/reverse side printing on the codes 1405 and 1406 (FIG. 16) corresponding to the page-buffer number of the page to be drawn in the page-buffer control table 1141.

(2) In paper-size specifying command processing 206 sets a paper-size change flag (a bit of the double-side printing eject flags 1413 in this embodiment) in the page-buffer control table 1141 when a change in paper size is detected.

(3) In paper-supply unit specifying command processing 204 or paper-eject unit specifying command processing 205 sets a paper-supply unit change flag or a paper-eject unit change flag (a bit of the double-side printing eject flags 1413 in this embodiment) in the page-buffer control table 1141 when a change in paper-supply unit or a change in paper-eject unit is detected.

(4) When a blank page is detected at the detection of the (2) and (3) because of print data for the right-side page of a sheet without print data for the reverse-side of the sheet, a printing task for printing the blank page is activated and a page buffer for the printing task is acquired. Detailed procedures are shown in FIGS. 28 to 32.

(5) When the end of a document is detected in read out processing of a command buffer by the command interpreting unit 201, a double-side printing termination task is activated to perform end processing of the printing of the document.

Figure 33:
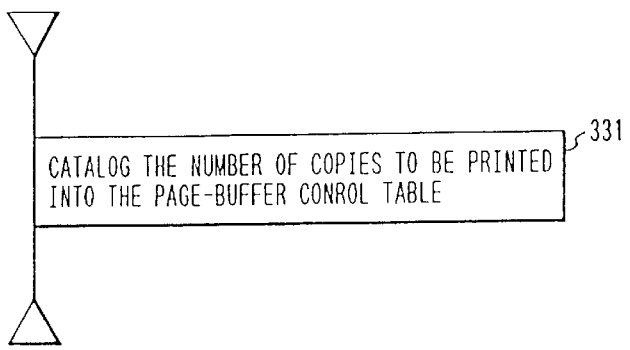
FIG. 33 is a diagram used for explaining a processing procedure of copy-count specifying command processing, part of the drawing task, provided by the present invention.

(6) If a discrepancy in the number of sheets to be printed between the right and reverse-side pages is detected in processing a copy-count specifying command, the smaller number is cataloged in the page-buffer control table as the total number of blank printing sheets for the associated page buffer. A detailed procedure is shown in FIG. 33.

Next, essential points for the printing tasks are explained.

(1) A printing task is activated when the drawing task detects a condition for ejecting a page and the completion of processing of page-buffer data for a page. An activated printing task is ended right after a printer free macro (shown in FIG. 48) is issued.

(2) A plurality of printing tasks are provided. For example, printing tasks denoted by task numbers 7 to 16 as shown in FIG. 1. As described in Point (1), a printing task is ended right after a printer free macro is issued instead of being terminated at the time a sheet of print paper is ejected (as disclosed in Japanese Patent Laid-open No. HEI 2-70465 and Japanese Patent Laid-open No. HEI 3-178466). Therefore, as many printing tasks as page buffers of the smallest size are adequate. The number of such page buffers is equal to the total number of page-buffer regions N shown in FIG. 14.

(3) First of all, the printing task issues a printer service macro in order to verify that the printer is available. Thereafter, a variety of print macros shown in FIGS. 46 to 48 are issued to the printer engine. As the use of the printer engine is ended, a printer free macro is issued in order to release the printer engine from the occupation by the printing task.

(4) A ready-state verifying macro, a paper-supply unit verifying macro, a paper-eject verifying macro, and a print specifying macro are issued one after another to the printer engine. In the case of a multi-page copy operation, the macro SVCs are issued repeatedly as many times as copies.

(5) When a printer-engine related error detected in the processing of a macro, error handling is carried out in the processing of the macro.

(6) When a signal from the printer engine is required in response to a command issued to the printer engine during the processing of a macro, the printing task enters a state waiting for the signal. In the mean time, the CPU is assigned to another task waiting for an execution turn.

(7) The double-side printing control is implemented as follows.

(a) Printing tasks for right-side pages are put in a right-side printing wait state while printing tasks for reverse-side pages are carrying out printing one after another.

(b) If the sheets retained in the printer engine reach the maximum number after printing of a reverse-side page, a printing task at the head of a right-side printing wait queue is released, the print task for reverse-side page is put at the tail of a reverse-side printing wait queue. After the printing task released from the head of the right-side printing wait queue has completed the printing on a right-side page, another printing task for the next reverse-side page is activated to resume the reverse-side printing.

(c) If a change in paper size, a change in paper-supply unit or a change in paper-eject unit is detected during processing on a right or reverse-side page, all printing tasks for right-side pages on the right-side printing wait queue are released from the queue while the printing task for the page being processed is put on the queue. After all printing jobs by the printing tasks released from the right-side printing wait queue have all been done, the printing is continued with the page for which the change was detected.

(d) When a 'paper-runout' is detected, a suspend task shown in FIG. 11 is first activated. The suspend task performs: (i) See a double-side printing paper-runout error generation flag 1912, (ii) Release right-side printing enabled tasks from a wait state (Release right-side printing tasks from the right-side printing wait queue for sheets of print paper retained in the printer engine and perform post processing of a right-side printing post wait state), and (iii) Enter a wait state waiting for a right-side printing enabled task to terminate.

The last printing task among the right-side printing enabled tasks issues a print command and then issues a post in order to release the suspend task from the wait state waiting for a right-side printing enabled task to terminate. The post causes the processing to be transferred to the suspend task again. In the mean time, paper is resupplied to allow the suspend task to finish the processing. Then, normal double-side printing processing by a printing task is resumed.

The above processing procedure for handling a 'paper-runout' error is also applicable to a case in which the detected paper-runout error is a synchronous error accompanying the issuance of various printer control macros by a printing task as well as to the case of an asynchronous error detected by the sub-CPU 96 having nothing to do with the issuance of the various printer control macros. As a result, the processing procedure for handling a 'paper-runout' error is controlled in a uniform manner regardless of whether the 'paper-runout' error is synchronous or asynchronous.

(e) When sheets retained in the printer engine is reach the maximum number in a multi-page copy operation, a printing task for a right-side page at the head of the right-side printing wait queue is released, and the printing task for this page is put in a wait state. The wait state is a right-side printing post wait state if this page is a right-side page. If this page is a reverse-side page, however, the wait state is a reverse-side printing post wait state. After the printing task for a right-side page released from the head of the right-side printing wait queue has completed its processing, a printing task in a wait state is posted. The wait state is a right-side printing post wait state if this page is a reverse-side page. If this page is a right-side page, however, the wait state is a reverse-side printing post wait state. Later, the printing task for a right-side page released from the head of the right-side printing wait queue enters a wait state.

(f) If the number of right-side copies to be printed does not match the number of reverse-side copies to be printed in a multi-page operation, blank printing is carried out on as many right or reverse-side pages as the difference between the two numbers in order to close the gap between the two. In this way, blank pages is used for adjusting the fewer copies to the greater number.

(g) A double-side printing termination task activated upon the detection of the end of a document by the drawing task releases tasks from a right-side printing wait state. To describe it in more detail, all printing tasks on a right-side printing wait queue and a task waiting for a right-side printing post are released from a wait state. The double-side printing termination task, which has the same priority level as the printing tasks as shown in FIG. 11, performs the document-end processing described earlier. It should be noted, however, that the double-side printing termination task is activated as a special printing task which does not perform actual printing processing.

Next, details of a processing procedure of the drawing task are described in FIGS. 26 to 34.

Figure 26:
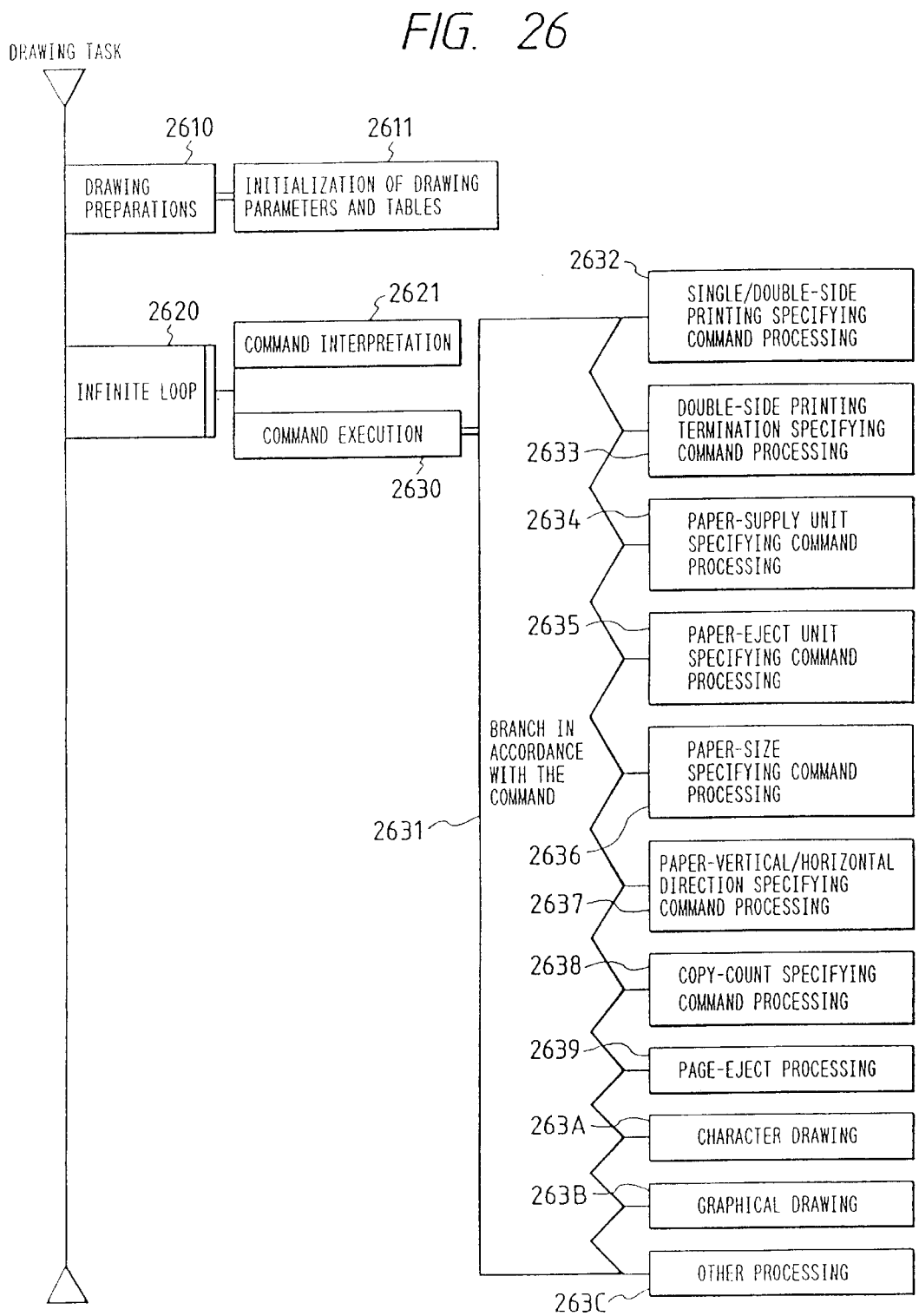
FIG. 26 is a diagram used for explaining a processing procedure of the drawing task provided by the present invention.

FIG. 26 shows an overall processing procedure of the drawing task. The drawing task first carries out drawing preparations 2610 for initializing a variety of parameters and tables 2611 used in the drawing processing. After the drawing preparations 2610, the drawing processing interprets and executes a command at steps 2621 and 2630 repeatedly in an infinite loop 2620. The execution of a command 2630 causes the drawing task to branch to one of the following processings 2631 determined by the command:

single/double-side printing specifying command processing 2632 double-side printing termination specifying command processing 2633 paper-supply unit specifying command processing 2634 paper-eject unit specifying command processing 2635 paper-size specifying command processing 2636 paper vertical/horizontal direction specifying command processing 2637 copy-count specifying command processing 2638 page-eject processing 2639 character drawing 263A graphical drawing 263B and other processing 263C.

Figure 27:
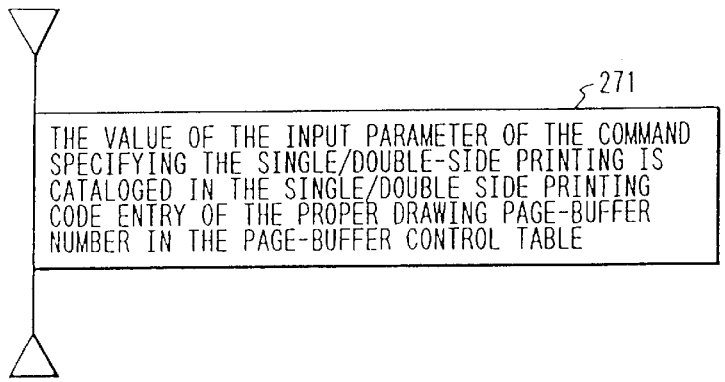
FIG. 27 is a diagram used for explaining a processing procedure of single/double-side printing specifying command processing, part of the drawing task, provided by the present invention.

FIG. 27 shows details of the single/double-side printing specifying command processing 2632 in FIG. 26. In FIG. 27, the value of a parameter specifying whether the printing is single or double-side printing is cataloged in the single/double-side printing specifying code area 1405 having a proper drawing page-buffer number in the page-buffer control table at a step 271. The parameter is passed to the single/double-side printing specifying command as an input argument.

Figure 28:
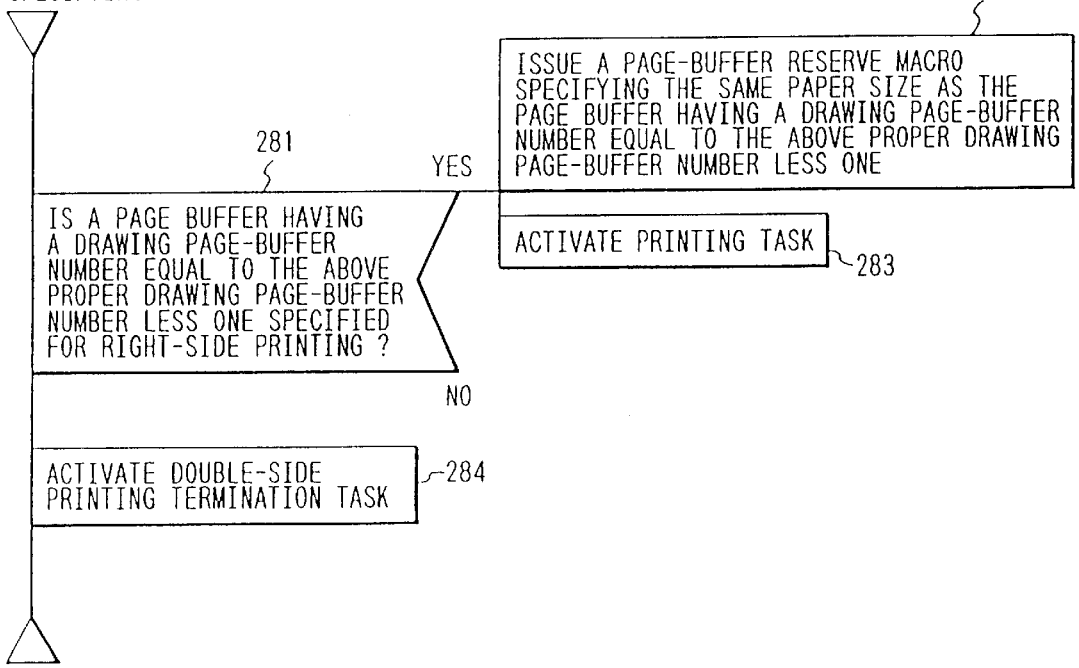
FIG. 28 is a diagram used for explaining a processing procedure of double-side printing termination specifying command processing, part of the drawing task, provided by the present invention.

FIG. 28 shows details of the double-side printing termination specifying command processing 2633 in FIG. 26. As shown in FIG. 28, the double-side printing termination specifying command processing 2633 first determines at a step 281 whether or not a page buffer having a drawing page-buffer number equal to the above proper drawing page-buffer number less one is specified for right-side printing. The determination at the step 281 is based on reference to the single/double-side printing specifying code area 1405 for the page buffer.

If right-side printing is specified for the page buffer, the following three operations are executed.

(1) A page-buffer reserve macro 282 is issued for specifying the same paper size as the buffer page having a drawing page-buffer number equal to the above proper drawing page-buffer number less one.

(2) A printing task is activated for performing blank printing 283 on the page buffer allocated in the operation (1).

(3) Thereafter, the double-side printing termination task is activated in order to accomplish termination processing 284 for the composition.

Figure 29:
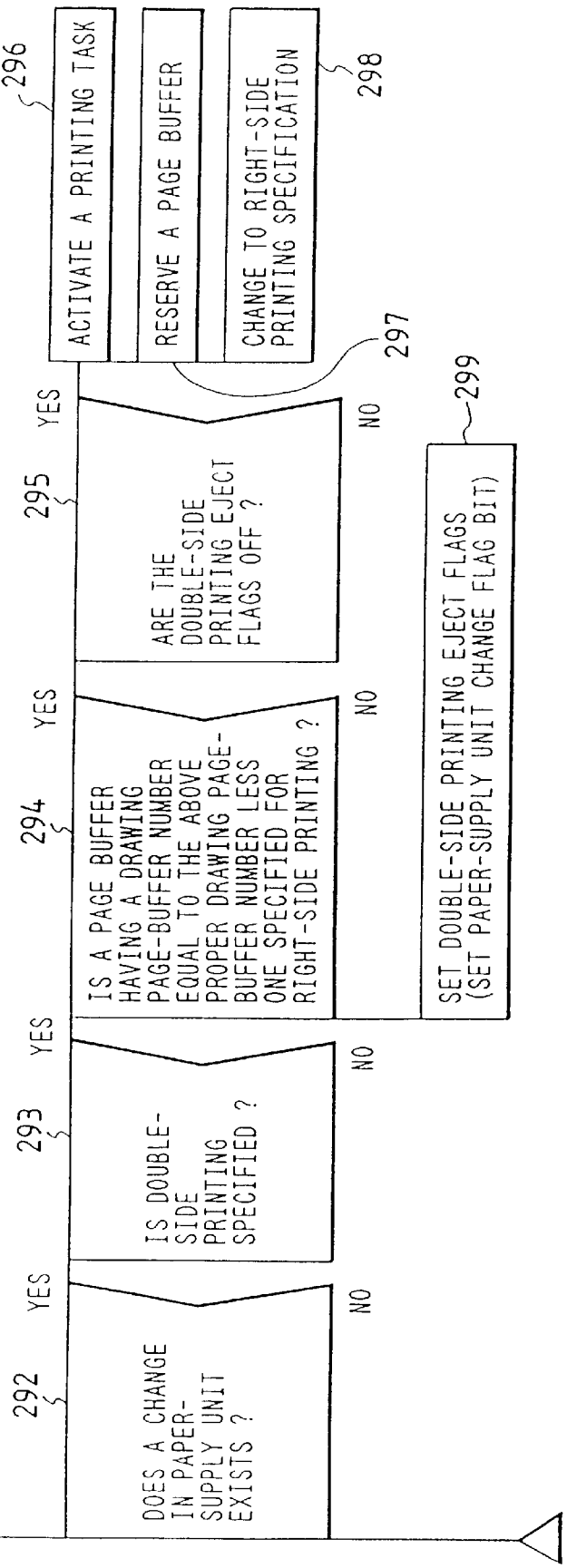
FIG. 29 is a diagram used for explaining a processing procedure of paper-supply unit specifying command processing, part of the drawing task, provided by the present invention.

FIG. 29 shows details of the paper-supply unit specifying command 2634 in FIG. 23. In FIG. 29, the value of a paper-supply unit code is first cataloged at a step 291 into the paper-supply unit code area 1401 having a proper drawing page-buffer number in the page-buffer control table. The paper-supply unit code is passed to the command as an input argument. The processing flow continues to a step 292 to determine whether a change in paper-supply unit exits. If such a change exists, the processing flow continues to a step 293 to determine whether the page buffer having the proper drawing page-buffer number is specified for double-side printing. If double-side printing is specified, the processing flow continues to a step 294 to determine whether a page buffer having a drawing page-buffer number equal to the above proper drawing page-buffer number less one is specified for right-side printing by referring to the single/double-side printing specifying code area 1405 for the page buffer.

If right-side printing specified, the processing flow continues to a step 295 to determine whether the double-side printing eject flags 1413 are off. If the double-side printing eject flags 1413 are off, the following three steps are taken.

(1) A step 296 to activate a printing task
(2) A step 297 to reserve a page buffer
(3) A step 298 to catalog a right-side printing specification into the right/reverse-side printing specification code area having the proper drawing page-buffer number.

After the judgement at the step 294, the processing flow continues to a step 299 at which the paper-supply unit change flag, one of the double-side printing eject flags 1413, is set.

Figure 30:
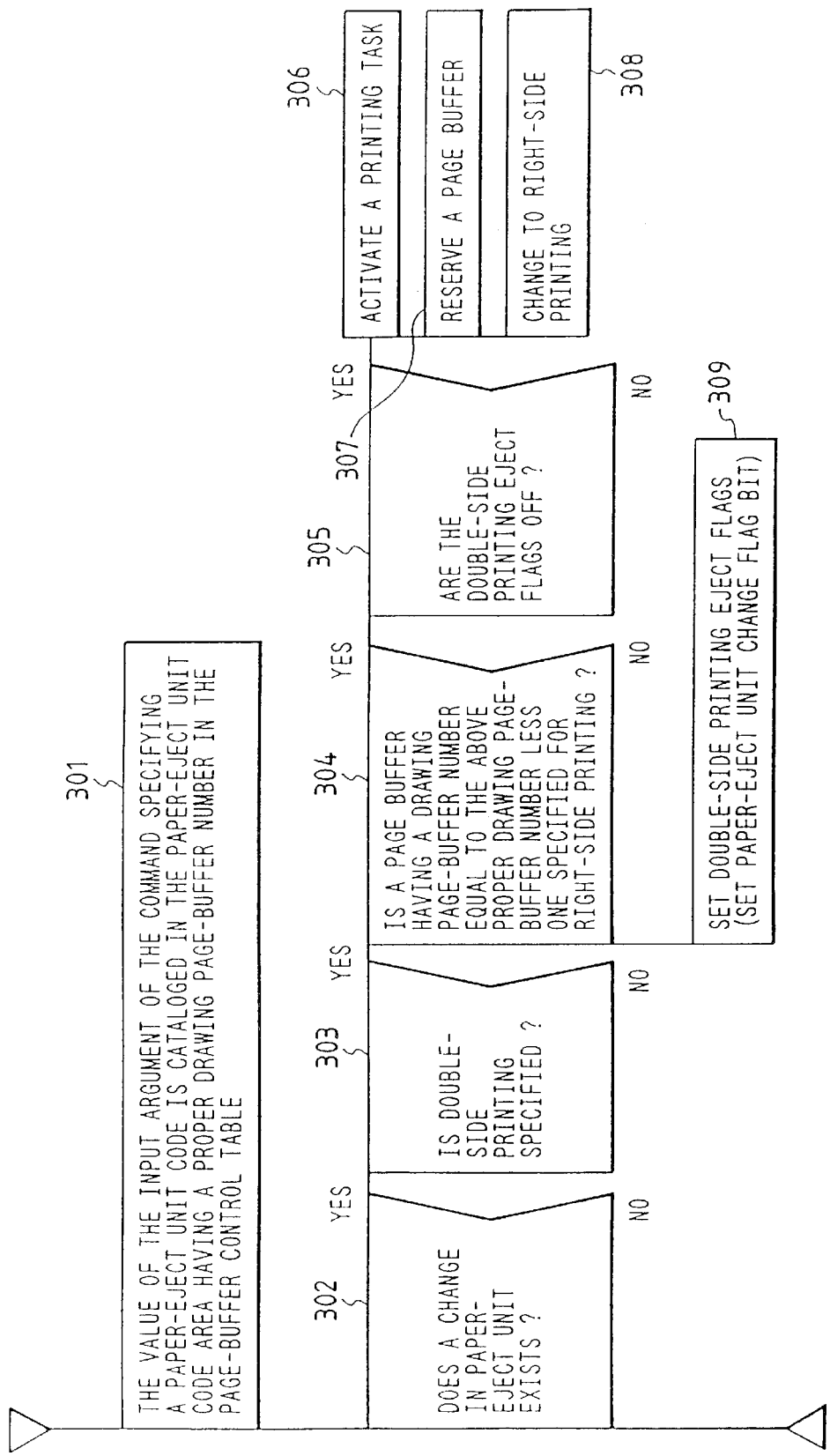
FIG. 30 is a diagram used for explaining a processing procedure of paper-eject unit specifying command processing, part of the drawing task, provided by the present invention.

FIG. 30 shows details of the paper-eject unit specifying command processing 2635 in FIG. 26. In FIG. 30, the value of a paper-eject unit code is first cataloged at a step 301 in the paper-eject unit code area 1402 having a proper drawing page-buffer number in the page-buffer control table. The code is passed to the paper-eject unit specifying command as an input argument. The processing flow continues to a step 302 to determine whether a change in paper-eject unit exists. If the change exists, the processing flow continues to a step 303 to determine whether the page buffer having the proper drawing page-buffer number is specified for double-side printing. If double-side printing is specified, the processing flow continues to a step 304 to determine whether a page buffer having a drawing page-buffer number equal to the above proper drawing page-buffer number less one is specified for right-side printing by referring to the single/double-side printing specifying code area 1405 for the page buffer. If right-side printing is specified, the processing flow continues to a step 305 to determine whether the double-side printing eject flags 1413 are off. If the double-side printing eject flags 1413 are off, the following three steps are taken.

(1) A step 306 to activate a printing task
(2) A step 307 to reserve a page buffer
(3) A step 308 to catalog a right-side printing specification into the right/reverse-side printing specification code area having the proper drawing page-buffer number.

After the judgement at the step 304, the processing flow continues to a step 309 at which the paper-eject unit change flag, one of the double-side printing eject flags 1413, is set.

Figure 31:
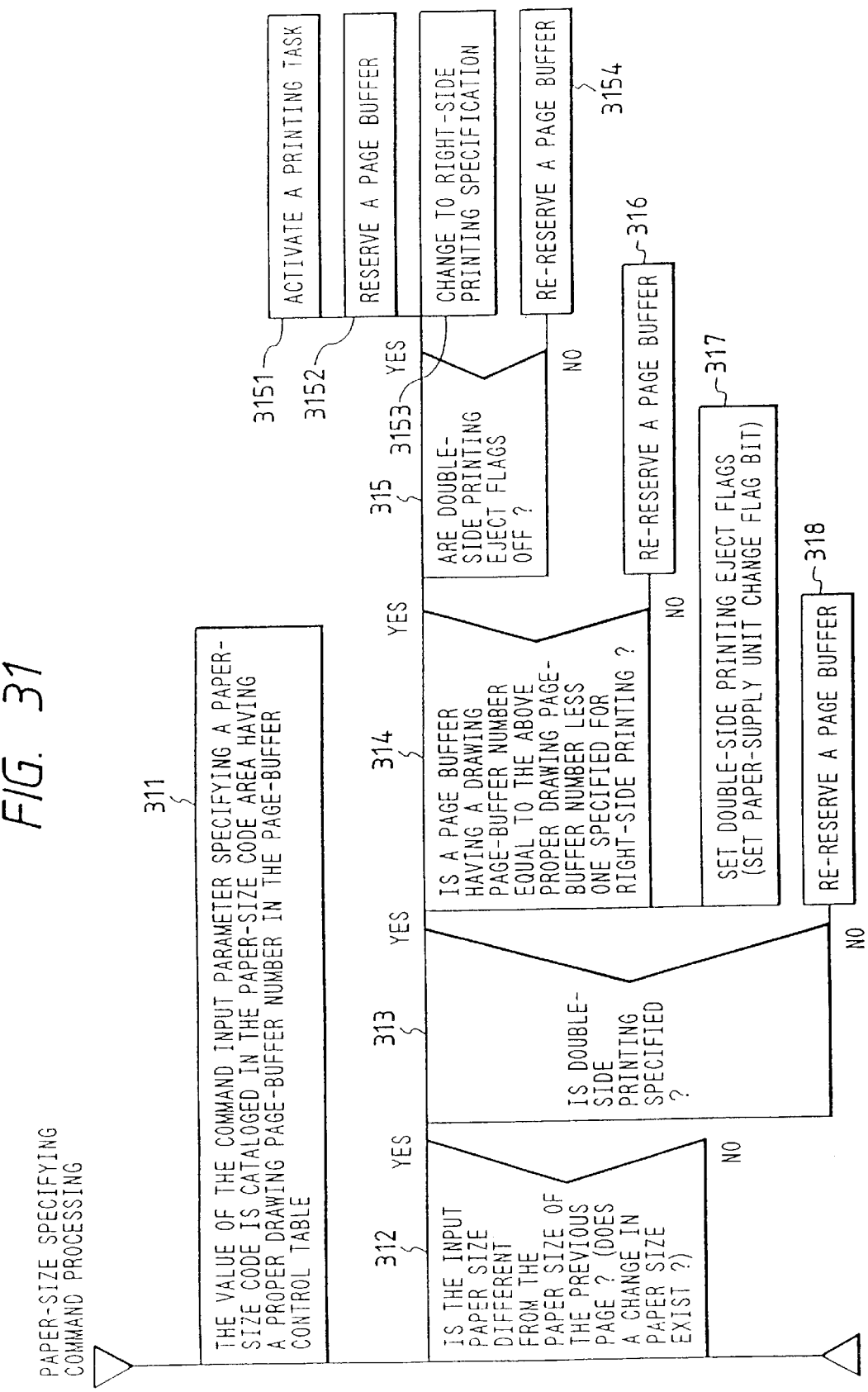
FIG. 31 is a diagram used for explaining a processing procedure of paper-size specifying command processing, part of the drawing task, provided by the present invention.

FIG. 31 shows details of the paper-size specifying command processing 2636 in FIG. 26. In FIG. 31, the value of a paper-size code is first cataloged at a step 311 in the paper-size code area 1403 having a proper drawing page-buffer number in the page-buffer control table. The code is passed to the paper-size specifying command as an input argument. The processing flow continues to a step 312 to determine whether or not a change in paper size exists. If such a change exists, the processing flow continues to a step 313 to determine whether the page buffer having the proper drawing page-buffer number is specified for double-side printing. If double-side printing is specified, the processing flow continues to a step 314 to determine whether a page buffer having a drawing page-buffer number equal to the above proper drawing page-buffer number less one is specified for right-side printing by referring to the single/double-side printing specifying code area 1405 for the page buffer. If right-side printing is specified, the processing flow continues to a step 315 to deter mine whether the double-side printing eject flags 1413 are off. If the double-side printing eject flags 1413 are off, the following three steps are taken.

(1) A step 3151 to activate a printing task
(2) A step 3152 to reserve a page buffer
(3) A step 3153 to catalog a right-side printing specification into the right/reverse-side printing specification code area having the proper drawing page-buffer number.

If the double-side printing eject flags 1413 are on at the step 315, on the other hand, the processing flow continues to a step 3154 to issue a page-buffer re-reserve macro. If right-side printing is not specified at the step 314, on the other hand, the processing flow continues to a step 316 also to issue a page-buffer re-reserve macro. After the judgement at the step 314, the processing flow continues to a step 317 at which the paper-supply unit change flag, one of the double-side printing eject flags 1413, is set. If double-side printing is not specified at the step 313, on the other hand, the processing flow continues to a step 318 also for issuing a page-buffer re-reserve macro. A page buffer is allocated at the step 3125, 3154, 316 or 318 with a modified paper size. If double-side printing is not specified at the step 313, on the other hand, the processing flow continues to a step 318 also for issuing a page-buffer re-reserve macro. A page buffer is allocated at the step 3125, 3154, 316 or 318 with a modified paper size.

Figure 32:
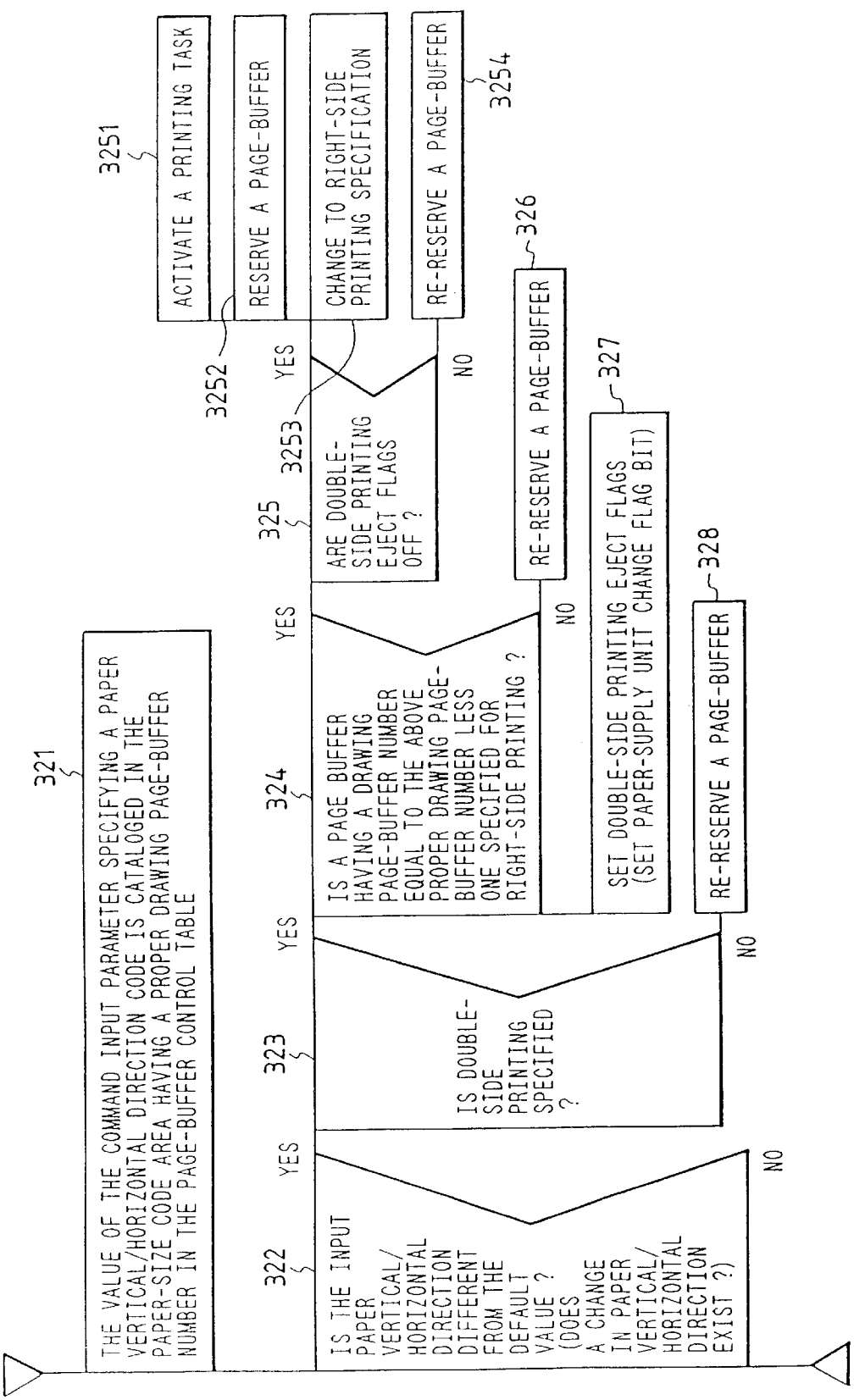
FIG. 32 is a diagram used for explaining a processing procedure of paper vertical/horizontal direction specifying command processing, part of the drawing task, provided by the present invention.

FIG. 32 shows details of the paper vertical/horizontal direction specifying command processing 2637 in FIG. 26. In FIG. 32, the value of a paper vertical/horizontal direction code is first cataloged at a step 321 in the paper vertical/horizontal direction code area 1404 having a proper drawing page-buffer number in the page-buffer control table. The code is passed to the paper vertical/horizontal direction specifying command as an input argument. The processing flow continues to a step 322 to determine whether a change in paper vertical/horizontal direction exists. That is, the step 322 determines whether the input paper vertical/horizontal direction specified by this command is different from that of the previous page. If such a change exists, the processing flow continues to a step 323 to determine whether the page buffer having the proper drawing page-buffer number is specified for double-side printing. If double-side printing is specified, the processing flow continues to a step 324 to determine whether a page buffer having a drawing page-buffer number equal to the above proper drawing page-buffer number less one is specified for right-side printing by referring to the single/double-side printing specifying code area 1405 for the page buffer. If right-side printing is specified, the processing flow continues to a step 325 to determine whether the double-side printing eject flags 1413 are off. If the double-side printing eject flags 1413 are off, the following three steps are taken.

(1) A step 3251 to activate a printing task
(2) A step 3252 to reserve a page buffer
(3) A step 3253 to catalog a right-side printing specification into the right/reverse-side printing specification code area having the proper drawing page-buffer number.

If the double-side printing eject flags 1413 are on at the step 325, on the other hand, the processing flow continues to a step 3254 to issue a page-buffer re-reserve macro. If right-side printing is not specified, on the other hand, the processing flow continues to a step 326 also to issue a page-buffer re-reserve macro. After the judgement at the step 324, the processing flow continues to a step 327 at which the paper-supply unit change flag, one of the double-side printing eject flags 1413, is set. If double-side printing is not specified at the step 323, on the other hand, the processing flow continues to a step 328 also for issuing a page-buffer re-reserve macro. A page buffer is allocated at the step 3225, 3254, 326 or 328 with a modified paper vertical/horizontal direction. According to the explanation given so far, a page buffer having a different area is allocated in the page-buffer unit 115 whenever the paper vertical/horizontal direction is changed even if all sheets of print paper in use have a uniform size, for example, the A4 size. This is because, the net print area of a page will be different if the paper vertical/horizontal direction is changed. In spite of the change in net print area, a page buffer having the same area can also be allocated in the page-buffer unit 115 as well. In this case, the processings carried out at the steps 3254, 326 and 328 are not required.

FIG. 33 shows details of the copy-count specifying command processing 2638 in FIG. 26. In FIG. 33, the number of copies to be printed is first cataloged at a step 331 in the copy-count code area 1408 having a proper drawing page-buffer number in the page-buffer control table. The number of copies to be printed is passed to the copy-count specifying command as an input argument.

Figure 34:
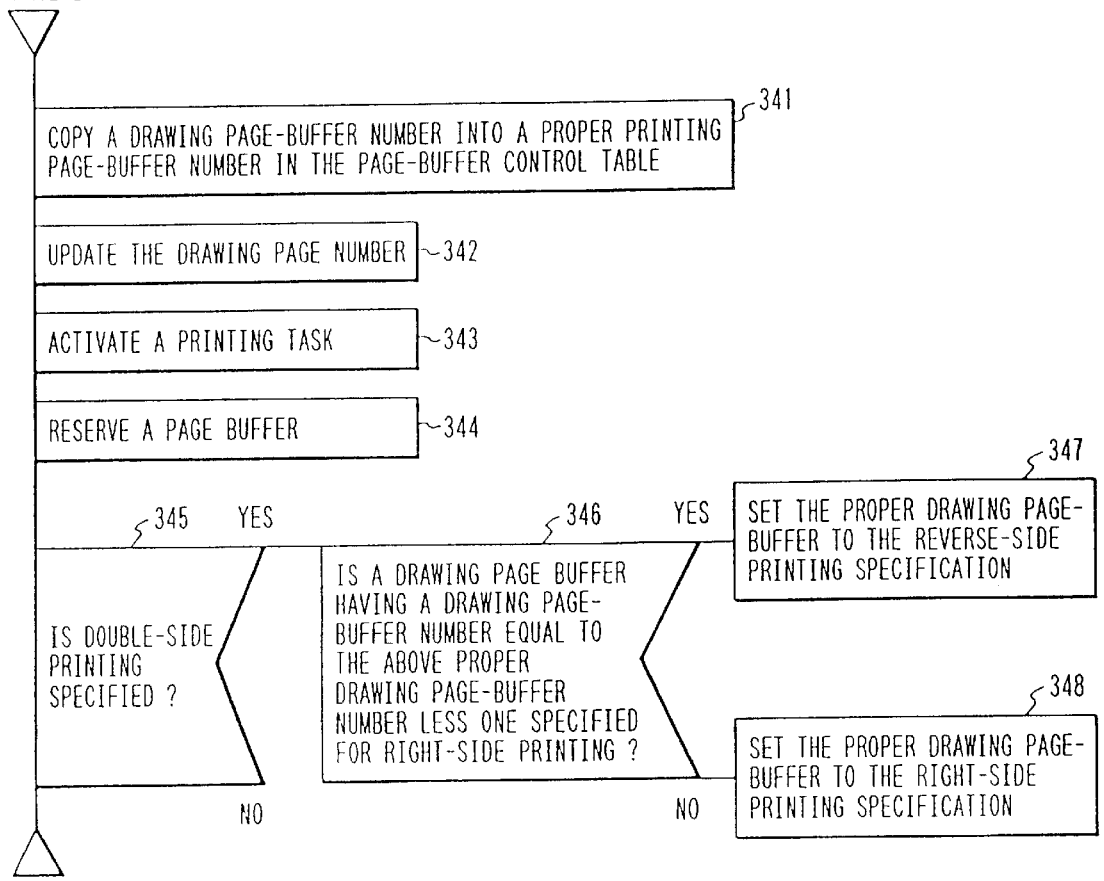
FIG. 34 is a diagram used for explaining a processing procedure of page-eject processing, part of the drawing task, provided by the present invention.

FIG. 34 shows details of the page-eject processing 2639 in FIG. 26. In FIG. 34, the proper drawing page-buffer number is first copied into a proper printing page-buffer number in the page-buffer control table at a step 341. The processing flow continues to a step 342 to update the drawing page number. Subsequently, the processing flow continues to a step 343 to activate a printing task and then to a step 344 to reserve a page buffer. The printing task is activated at the step 343 by a task activating macro which is issued with a printing page-buffer number specified as an input parameter. In this way, a printing page-buffer number can be passed to each printing task. The processing flow then continues to a step 345 to deter mine whether the page buffer having the proper drawing page-buffer number is specified for double-side printing. If double-side printing is specified at the step 345, the processing flow continues to a step 346 to determine whether a page buffer having a drawing page-buffer number equal to the above proper drawing page-buffer number less one is specified for right-side printing by referring to the single/double-side printing specifying code area 1405 for the page buffer. If right-side printing is specified at the step 346, the processing flow continues to a step 347 to set the right/reverse-side printing specifying code of the proper drawing page-buffer number to the reverse-side printing specification. If right-side printing is not specified at the step 346, on the other hand, the processing flow continues to a step 348 to set the right/reverse-side printing specifying code of the proper drawing page-buffer number to the right-side printing specification. The page buffer is reserved at the step 344 by issuing a page-buffer reserve macro with a default paper size specified. The default paper size is either an initial paper size at the head of a composition or the paper size of a previous page in the middle of a composition.

FIGS. 35 to 44 show details of the processing procedure of a printing task.

Figure 35:
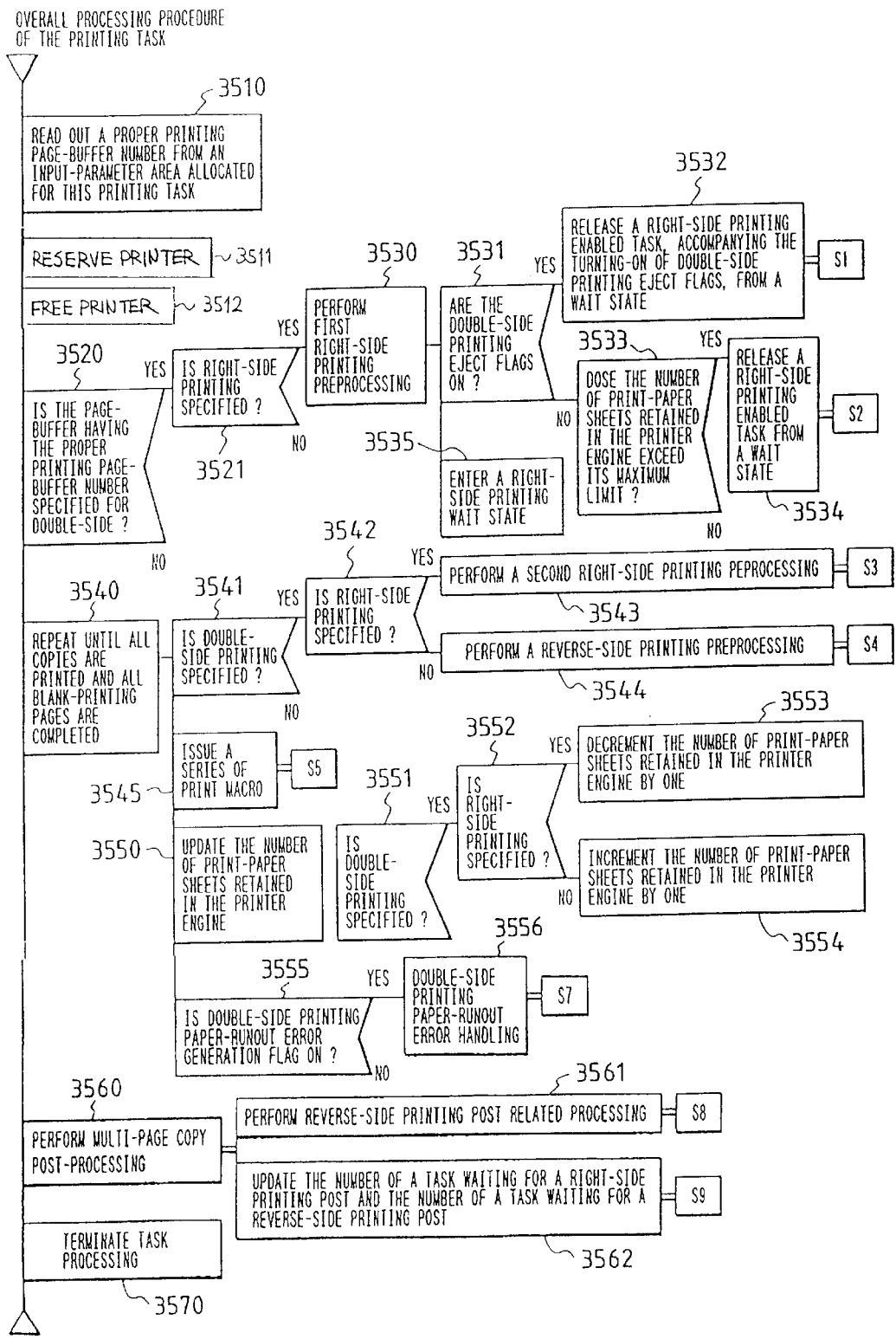
FIG. 35 is a diagram used for explaining a processing procedure of the printing task.

FIG. 35 shows an overall processing procedure of the printing task. As shown in the figure, the printing task reads out a proper printing page-buffer number from an input-parameter area allocated for this printing task at a step 3510, reserves a right of using the printer by a printer reserve macro at a step 3511, and frees a right of using the printer by a printer reserve macro at a step 3512. The proper printing page-buffer number is the number of a page buffer to undergo printing processing by this printing task. The processing flow then continues to a step 3520 to determine whether the page buffer having the proper printing page-buffer number is specified for double-side printing by referring to the single/double-side printing specifying code area 1405 for the page buffer. If double-side printing is specified at the step 3520, the processing flow continues to a step 3521 to deter mine whether the page buffer of the above proper printing page-buffer number is specified for right-side printing by referring to the single/double-side printing specifying code area 1405 for the page buffer. If right-side printing is specified at the step 3521, the processing flow continues to a step 3530 to perform a first right-side printing preprocessing which comprises steps 3531 to 3535. The first right-side printing preprocessing begins with the step 3531 to determine whether the double-side printing eject flags 1413 are on. If the double-side printing eject flags 1413 are on at the step 3531, the processing flow continues to the step 3532 to release a right-side printing enabled task, accompanying the ON double-side printing eject flags 1413, from a wait state. If the double-side printing eject flags 1413 are not on at the step 3531, on the other hand, the processing flow continues to the step 3533 to determine whether the number of sheets retained in the printer engine 1905 exceeds its maximum limit. If the number of sheets retained in the printer engine 1905 is at the step 3533 to exceed its maximum limit, the processing flow continues to the step 3534 to release a right-side printing enabled task from a wait state. The maximum number of sheets retainable in the printer engine is a parameter determined by the type of the printer engine, the paper size and the paper horizontal/vertical direction. Typically, the maximum number of sheets retainable in the printer engine is stored in advance in a table in the printing control apparatus 110 at initialization.

After the judgement at the step 3531, the processing flow continues to the step 3535 at which the printing task issues a right-side printing wait macro, entering a right-side printing wait state. Thereafter, the printing task executes the following processing procedure comprising steps 3541 to 3555 repeatedly as many times as the total number of copies to be printed and pages to be blank-printed. As a result, as much actual printing as required by the total number of copies to be printed and as much blank printing as required by the total number of blank pages to be produced are carried out.

(1) The processing procedure begins with the step 3541 to determine whether the page buffer having the proper printing page-buffer number is specified for double-side printing. If double-side printing is specified at the step 3541, the processing flow continues to the step 3542 to determine whether the page buffer of the above proper printing page-buffer number is specified for right-side printing by refer ring to the single/double-side printing specifying code area 1405 for the page buffer.

(2) If right-side printing is specified at the step 3542, the processing flow continues to the step 3543 to perform a second right-side printing preprocessing. If right-side printing is not specified at the step 3542, on the other hand, the processing flow continues to the step 3544 to perform a reverse-side printing preprocessing.

(3) At the step 3545, processing to issue a series of print macros is carried out.

(4) At the step 3550, the number of sheets retained in the printer engine 1905 is updated. In concrete terms, the updating is done as follows:

(4-1) First of all, the processing flow goes to the step 3551 to determine whether the page buffer having the proper printing page-buffer number is specified for double-side printing. If double-side printing is specified at the step 3551, the processing flow continues to the step 3552 to determine whether the page buffer of the above proper printing page-buffer number is specified for right-side printing by refer ring to the single/double-side printing specifying code area 1405 for the page buffer.

(4-2) If right-side printing is found specified at the step 3552, the processing flow continues to the step 3553 to decrement the number of sheets retained in the printer engine 1905 by one. If right-side printing is not specified at the step 3552, on the other hand, the processing flow continues to the step 3554 to increment the number of sheets retained in the printer engine 1905 by one.

(5) The processing procedure continues to the step 3555 to determine whether the double side printing paper run-out error is on. If the paper run-out error is on at the step 3555, the processing flow continues to the step 3556 to perform a double side printing paper run-out processing.

After executing the above processing procedure comprising the steps 3541 to 3556, the printing task performs multi-page copy post-processing 3560 which comprises reverse-side printing post related processing 3561 and processing 3562 to update the number of a task waiting for a right-side printing post and the number of a task waiting for a reverse-side printing post. Finally, the printing task issues a task-end macro, terminating the processing at a step 3570.

Figure 36:
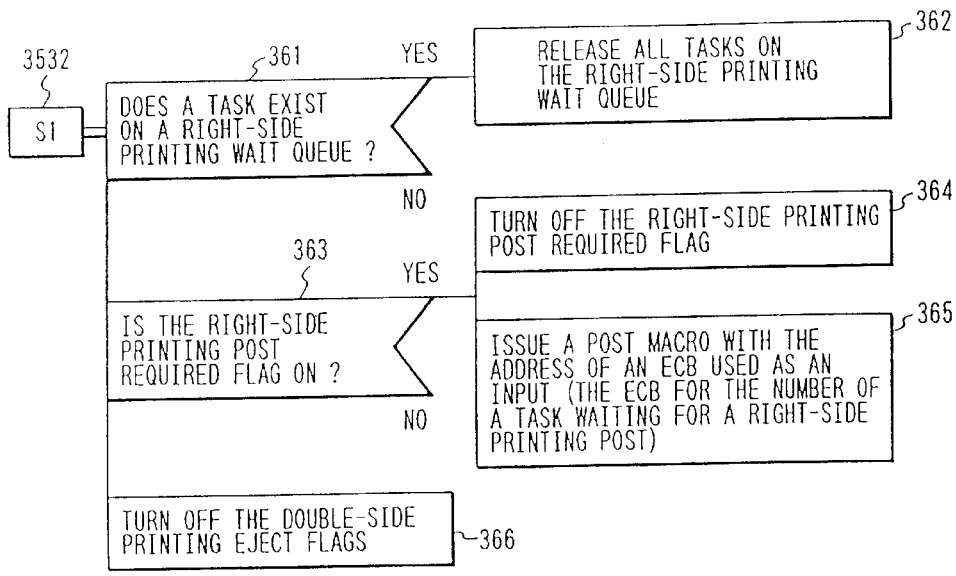
FIG. 36 is a diagram used for explaining a processing procedure followed by the printing task for releasing a right-side printing enable task from a wait state accompanying the turning-on of a bit in double-side printing eject flags provided by the present invention.

FIG. 36 shows a processing procedure at a step 3532 for releasing a right-side processing enable task from a wait state following the turning-on of the double-side printing eject flags. The processing flow begins with a step 361 to determine whether a task exits on a right-side printing wait queue. If a task exists on the right-side printing wait queue, the processing flow continues to a step 362 to release all tasks on the right-side printing wait queue, one after another starting with the task at the head of the queue, from a right-side printing wait state by issuing a right-side printing wait release macro shown in FIG. 47 in a release mode of one. The processing flow then continues to a step 363 to determine whether the right-side printing post required flag 1906 is turned on. If the right-side printing post required flag 1906 is on at the step 363, the flag is turned off at a step 364 before continuing to a step 365 to issue a post macro with the address of an ECB used as an input argument. The ECB (Event Control Block) is used for multi-page copy communication for the number of a task waiting for a right-side printing post 1907. After the processing is carried out in accordance with the judgement result of the step 363, the flow continues to a step 366 at which the right-side printing eject flag is turned off. The post macro (an event-occurrence wait release macro) and the corresponding wait macro (an event-occurrence wait macro) are the same as those disclosed in Japanese Patent Laid-open No. HEI 2-70465 and No. HEI 3-178466.

Figure 37:
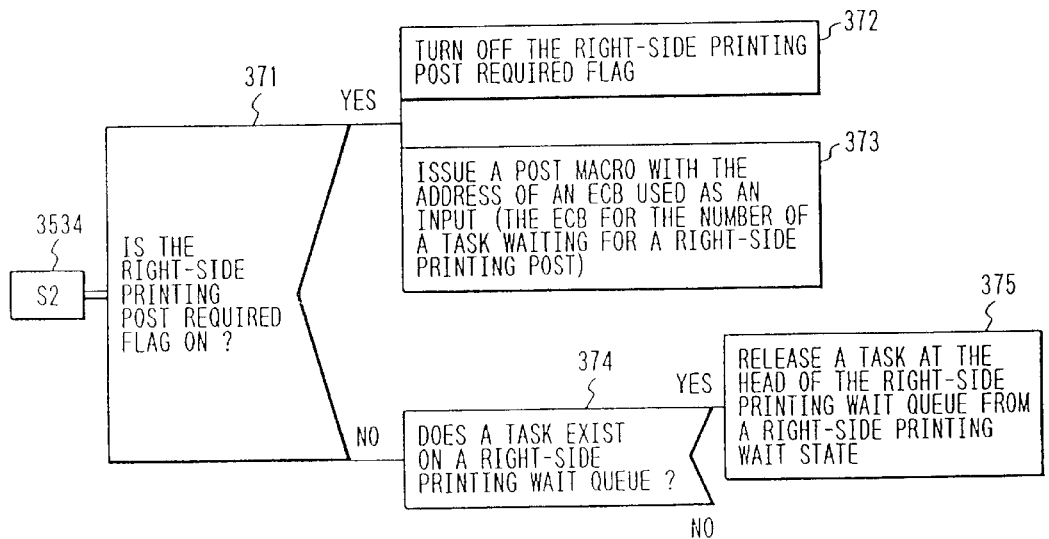
FIG. 37 is a diagram used for explaining a processing procedure followed by the printing task for releasing a right-side printing enable task from a wait state, at the time the maximum number of print-paper sheets retainable in a printer engine is reached, in accordance with the present invention.

FIG. 37 shows details of the procedure 3534 for releasing a right-side printing enable task at the time the maximum number of sheets retainable in the printer engine is reached. The processing flow begins with a step 371 to determine whether the right-side printing post required flag 1906 is turned on. If the right-side printing post required flag 1906 is on at the step 371, the flag is turned off at a step 372 before continuing to a step 373 to issue a post macro with the address of the ECB used as an input argument. As described earlier, the ECB is used for multi-page copy communication for the number of a task waiting for a right-side printing post 1907. If the right-side printing post required flag 1906 is off at the step 371, on the other hand, the processing flow continues to a step 374 to determine whether or not a task exits on the right-side printing wait queue. If a task exists on the right-side printing wait queue, the processing flow continues to a step 375 to release a task at the head of the right-side printing wait queue from a right-side printing wait state by issuing a right-side printing wait release macro shown in FIG. 47 with a release mode of zero.

Figure 38:
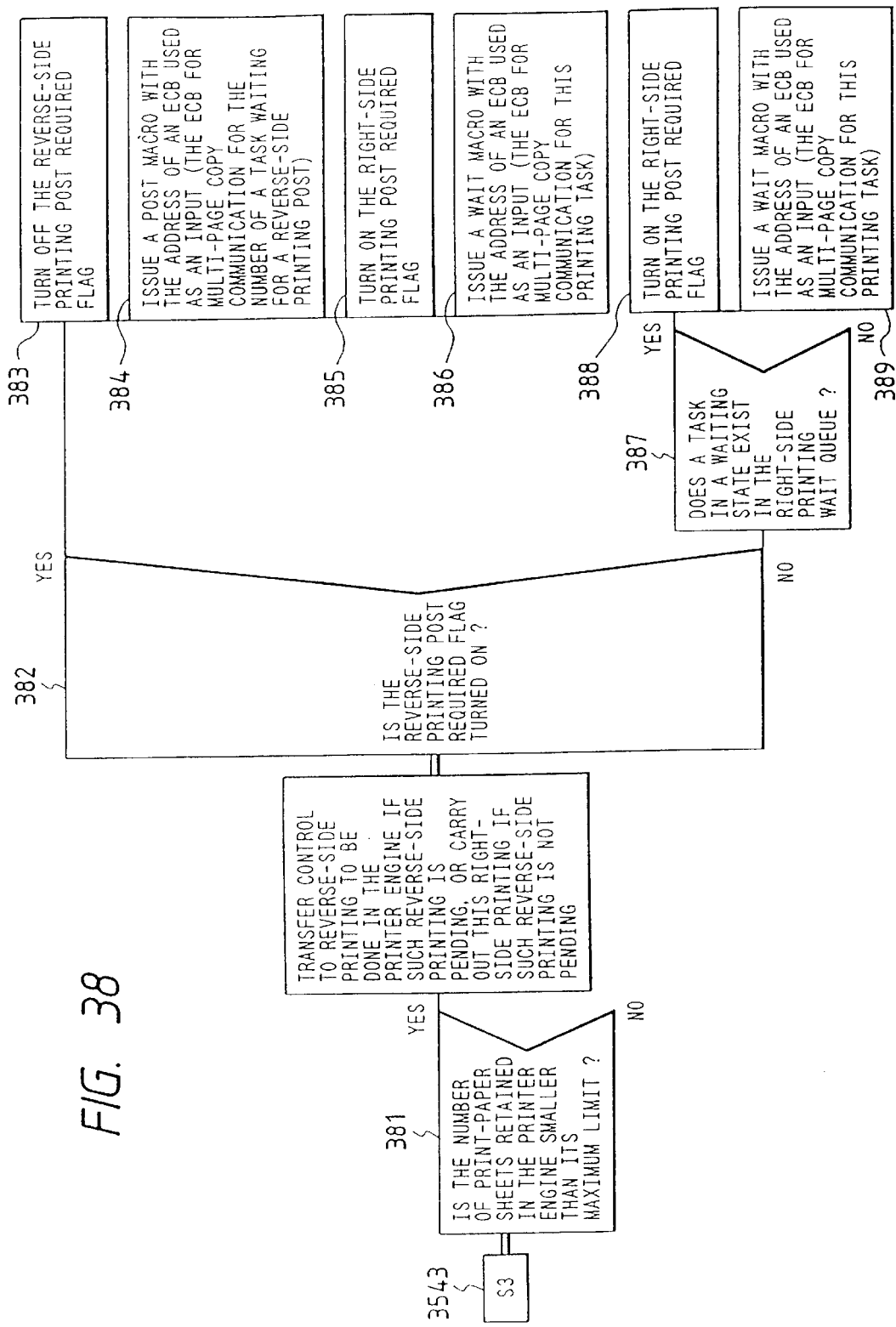
FIG. 38 is a diagram used for explaining a processing procedure of second right-side printing preprocessing, part of the printing task, provided by the present invention.

FIG. 38 shows the procedure of a second right-side printing preprocessing 3543. The second right-side printing preprocessing 3543 begins with a step 381 to determine whether the number of sheets retained in the printer engine 1905 is smaller than its maximum limit. If the number of sheets retained in the printer engine 1905 is smaller than its maximum limit, the processing flow goes through steps 382 to 389 to transfer control to reverse-side printing in order to accomplish the reverse-side printing in the printer engine if such reverse-side printing is pending, or to carry out this right-side printing if such reverse-side printing is not pending. First of all, the processing flow goes to the step 382 to determine whether the reverse-side printing post required flag 1908 is turned on. If the reverse-side printing post required flag 1908 is found on at the step 382, the flag is turned off at the step 383 before continuing to the step 384 to issue a post macro with the address of an ECB used as an input argument. The ECB is used for multi-page copy communication for the number of a task waiting for a reverse-side printing post 1909. After turning on the right-side printing post required flag 1906 at the step 385, the processing flow continues to the step 386 to issue a wait macro with the address of an ECB used as an input argument. If the reverse-side printing post required flag 1908 is found off at the step 382, the processing flow continues to the step 387 to determine whether a task in a waiting state exists in the right-side printing wait queue. If a task exists in the right-side printing wait queue, the processing flow continues to the step 388 to turn on the right-side printing post required flag 1906 and then to the step 389 for issuing a wait macro with the address of an ECB used as an input argument.

Figure 39:
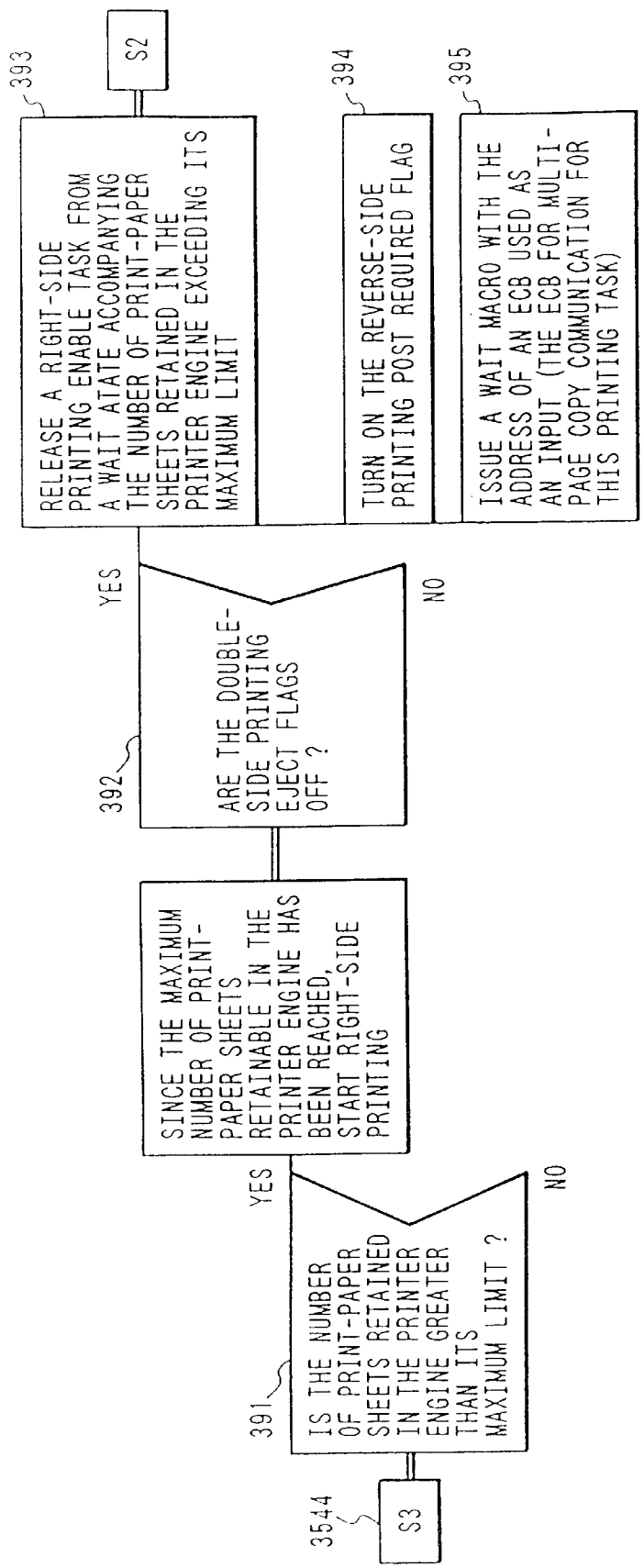
FIG. 39 is a diagram used for explaining a processing procedure of reverse-side printing preprocessing, part of the printing task, provided by the present invention.

FIG. 39 shows the procedure of a reverse-side printing preprocessing 3544. The reverse-side printing preprocessing 3544 begins with a step 391 to determine whether the number of sheets retained in the printer engine 1905 exceeds its maximum limit. If the number of sheets retained in the printer engine 1905 is exceeds its maximum limit, the processing flow goes through steps 392 to 399 to activate a right-side printing task because the maximum number of sheets retainable in the printer engine has been reached. If the number of sheets retained in the printer engine 1905 is smaller than its maximum limit, on the other hand, the processing flow continues to the processing of the step 3545 shown in FIG. 35, printing data on a reverse-side page assigned to this printing task. The processing flow then continues to the step 392 to determine whether the double-side printing eject flags are off. If the double-side printing eject flags are off, the processing flow continues to the step 393 to release a right-side printing enable task from a wait state. The processing procedure of the step 393 is the same as that shown in FIG. 37. Subsequently, the processing flow continues to the step 394 to turn on the reverse-side printing post required flag 1908 and then to the step 395 for issuing a wait macro with the ad dress of an ECB used as an input argument. As described earlier, the ECB is used for multi-page copy communication for this printing task.

Figure 40:
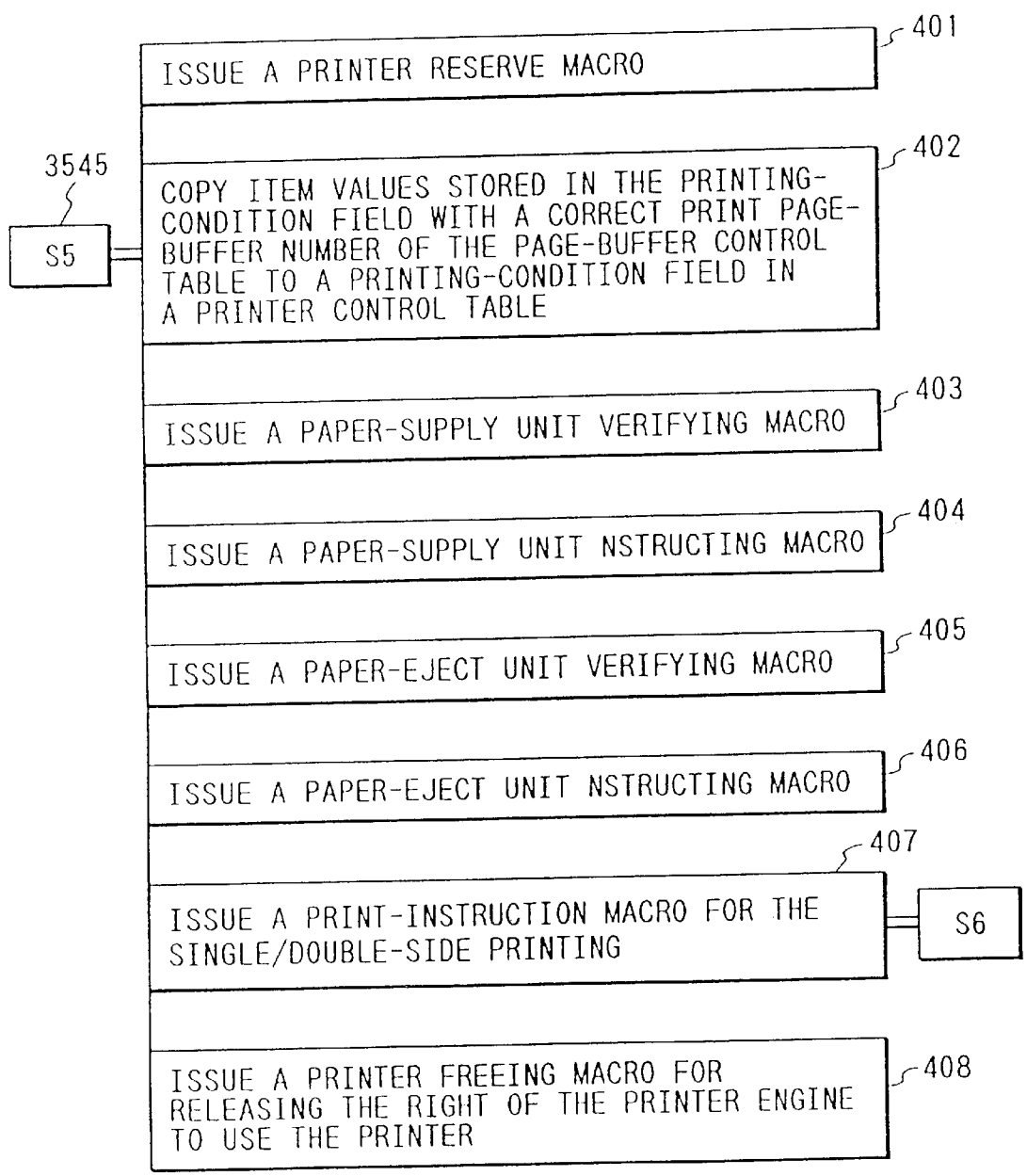
FIG. 40 is a diagram used for explaining a procedure of processing to issue a series of print macros, part of the printing task, provided by the present invention.

FIG. 40 shows the processing procedure 3545 for issuing a series of print macros. The processing procedure begins with a step 401 for issuing a printer reserve macro in order to obtain a right to use the printer. The processing flow then continues to a step 402 to copy item values stored in the printing-condition field with a correct printing page-buffer number of the page-buffer control table to a printing-condition field in a printer control table. Subsequently, the processing flow goes through a step 403 to issue a paper-supply unit verifying macro, a step 404 to issue a paper-supply unit instructing macro, a step 405 to issue a paper-eject unit verifying macro, a step 406 to issue a paper-eject unit instructing macro, a step 407 to issue a print-instruction macro for the single/double-side printing and a step 408 to issue a printer freeing macro which releases the right of the printer engine to use the printer. The functions of the printer control macros issued at the step 401 and the steps 403 to 408 are described in detail in FIGS. 45 and 47 respectively.

The object of the issuance of the printer reserve/free macro 3511/3512 is as follows.

(a) Each print task (print task A) reserve the right to using the printer by the printer reserve at the step 401 of FIG. 40 in the issuance of a series of print macro 3545 of FIG. 35, and processes the input/output with the printer engine 120 by issuing the print macros 403–407. Each print macro transfer the print task A to the input/output state in the input/output processing.

Figure 50:
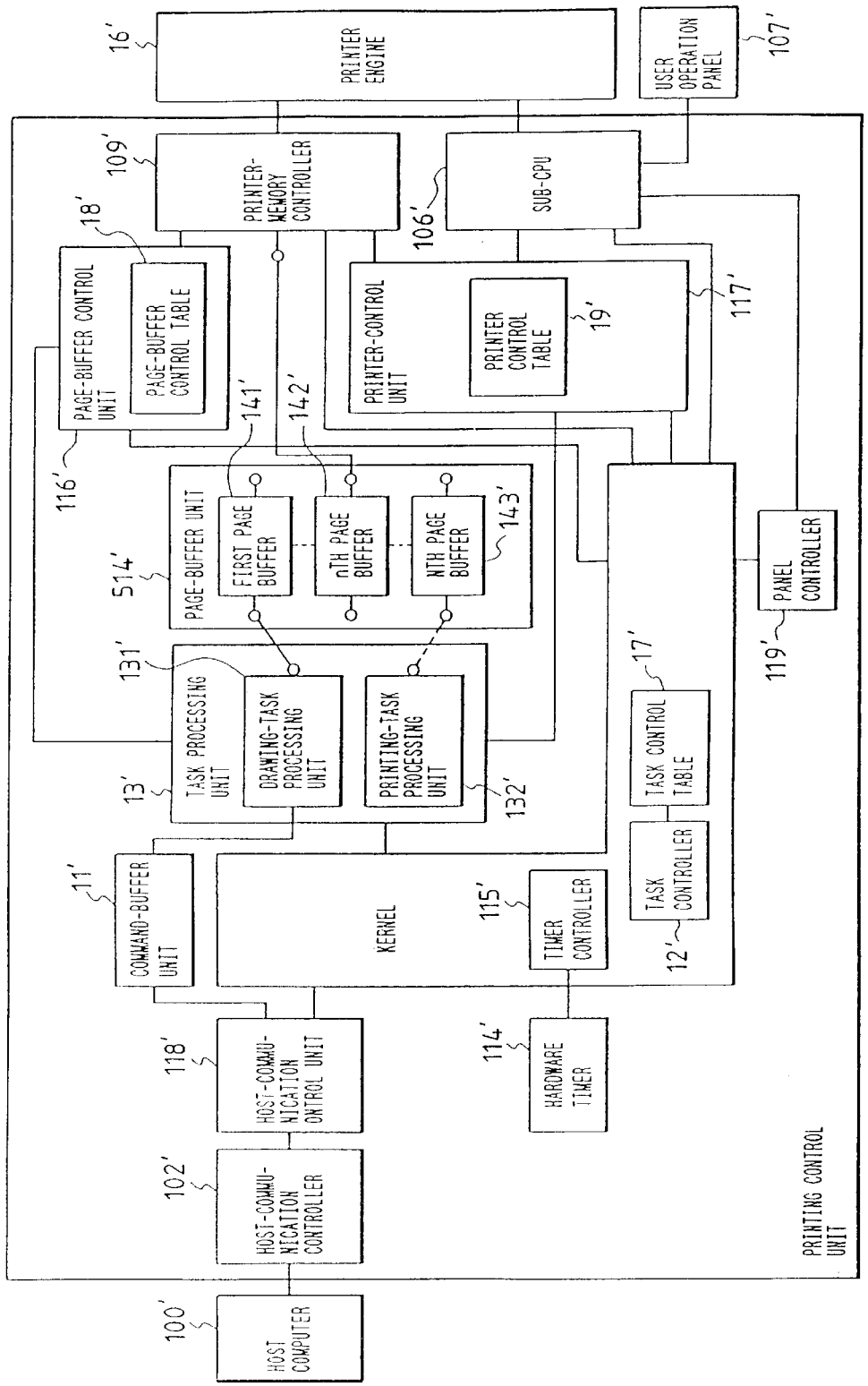
FIG. 50 is a diagram used for explaining a functional organization of a multi-tasking system provided by the present invention.

(b) At that time, Another print task B that is activated after the task A is occasionally moved to execution state by a task dispatcher function in a task control unit 12' shown in FIG. 50. The task dispatcher function and the function of the task control unit 12' are the same as those disclosed in Japanese Patent Laid-open No. HEI 2-70465 and No. HEI 3-178466.

(c) However, the print task B issues the print reserve macro at the step 3511 after the step 3510. Since the print task A has already reserved the right of using the printer at the step 401, the print task B is put on a state for waiting the reservation of the right of using the printer.

(d) It is prevented by these operation that the print task B carries out the steps 3520–3570.

(e) The print task B is freed from the state for waiting the reservation of the right of using the printer and reserves the right of using the printer after the print task A has issued the printer free macro and freed the the right of using the printer.

(f) The printing following the page order of FIG. 12 is carried out with these operation.

(g) If the printer reserve/free macro are not issued, the print task B carries out the steps 3520–3570 because the operation (c) is not carried out. Therefore, unexpected renewal of the number of pages retained in the printer engine and unexpected reservation or release of the right side printing wait state is carried out. The printing following the page order of FIG. 12 cannot be carried out for this reason, and a result of the printing is very confusing for an user.

Figure 41:
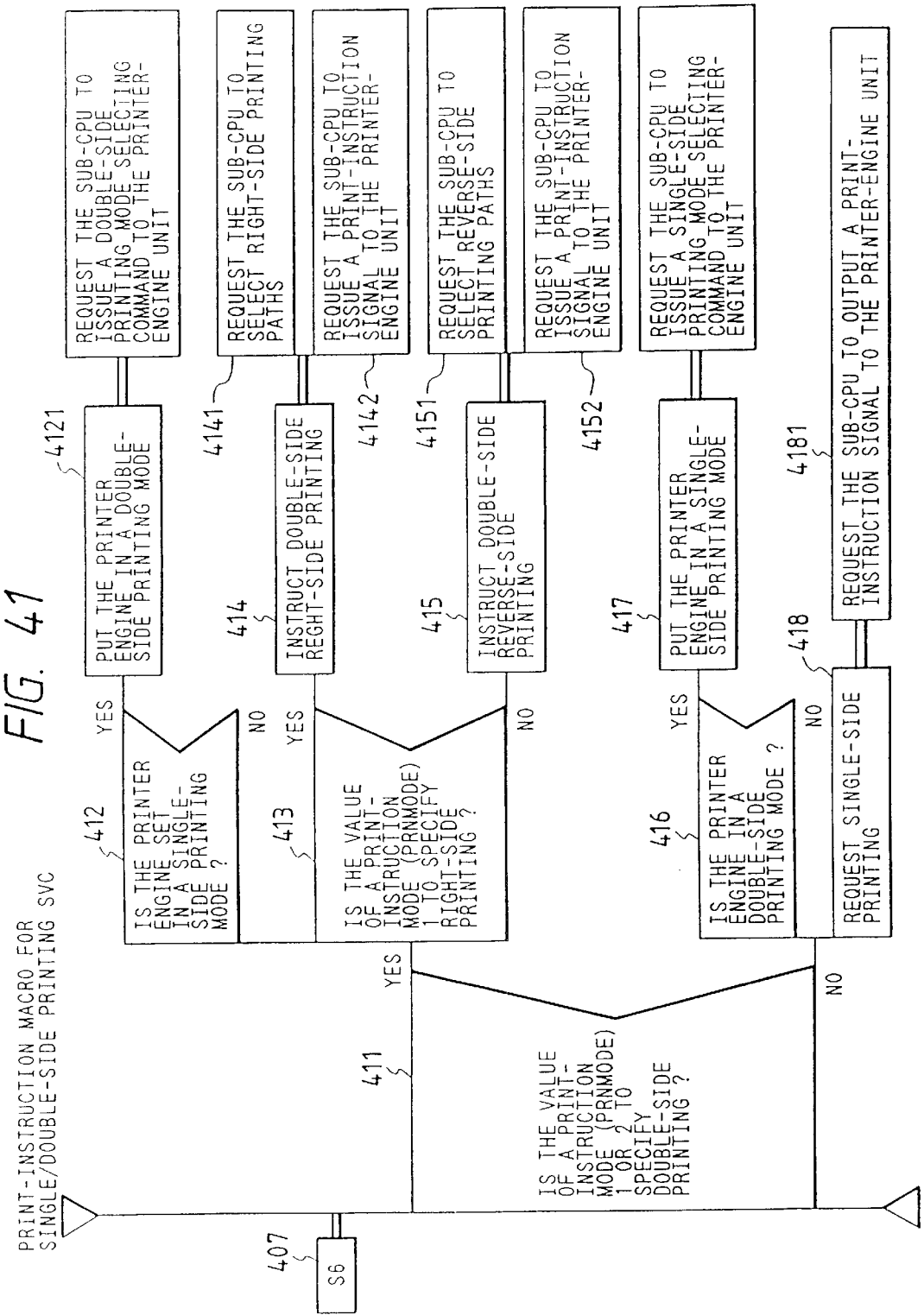
FIG. 41 is a diagram used for explaining a processing procedure of a print instruction for double-side printing, part of the printing task, provided by the present invention.

FIG. 41 shows the processing procedure 407 of the print-instruction macro for the single/double-side printing. The print-instruction macro 407 is an extension of a print-instruction macro for the single-side printing disclosed in Japanese Patent Laid-open No. HEI 2-70465 and No. HEI 3-178466. The print-instruction macro is extended into this print-instruction macro which allows the macro to be applied to the single and double-side printing. Even though its detailed implementation may vary a little bit depending upon the specification of the printer-engine unit 120, the print-instruction macro for the single/double-side printing can be implemented in a uniform way. A typical implementation is described below. As shown in FIG. 41, the processing procedure begins with a step 411 to determine whether the value of a print-instruction mode (prnmode) is 1 or 2 to specify double-side printing. The print-instruction mode is an input parameter to this macro. If double-side printing is specified, the processing flow goes through steps 412 to 4152 in order to execute the following processings.

(1) The step 412 determines whether the printer engine is set in a single-side printing mode. If the printer engine is in a single-side printing mode, the processing flow continues to the step 4121 at which the sub-CPU 96 is requested to issue a double-side printing mode selecting command to the printer-engine unit 120 in order to put the printer engine in a double-side printing mode.

(2) The processing flow then continues to a step 413 to determine whether the value of a print-instruction mode (prnmode) is 1 to specify right-side printing. If right-side printing is specified, the processing flow continues to a step 414 to instruct double-side right-side printing. In concrete terms, the processing at the step 414 is accomplished as follows. At a step 4141, the sub-CPU 96 is requested to select right-side printing paths. At a subsequent step 4142, the sub-CPU 96 is requested to issue a print-instruction signal to the printer-engine unit 120. If reverse-side printing is specified at the step 413, the processing flow continues to a step 415 to instruct double-side reverse-side printing. In concrete terms, the processing at the step 415 is accomplished as follows. At a step 4151, the sub-CPU 96 is requested to select reverse-side printing paths. At a subsequent step 4152, the sub-CPU 96 is requested to issue a print-instruction signal to the printer-engine unit 120.

Figure 4:
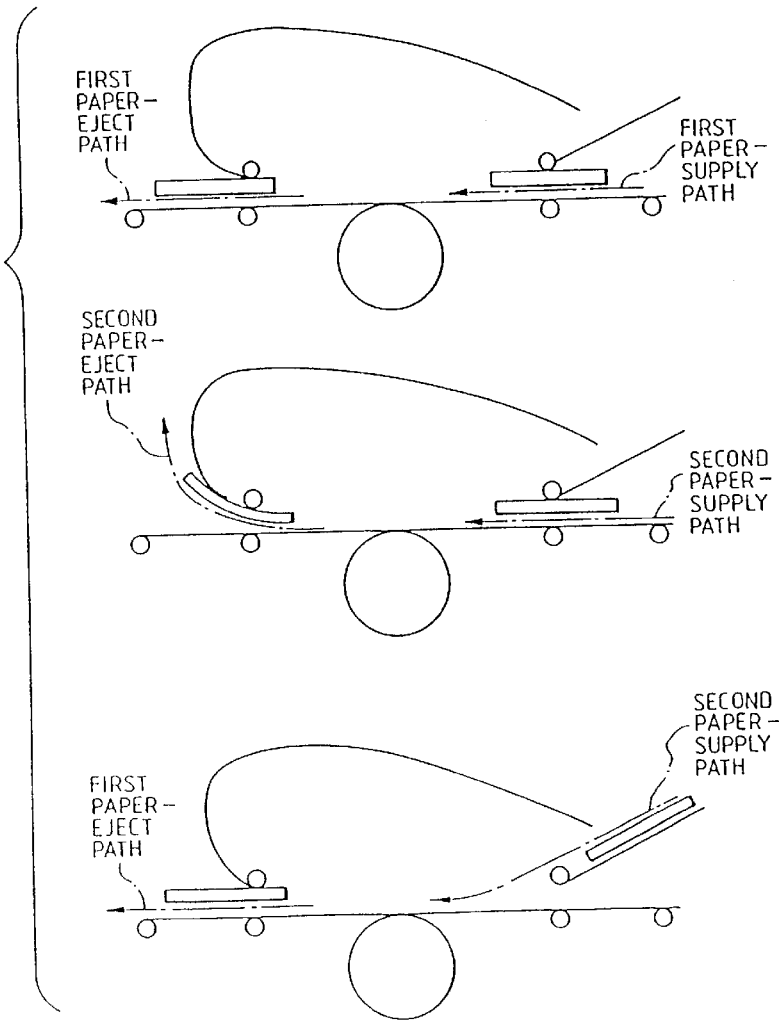
FIG. 4 is an explanatory diagram used for explaining single and double-side printing techniques using the rotation-type double-side printing mechanism.

The right-side printing paths selected at the step 4141 are a second paper-supply path and a first paper-eject path shown in FIG. 4 to be used as second-half printing paths. The reserve-side printing paths selected at the step 4151 are a first paper-supply path and a second paper-eject path shown in FIG. 4 to be used as first-half printing paths. The printing paths are selected using a technique which is appropriate for the specification of the printer-engine unit 120. Prior to the processing at the step 4141, the printing paths can be checked to see if they are the right-side printing paths already selected before. If the printing paths have been selected before, the processing of the step 4141 can be omitted. The prior checking of printing paths can also be applied to the processing at the step 4151.

If double-side printing is specified at the step 411, the processing flow goes through steps 416 to 418 to execute the following processings.

(1) The step 416 is taken to determine whether the printer engine is in a double-side printing mode. If the printer engine is in a double-side printing mode at the step 416, the processing flow continues to the step 417 at which the sub-CPU 96 is requested to issue a single-side printing mode selecting command to the printer-engine unit 120 in order to put the printer engine in a single-side printing mode.

(2) The processing flow then continues to a step 418 in order to request single-side printing which is accomplished by taking a step 4181. At the step 4181, the sub-CPU 96 is requested to output a print-instruction signal to the printer-engine unit 120.

The sub-CPU 96 is requested at the steps 4142, 4152 and 4181 to issue print-instruction signals to the printer-engine unit 120 so as to complete the drawing for the printing page buffer in question and make the page buffer ready for printing. The printer-engine unit 120 is notified through a command or a signal output by the sub-CPU 96 or the CPU 93 of the fact that the printing page buffer is readily available for printing. The printer-engine unit 120 is designed so that there is no excessive time delay in the printing process. In the case of a printer-engine unit not equipped with this function, the above processing is not required in particular.

Figure 42:
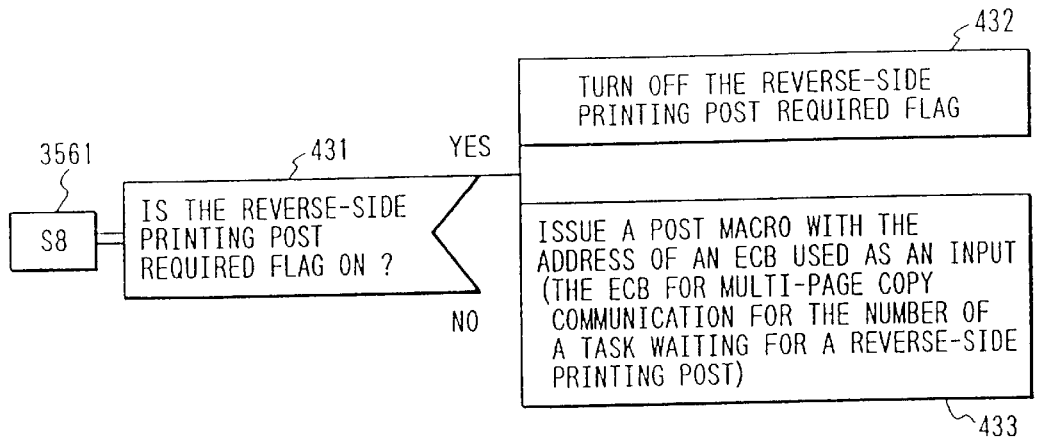
FIG. 42 is a diagram used for explaining a processing procedure of reverse-side printing post related processing, part of the printing task, provided by the present invention.

FIG. 42 shows a processing procedure for the reverse-side printing post related process 3561. The processing procedure begins with a step 431 to determine whether the reverse-side printing post required flag 1908 is on. If the reverse-side printing post required flag 1908 is on, the flag is turned off at a step 432 before continuing to a step 433 to issue a post macro with the address of an ECB used as an input argument. The ECB is used for multi-page copy communication for the number of a task waiting for a reverse-side printing post 1909.

Figure 51:
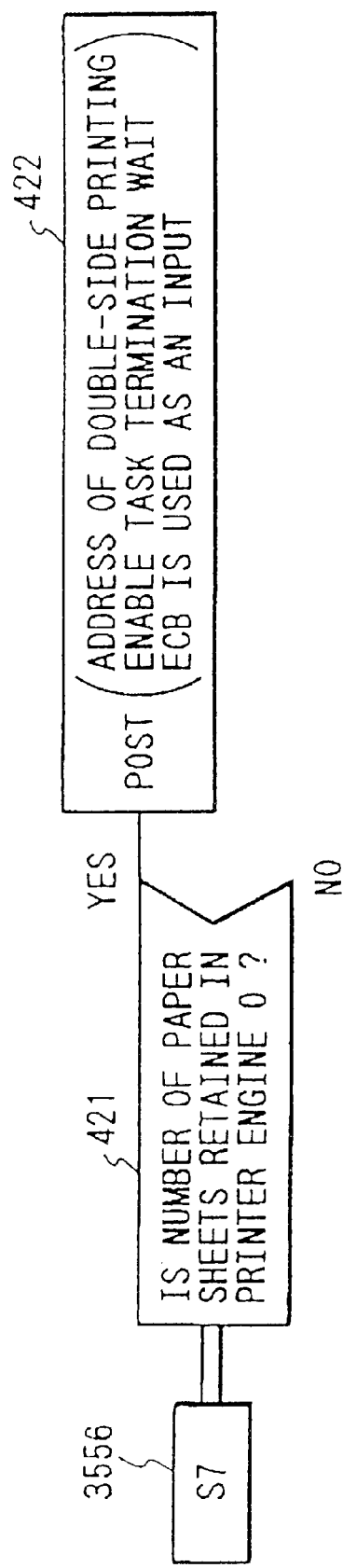
FIG. 51 is a diagram of a processing procedure for a paper-runout error in the double-side printing.

FIG. 51 shows a processing procedure for the double side printing paper run-out process 3556. The processing procedure begins with a step 421 to determine whether the number of sheets retained in the printer engine is "0" after the steps 3545 and 3550. If the the number of sheets retained in the printer engine is "0", a post macro is issued with the address of an ECB used as an input argument at a step 422. The ECB is used for multi-page copy communication for the number of a task waiting for a reverse-side printing post 1907.

Figure 43:
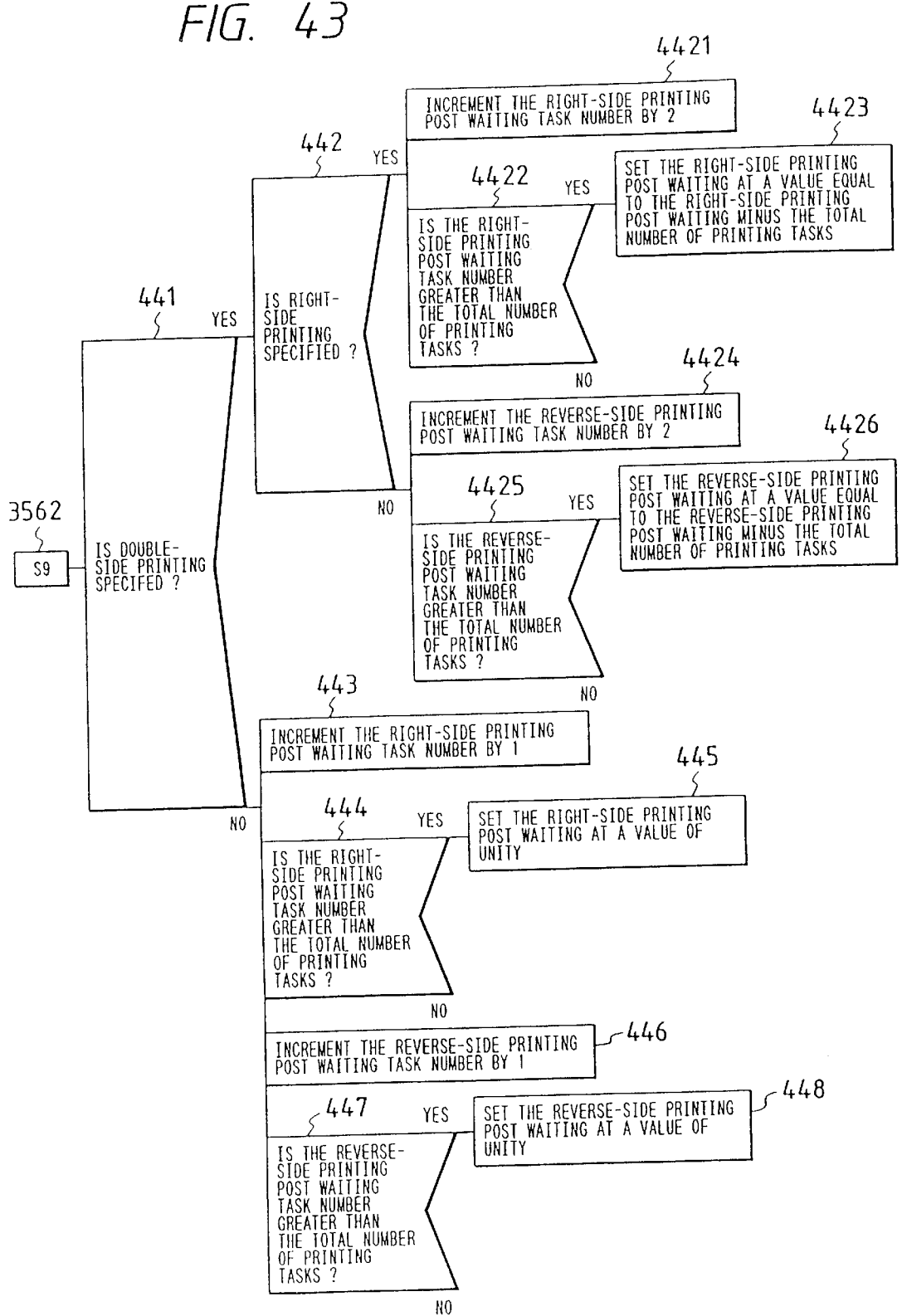
FIG. 43 is a diagram used for explaining a processing procedure for updating the number of a right-side printing post wait task and the number of a reverse-side printing post wait task, part of the printing task, provided by the present invention.

FIG. 43 shows the processing procedure 3562 for updating the number of a right-side printing post waiting task and the number of a reverse-side printing post waiting task. The processing flow begins with a step 441 to determine whether a page buffer having the proper drawing page-buffer number is specified for double-side printing by referring to the single/double-side printing specifying code area 1405 for the page buffer. If double-side printing is specified, the processing flow continues to a step 442 to determine whether the page buffer having the proper drawing page-buffer number is specified for right-side printing by referring to the right/reverse-side printing specifying code area 1406 for the page buffer. If right-side printing is specified, the processing flow continues to a step 4421 to increment the right-side printing post waiting task number 1907 by 2. The processing flow then continues to a step 4422 to determine whether the right-side printing post waiting task number 1907 is greater than the total number of printing tasks. If the right-side printing post waiting task number 1907 is greater than the total number of printing tasks, the processing flow continues to a step 4223 to set the right-side printing post waiting task number 1907 at a value equal to the right-side printing post waiting task number 1907 minus the total number of printing tasks. If right-side printing is not specified at the step 442, the processing flow continues to a step 4424 to increment the reverse-side printing post waiting task number 1909 by 2. The processing flow then continues to a step 4425 to determine whether the reverse-side printing post waiting task number 1909 is greater than the total number of printing tasks. If the reverse-side printing post waiting task number 1909 is greater than the total number of printing tasks, the processing flow continues to a step 4226 to set the reverse-side printing post waiting task number 1909 at a value equal to the reverse-side printing post waiting task number 1909 minus the total number of printing tasks. If double-side printing is not specified at the step 441, the processing flow continues to a step 443 to increment the right-side printing post waiting task number 1907 by 1. The processing flow then continues to a step 444 to determine whether the right-side printing post waiting task number 1907 is greater than the total number of printing tasks. If the right-side printing post waiting task number 1907 is greater than the total number of printing tasks, the processing flow continues to a step 445 to set the right-side printing post waiting task number 1907 at a value of unity. Subsequently, the processing flow continues to a step 446 to increment the reverse-side printing post waiting task number 1909 by 1. The processing flow then continues to a step 447 to determine whether the reverse-side printing post waiting task number 1909 is greater than the total number of printing tasks. If the reverse-side printing post waiting task number 1909 is greater than the total number of printing tasks, the processing flow continues to a step 448 to set the reverse-side printing post waiting task number 1909 at a value of unity.

Figure 44:
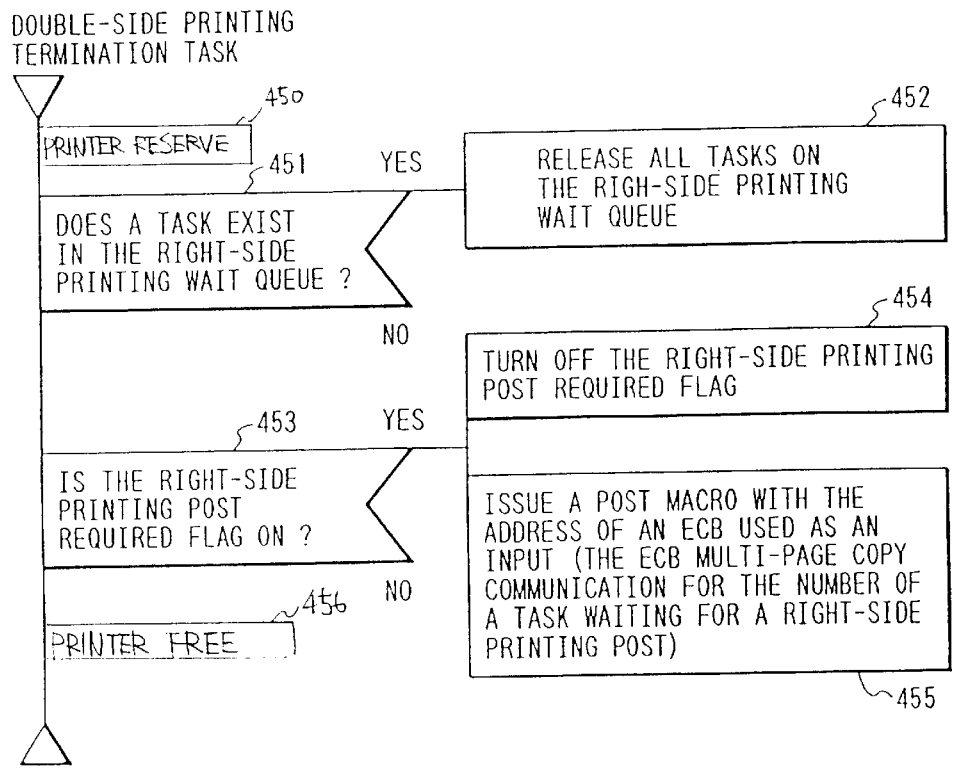
FIG. 44 is a diagram used for explaining a processing procedure of a double-side printing termination printing task provided by the present invention.

FIG. 44 also shows a processing procedure of the double-side printing termination task. First of all, this task issues the printer reserve macro and reserves the right of using the printer at a step 450. The double-side printing termination task continues to a step 451 to examine whether a waiting task exist in the right-side printing wait queue. If a task exists on the right-side printing wait queue, the processing flow continues to a step 452 to release all tasks on the right-side printing wait queue, one after another starting with the task at the head of the queue, from a right-side printing wait state by issuing a right-side printing wait release macro cited earlier with a release mode of one. The processing flow then continues to a step 453 to determine whether the right-side printing post required flag 1906 is turned on. If the right-side printing post required flag 1906 is on, the flag is turned off at a step 454 before continuing to a step 455 to issue a post macro with the address of an ECB used as an input argument. The ECB is used for multi-page copy communication for the number of a task waiting for a right-side printing post 1907. Finally, the double-side printing termination task issues the printer free macro to free the right of using the printer at a step 456.

Object of issuing the printer reserve/free macro 450/456 is as follows.

(a) It is prevented to carry out the double side printing terminate task before the print task that issued before issuance of the double side printing terminate task is carried out. This provides the printing following the page order shown in FIG. 12.

(b) To give an example of a series of commands shown in FIG. 5, The print tasks for 1st, 2nd and 3rd pages reserve the right of using the printer in issuance of a series of print commands 3545 at the step 401. Thereafter, these tasks carry out input/output processing with printer engine unit 120 by issuing the print macros 403–407. The print macros move the print task that issued the macro to the input/output wait state.

(c) At that time, the double side printing terminate task that is activated after the print tasks is occasionally moved to execution state by a task dispatcher function in a task control unit 12' shown in FIG. 50.

(d) However, the double side printing terminate task issues the print reserve macro at the step 450. Since the print tasks have already reserved the right of using the printer at the step 401, the double side printing terminate task is put on a state for waiting the reservation of the right of using the printer.

(e) It is prevented by these operation that the double side printing terminate task carries out the steps 451–455.

(f) The double side printing terminate task is freed from the state for waiting the reservation of the right of using the printer and reserves the right of using the printer after the latest print task (the print task for 3rd page) has issued the printer free macro and freed the the right of using the printer.

(g) The printing following the page order of FIG. 12 is carried out with these operation.

(h) If the printer reserve/free macro are not issued, the the double side printing terminate task that issued after the issuance of the print tasks carries out the steps 451–455 because the operation (d) is not carried out. Therefore, unexpected release of the right side printing wait state and the right-side printing post related process is carried out. The printing following the page order of FIG. 12 cannot be carried out for this reason, and a result of the printing is very confusing for an user.

FIG. 45 shows functions of page-buffer control macros. The functions are the same as those of the macros disclosed in Japanese Patent Laid-open No. HEI 3-178466. The page-buffer control macros are used to reserve, release and re-reserve page buffers. In the case of this embodiment, the functions of the macros are extended to include the following new capabilities in order to keep up with the double-side printing:

(1) Searching for available page buffers

The search for an available page buffer is started with a page buffer following the one allocated last. If the page buffer following the one allocated last is being used, the next page buffer is checked. The search is continued in this way until an available page buffer is found. If no available page buffer is found even if all page buffers have been searched, the task is put in a state waiting for a page buffer to become available.

Let page buffer No. 6 be a page buffer last reserved. In this case, the search for an available page buffer for the next page is started with page buffer No. 7. If page buffer No. 7 is not used, it is reserved. If it is used, the search is continued starting with page buffer No. 8 before going through the subsequent page buffers, one after another.

(2) Reserving and re-reserving page buffers The description so far assumes that the unit of a page buffer is the A4 size. This is because, with B5 size taken as a page-buffer unit, reserving a page buffer with a size of A3 will allocate memory excessively. It should be noted, however, that the B5 size can also be taken as a page-buffer unit to give the same implementation.

(a) Input-paper size smaller than A4 A page buffer of the A4 unit is reserved even if a paper size smaller than A4 such as A5 and B5 is requested.

(b) Input-paper size greater than A4

A page buffer is reserved in two-A4-size units (equal to one-A3-size unit), for a requested paper size greater than A4 but smaller than A3 such as B4 and and for A3. In FIG. 49 for example, pairs of page buffers like page buffers Nos. 0 and 1 and page buffers Nos. 2 and 3 are reserved to give two two-A4-size units.

Assume that three page buffers of Nos. 0 to 2 each with an A4 size are already used as shown in FIG. 49. Let a paper size larger than A4 be requested next. In this case, the search for a pair of available page buffers is started with a next unoccupied page buffer having an even number. The first pair of page buffers treated as a target of the search is therefore buffers Nos. 4 and 5 instead of Nos. 3 and 4. The page buffers Nos. 4 and 5 are selected in order to avoid wasteful usage of memory. If a pair of page buffers can start with one having an odd number such as Nos. 3 and 4, then the ten page buffers Nos. 0 to 9 can be allocated to a maximum of four A3-size pages. This is because such A3-size pages cannot occupy the ten page buffers continuously. If a pair of page buffers can start only with one having an even number such as Nos. 4 and 5, however, then the ten page buffers Nos. 0 to 9 can be allocated to up to five A3-size pages.

FIGS. 46, 47 and 48 shows printer control macros which are provided.

(a) Printer initialize
(b) Ready-state verify
(c) Single/double-side printing print instruct
(d) Paper-supply unit verify
(e) Paper-eject unit specify
(f) Paper-eject unit verify
(g) Paper-supply unit specify
(h) Printer reserve
(i) Printer free
(j) Right-side printing wait
(k) Right-side printing wait release
(l) First-half printing termination paper eject
(m) Printer-status change
(n) Error-code verify Most of the above printer control macros are the same as those disclosed in Japanese Patent Laid-open No. HEI 2-70465 and 3-178466 except that in order to make the present invention keep up with double-side printing, the macros (d), (e), (f), (g) and (n) of this embodiment have extended functions and the macros (c), (i), (k), (l) and (m) are newly added.

Next, a technique for processing a paper-runout error is explained by referring to FIGS. 53 to 57. In the event of a paper-runout error, the printer controller 110 enters a suspended state referred to as a hold state, remaining in this state until paper is replenished. As soon as paper is replenished, the printer is released from the hold state to resume the temporarily suspended printing. In the case of double-side printing, resuming the processing in the same way as single-side printing will inevitably leave sheets retained in the printer engine as they are. Accordingly, when a paper-runout error occurs in the course of double-side printing, second-half printing is performed on the right-side pages of any sheets left in the printer engine ejecting them. Then, the printer controller 110 enters the hold state, remaining in this suspended state until paper is replenished. As paper is replenished, the printing is again resumed, starting therefrom. A paper-runout error is always generated and detected in the course of reverse-side printing (first-half printing).

When a paper-runout error is detected, the suspend task and the print task execute the procedure described in item (d) of essential point (7) for the printing tasks given earlier. The processing procedure executed by the suspend task for releasing right-side printing enabled tasks from a wait state is explained below for the following cases: synchronous and asynchronous errors as well as single and multi-page copy processings.

1. Synchronous Paper-Runout Errors 1.1 Single-Page Copy Processing Procedure

In the processing of paper-runout error detected in the course of a single-page copy operation, all printing task on a right-side printing wait queue are released from a wait state except a printing task for a right-side page on which the paper-runout error has been detected.

Figure 53:
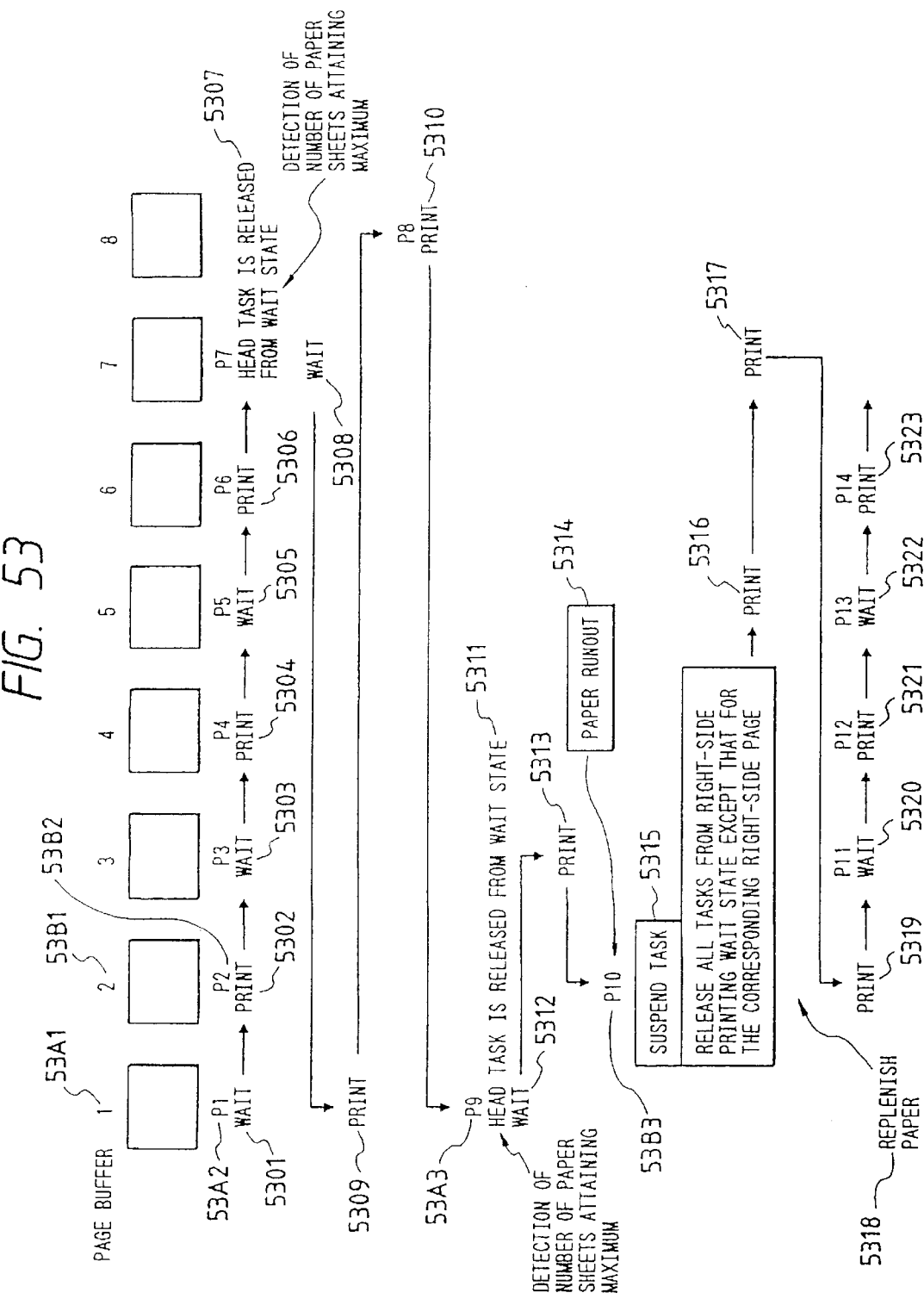
FIG. 53 is a diagram for explaining the processing procedure for a paper-runout error detected when printing on a page with a sequence number in the double-side printing.

FIG. 53 shows a case in which a paper-runout error is detected in the course of printing data on a page with a sequence number 10 referred to hereafter as P10 (Pi denotes a page having a sequence number i.). In this case, printing task P5 and P7 on a right-side printing wait queue are released from a wait state for printing operations. FIG. 53 is described in more detail as follows:

In FIG. 53, the printing task's processing of print data drawn in a page buffer is shown right below the page buffer. For example, the following processing is shown right below a page buffer 1 denoted by reference numeral 53A1:

First of all, reference numeral 5301 denotes a right-side printing wait state indicated merely by notation 'wait' of a printing task for a page with a sequence number 1 denoted by notation P1 and reference numeral 53A2; and reference numeral 5309 denotes a printing operation.

Similarly, the following processing is shown right below a page buffer 2 denoted by reference numeral 53B1:

First of all, reference numeral 5302 denotes a right-side printing wait state indicated merely by notation 'wait' of a printing task for a page with a sequence number 2 denoted by notation P2 and reference numeral 53B2;

Subsequently, reference numeral 5315 denotes the activation of a suspend task due to the processing of an error released to a printing task for a page with a sequence number 10 denoted by notation P10 and and reference numeral 53B3; and reference numeral 5319 denotes a right-side printing wait state of this printing task.

The processing procedure shown in the FIG. 53 is explained as follows:

(1) The printing task for a page with a sequence number 1 denoted by notation P1 and reference numeral 53A2 enters a right-side printing wait state 5301.

(2) The printing task for a page with a sequence number 2 denoted by notation P2 and reference numeral 53B2 carries out printing 5302.

(3) Thereafter, the printing task for a page with a sequence number 3 enters a right-side printing wait state 5303, the printing task for a page with a sequence number 4 carries out printing 5304, the printing task for a page with a sequence number 5 enters a right-side printing wait state 5305 and printing task for a page with a sequence number 6 carries out printing 5306.

(4) Next, the printing task for a page with a sequence number 7 detects an occurrence of the number of sheets retained in the printer engine achieving its maximum, releasing a printing task at the head of a right-side printing wait queue from a right-side printing wait state 5307. As a result, the head printing task is removed from the right-side printing wait queue. This printing task itself then transits to a right-side printing wait state 5308.

(5) The printing task released from the right-side printing wait queue 5307 carries out printing 5309 on a page with a sequence number 1.

(6) The printing task for a page with a sequence number 8 denoted by notation P8 performs printing 5310.

(7) The printing task for a page with a sequence number 9 denoted by notation P9 and reference numeral 53A3 detects an occurrence of the number of sheets retained in the printer engine achieving its maximum, releasing a printing task at the head of a right-side printing wait queue from a right-side wait state 5311. This printing task itself then transits to a right-side wait state 5312.

(8) The printing task released from the right-side printing wait queue 5311 carries out printing 5313 on a page with a sequence number 3.

(9) When the printing task for the page with a sequence number 10 denoted by notation P10 makes an attempt to carry out printing, a paper-runout error 5314 is generated.

(10) The processing of the error related to the printing task for the page with a sequence number 10 denoted by notation P10 activates the suspend task. The suspend task releases all the printing tasks from a right-side printing wait state 5315 except the one corresponding the right-side page.

(11) Upon the releasing of the printing tasks from a right-side wait state 5315, the printing task for a page with a sequence number 5 and the printing task for a page with a sequence number 7 perform printing operations 5316 and 5317 respectively.

(12) The user or a person in charge of system maintenance replenishes paper 5318.

(13) As soon as paper is replenished, the printing task for a page with a sequence number 10 denoted by notation P10 carries out printing 5319.

(14) Thereafter, the printing task for a page with a sequence number 11 enters a right-side printing wait state 5320, the printing task for a page with a with a sequence number 12 carries out printing 5321, the printing task for a page with a sequence number 13 enters a right-side printing wait state 5322 and the printing task for a page with a sequence number 14 carries out printing 5323.

1.2 Multi-Page Copy Processing Procedure

In the processing of a paper-runout error detected in the course of a multi-page copy operation, first of all, the number of copies completing printing for the page of the paper-runout error is examined. If all copies have been printed, the number of blank-printed copies produced up to the present is made the number of copies completing printing. Otherwise, the number of present page copies is made the number of page copies completing printing.

If the number of page copies completing printing is zero, all printing tasks on the right-side print wait queue are released from a wait state except the right-side printing task associated with a page on which a paper-runout error has been generated.

If the number of page copies completing printing is greater than zero, all printing tasks up to, inclusively, the right-side page printing task associated with a page generating a paper-runout error on the right-side printing wait queue are released from a wait state. Then, if the right-side printing post required flag is on, the flag is turned off before a post macro is issued for executing a operation to release a task from a right-side printing post wait state.

Figure 54:
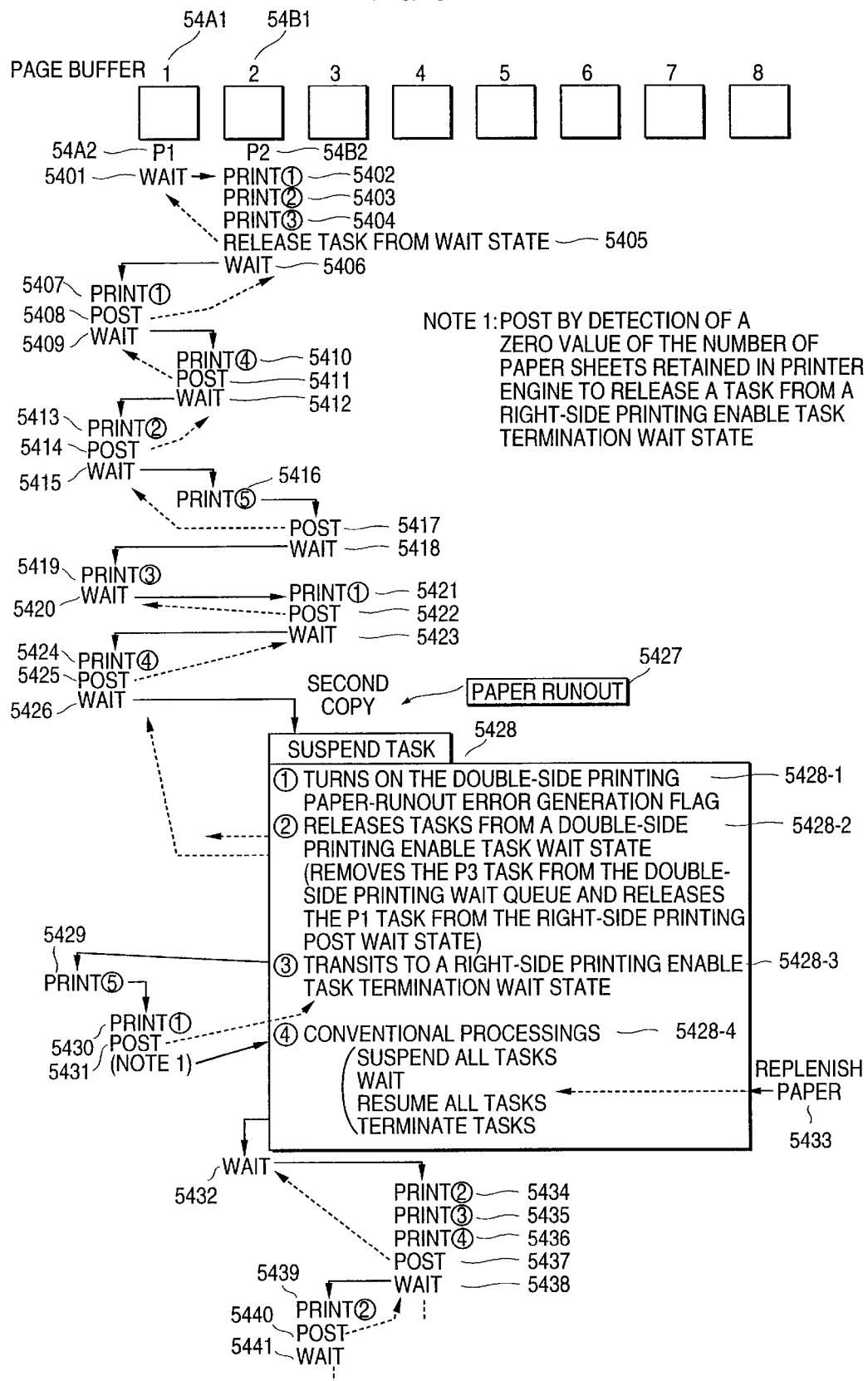
FIG. 54 is a diagram for explaining the processing procedure for a paper-runout error generated on the second copy of the paper in the double-side printing.

FIG. 54 shows a case in which a paper-runout error is generated on the second copy of the page P4. In this case, the printing task is on a right-side printing wait queue, waiting for right-side printing. In addition, the number of copies completing printing for the page on which the paper-runout error has been generated is greater than zero.

In this case, as a paper-runout error is generated, the suspend task is activated. The suspend task turns on the double-side printing paper-runout error generation flag and then releases a right-side printing enable task from a wait state.

In the release operation, a printing task associated with a page P3 having a sequence number 3 on a right-side printing queue is released from a right-side printing wait state and post processing is carried out for a printing-task associated with a page P1 having a sequence number 1 which is in a right-side printing post wait state. After that, the suspend task issues a wait macro 575, entering a right-side printing enable task termination wait state.

In this state, printing for sheets retained in the printer engine, that is, the fifth copy of page P1 and first copy of the page P3 in this case, is performed. As the printing task completes printing of the first copy of the page P3 with the sequence number 3, printing for all sheets retained in the printer engine is done. At that time, the processings 3555 and 3556 of FIG. 35 described previously are performed and, by issuing a post macro in the course of processing 422 of FIG. 51, the suspend task is released from the right-side printing enable task termination wait state. This post macro is the opposite of the wait macro 575 for putting the suspend task in the right-side printing enable task termination wait state described above. In this way, the processing by the suspend task is resumed. The suspend task carries out the same processing as the traditional one for the single-side printing processing. In the traditional processing, the suspend task performs suspension of all tasks 576, transition to wait state 577, resumption of all the tasks 578 and termination 575.

Processings of FIG. 54 are described more detail below. Much like those of FIG. 53, the printing task's processing of print data drawn in a page buffer is shown below the page buffer. For example, the following processing by a printing task for a page with a sequence number 1 denoted by notation P1 and reference 54A2 is shown right below a page buffer 1 denoted by reference numeral 54A1:

A right-side printing wait state denoted by reference numeral 5401 and also abbreviated merely as 'wait' in FIG. 54.

Printing of the first copy 5407, a reverse-side printing post waiting task's post 5408 and a wait state 5409 of the task itself.

Printing of the second copy 5413, a reverse-side printing post waiting task's post 5414 and a wait state 5415 of the task itself.

Printing of the third copy 5419 and a wait state 5420 of the task itself.

Printing of the fourth copy 5424, a reverse-side printing post waiting task's post 5425 and a wait state 5426 of the task itself.

Printing of fifth copy 5429.

Similarly, the following processing by a printing task for a page with a sequence number 2 denoted by notation P2 and reference numeral 54B2 is shown right below a page buffer 2 denoted by reference numeral 54B1.

Printing of the first copy 5402, printing of the second copy 5403, printing of the third copy 5404, releasing from a right-side printing wait state denoted by reference numeral 5405 and also abbreviated merely as 'release' in FIG. 54 and putting the task itself in a wait state 5406.

Printing of the fourth copy 5410, a right-side printing post waiting task's post 5411 and wait state 5412 of the itself. In the post macro for the right-side printing waiting task, the ECB address for multi-page copy communication for the right-side printing post waiting task is used as an input.

Printing of fifth copy 5416.

The processing procedure of FIG. 54 is as follows:

(1) The printing task for a page with a sequence number 1 denoted by notation P1 and reference numeral 54A2 enters a right- side printing wait state 5401.

(2) The printing task for a page with a sequence number 2 denoted by notation P2 and reference numeral 54B2 carries out printing of the first copy 5402, printing task of the second copy 5403 as well as printing of the third copy 5404, releases a printing task from a right-side printing wait state denoted by reference numeral 5405 and finally puts itself in a wait state 5406.

(3) The printing task for the page with the sequence number 1 released from the right-side printing wait state 5405 performs printing of the first copy 5407, issues a post macro 5408 to a reverse-side printing post waiting task and issues a wait macro to put itself in a wait state 5409. In the post macro 5408 for the reverse-side printing post waiting task, the ECB address for multi-page copy communication for the reverse-side printing post waiting task is used as an input. In the wait macro 5409 for the task itself, on the other hand, the ECB address for multi-page copy communication for the task itself is used as an input.

(4) The printing task for the page with the sequence number 2 carries out printing of the fourth copy 5410, issues a post macro 5411 to a right-side printing post waiting task and issues a wait macro to put itself in a wait state 5412. In the post macro 5411 for the right-side printing post waiting task, the ECB address for multi-page copy communication for the right-side printing post waiting task is used as an input. In the wait macro 5412 for the task itself, on the other hand, the ECB address for multi-page copy communication for the task itself is used as an input.

(5) The printing task for the page with the sequence number 1 released from the wait state by the post macro 5411 performs printing of the second copy 5413, issues a post macro 5414 to a reverse-side printing post waiting task and issues a wait macro 5415 to put itself in a wait state.

(6) The printing task for the page with the sequence number 2 released from the wait state by the post macro 5414 performs printing of the fifth copy 5416.

(7) A printing task for a page with a sequence number 3 issues a post macro 5417 to release the printing task put in a wait state by the wait macro 5415. Subsequently, the printing task for the page with the sequence number 3 enters a right-side printing wait state 5418.

(8) The printing task for the page with the sequence number 1 released from the wait state by the post macro 5417 performs printing of the third copy 5419 and then issues a wait macro 5420 to put itself in a wait state.

(9) The printing task for the page with the sequence number 4 performs printing of the second copy 5421, issues a post macro 5422 to a right-side printing post waiting task and issues a wait macro 5423 to put itself in a wait state.

(10) The printing task for the page with the sequence number 1 released from the wait state by the post macro 5422 performs printing of the fourth copy 5424, issues a post macro 5425 to a reverse-side printing post waiting task and issues a wait macro 5426 to put itself in a wait state.

(11) When the printing task for the page with the sequence number 2 released from the wait state by the post macro 5425 performs printing of the second copy, a paper-runout error 5427 is generated.

(12) In the processing of the error related to the printing task for the page with the sequence number 2, the suspend task is activated. The suspend task carries out the following processings 5428:

Setting the double-side printing paper-runout error generation flag to ON (5428-1).

Releasing a double-side printing task from a wait state (5428-2). In the release operation, a printing task associated with a page P3 having a sequence number 3 on a right-side printing wait queue is released from a right-side printing wait state (5428-2A) and post processing is carried out for a printing task associated with a page P1 having a sequence number 1 which is in a right-side printing post wait state (5428-2B).

After that, the suspend task issues a wait macro, entering a right-side printing enable task termination wait state (5428-3).

(13) The printing task for the page with the sequence number 1 released from the wait state by the post processing 5428-2B per forms printing of the fifth copy 5429.

(14) The printing task for the page with the sequence number 3 released from the wait state by the processing 5428-2A performs printing of the first copy 5430. As indicated by Note 1 of FIG. 54, the task then detects that the number of sheets retained in the printer engine is zero. Refer to the processing 426 shown in FIG. 51. Accordingly, the task issues a post macro. Refer to the processing 427 shown in FIG. 51. The post macro releases the suspend task from the right-side printing enable task termination wait state 5431 described earlier. Then, the task issues a wait macro 5432 to put itself in a wait state.

(15) The user or a person in charge of system maintenance replenishes paper 5433.

(16) As soon as paper is replenished, the printing task for the page with the sequence number 2 resumes the processing, executing the printing of the second copy 5434.

(17) Next, the printing task for the page with the sequence number 2 denoted by notation P2 and reference numeral 54B2 performs printing of the third copy 5435 as well as printing of the fourth copy 5436, issues a post macro 5437 to a right-side printing post waiting task and finally issues a wait macro 5438 to put itself in a wait state.

(18) Thereafter, the printing task for the page with the sequence number 3 released from a wait state by the post macro 5437 carries forward processing by performing printing of the second copy 5439, issuing a post macro 5440 for a reverse-side printing post waiting task and finally issuing a wait macro 5441 to put itself in a wait state.

Figure 55:
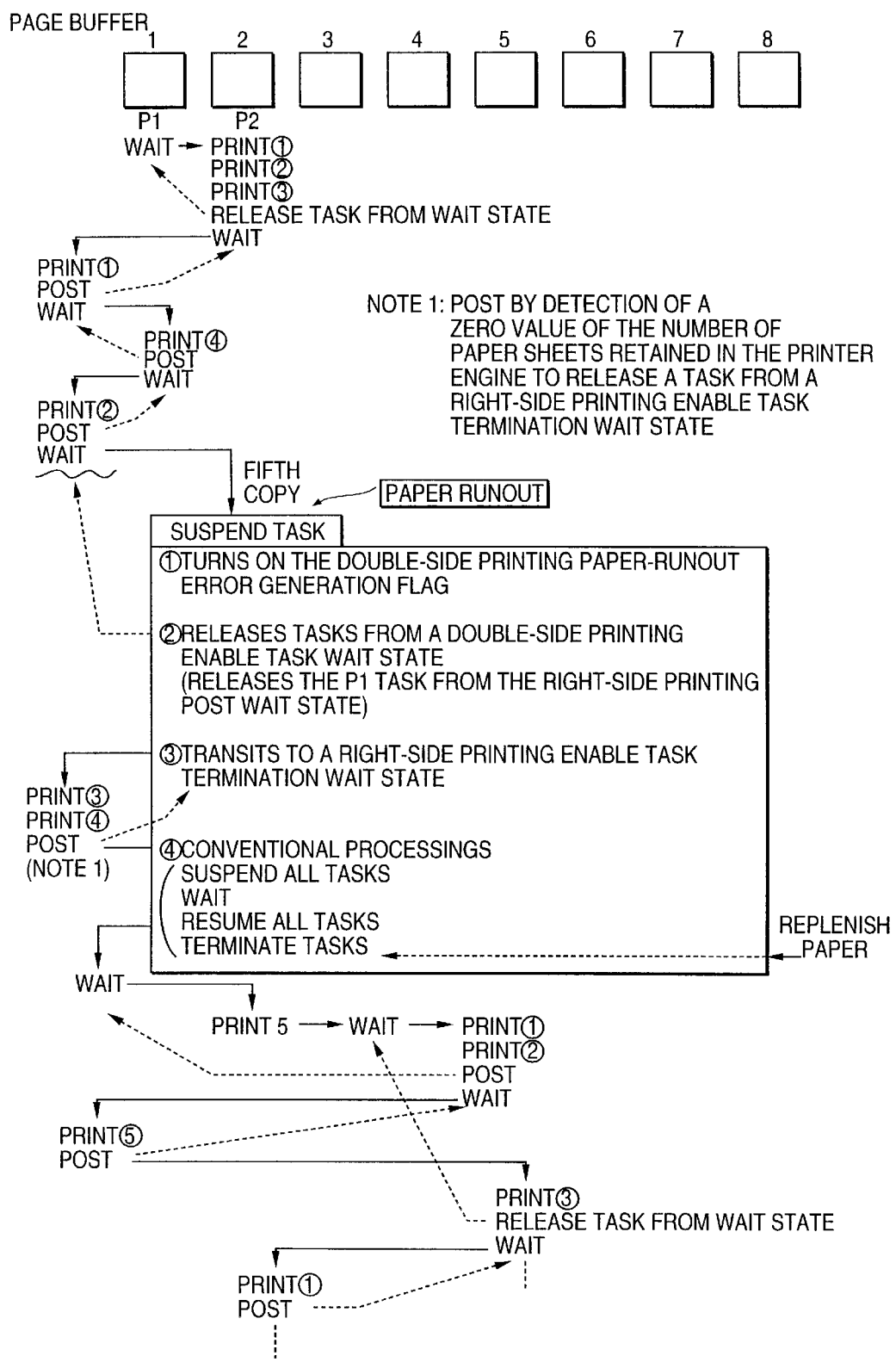
FIG. 55 is a diagram for explaining the processing procedure for a paper-runout error generated on the fifth copy of the page in the double-side printing.

FIG. 55 shows a case in which a paper-runout error is generated on the fifth copy of the page P4. To put it in more detail, in this case, the printing task is not on a right-side printing wait queue for waiting for right-side printing. In addition, the number of copies completing printing for the page on which the paper-runout error has been generated is greater than zero.

In this case, as a paper-runout error is generated, and the suspend task is thereby activated. The suspend task turns on the double-side printing paper-runout error generation flag and then releases a right-side printing enable task from a wait state.

In the release operation, post processing is carried out for a printing task associated with a page P1 having a sequence number 1 in a right-side printing post wait state. After that, the suspend task issues a wait macro 575, entering a right-side printing enable task termination wait state.

In this state, printing of sheets of paper retained in the printer engine, that is, the third and fourth copies of the page P1 with the sequence number 1 in this case, is performed. As the printing task completes printing of the fourth copy of the page P1 with the sequence number 1, printing of all sheets of paper retained in the printer engine is done. At that time, the processings 3555 and 3556 of FIG. 35 described previously are performed and, by issuing a post macro in the course of processing 422 shown in FIG. 51, the suspend task is released from the right-side printing enable task termination wait state. This post macro is the opposite of the wait macro 575 for putting the suspend task in the right-side printing enable task termination wait state described above. In this way, the processing by the suspend task is resumed. The suspend task carries out the same processing as the traditional one for the single-side printing processing shown in FIG. 54.

Figure 56:
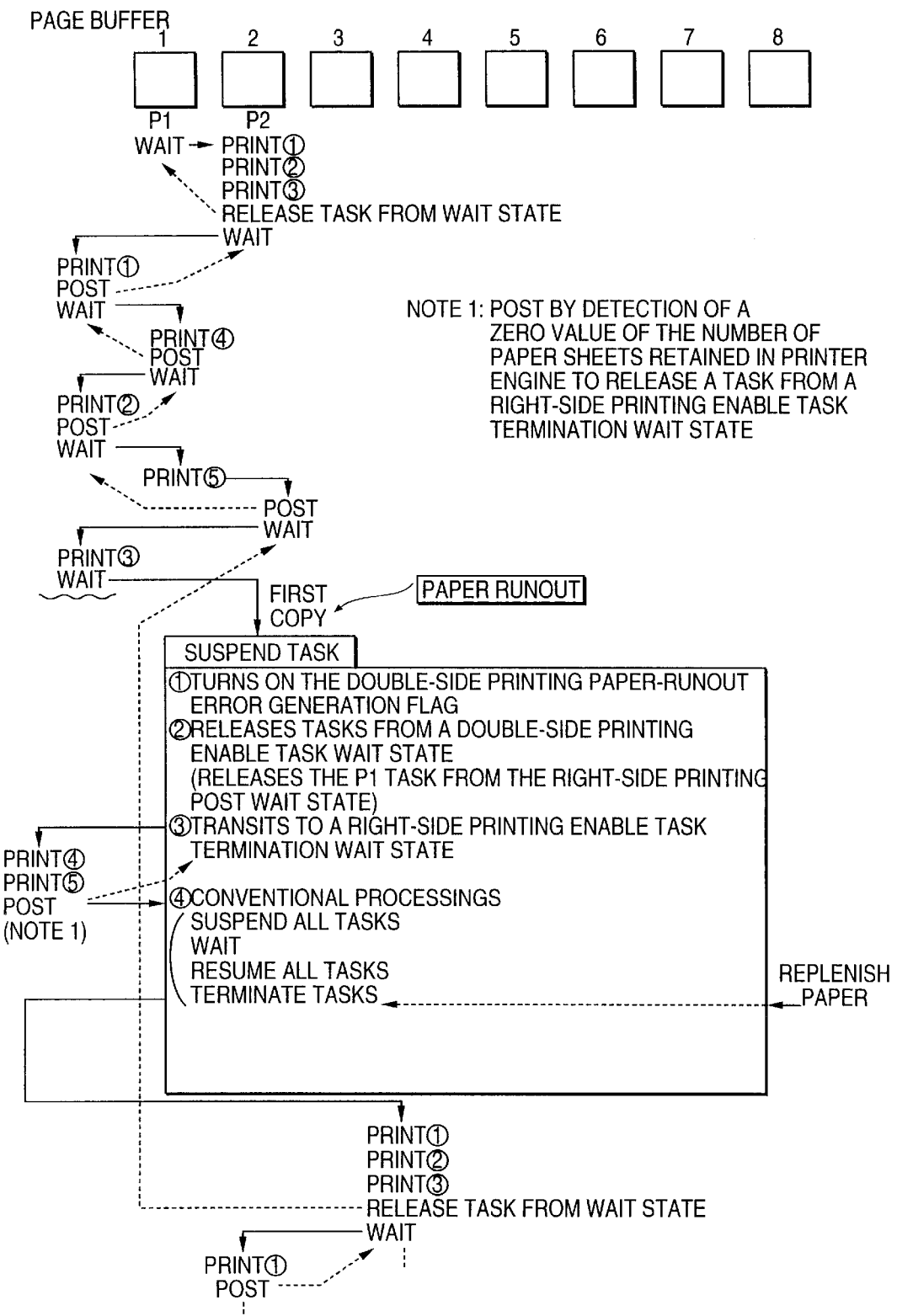
FIG. 56 is a diagram for explaining the processing procedure for a paper-runout error generated on the first copy of the page in the double-side printing.

FIG. 56 shows a case in which a paper-runout error is generated on the first copy of the page P4. To put it in more detail, in this case, the printing task is on a right-side printing wait queue, waiting for right-side printing. In addition, the number of copies completing printing for the page on which the paper-runout error has been generated is zero.

In this case, as a paper-runout error is generated, the suspend task is activated. The suspend task turns on the double-side printing paper-runout error generation flag and then releases a right-side printing enable task from a wait state.

In the release operation, post processing is carried out for a printing task associated with a page P1 having a sequence number 1 in a right-side printing post wait state. After that, the suspend task issues a wait macro 575, entering a right-side printing enable task termination wait state.

In this state, printing of sheets retained in the printer engine, that is, the fourth and fifth copies of the page P1 with the sequence number 1 in this case, is performed. As the printing task completes printing of the fifth copy of the page P1 with the sequence number 1, printing of all sheets of paper retained in the printer engine is done. At that time, the processings 3555 and 3556 of FIG. 35 described previously are performed and, by issuing a post macro in the course of processing 422 shown in FIG. 51, the suspend task is released from the right-side printing enable task termination wait state. This post macro is the opposite counterpart of the wait macro 575 for putting the suspend task in the right-side printing enable task termination wait state as described above. In this way, the processing by the suspend task is resumed. The suspend task carries out the same processing as the traditional one for the single-side printing processing shown in FIG. 54.

2. Asynchronous Paper-Runout Errors 2.1 Single-Page Copy Processing Procedure

An asynchronous paper-runout error is a paper-runout error generated in the course of printing of a reverse-side page associated with a right-side page pertaining to a printing task put at the end of a right-side printing wait queue.

Accordingly, all printing tasks on the right-side printing wait queue, except the printing task for the right-side page put at the end of the queue, are enabled for printing. As a result, all these printing tasks enabled for printing are released from a right-side printing wait state, starting to print.

For example, the printing tasks for the pages P3, P5 and P7 are on the right-side printing wait queue and an asynchronous paper-runout error is generated on the page P8. In this case, the printing tasks for the pages P3 and P5 are removed from the right-side printing wait queue, leaving only the task for the page P7 thereon. The printing tasks for the pages P3 and P5 are released from the right-side printing wait state, starting to print.

2.2 Multi-Page Copy Processing Procedure

Much like the single-page copy operation, an asynchronous paper-runout error is a paper-runout error generated in the course of printing of a reverse-side page associated with a right-side page pertaining to a printing task put at the end of a right-side printing wait queue.

In the processing of a paper-runout error detected in the course of a multi-page copy operation, first of all, the number of copies completing printing for the reversed-side page associated with the right-side page pertaining to a printing task put at the end of the right-side printing wait queue is examined. If all copies have been printed, the number of blank-printed copies up to the present is made the number of page copies completing printing. Otherwise, the number of present page copies is made the number of page copies completing printing.

If the number of page copies completing printing is zero, all printing tasks on the right-side printing wait queue are released from a wait state except the right-side page printing task put at the end of the queue.

If the number of page copies completing printing is greater than zero, all the printing tasks on the right-side printing wait queue are released from a wait state. Then, if the right-side printing post required flag is on, the flag is turned off before a post macro is issued for executing an operation to release a task from a right-side printing post wait state.

Figure 57:
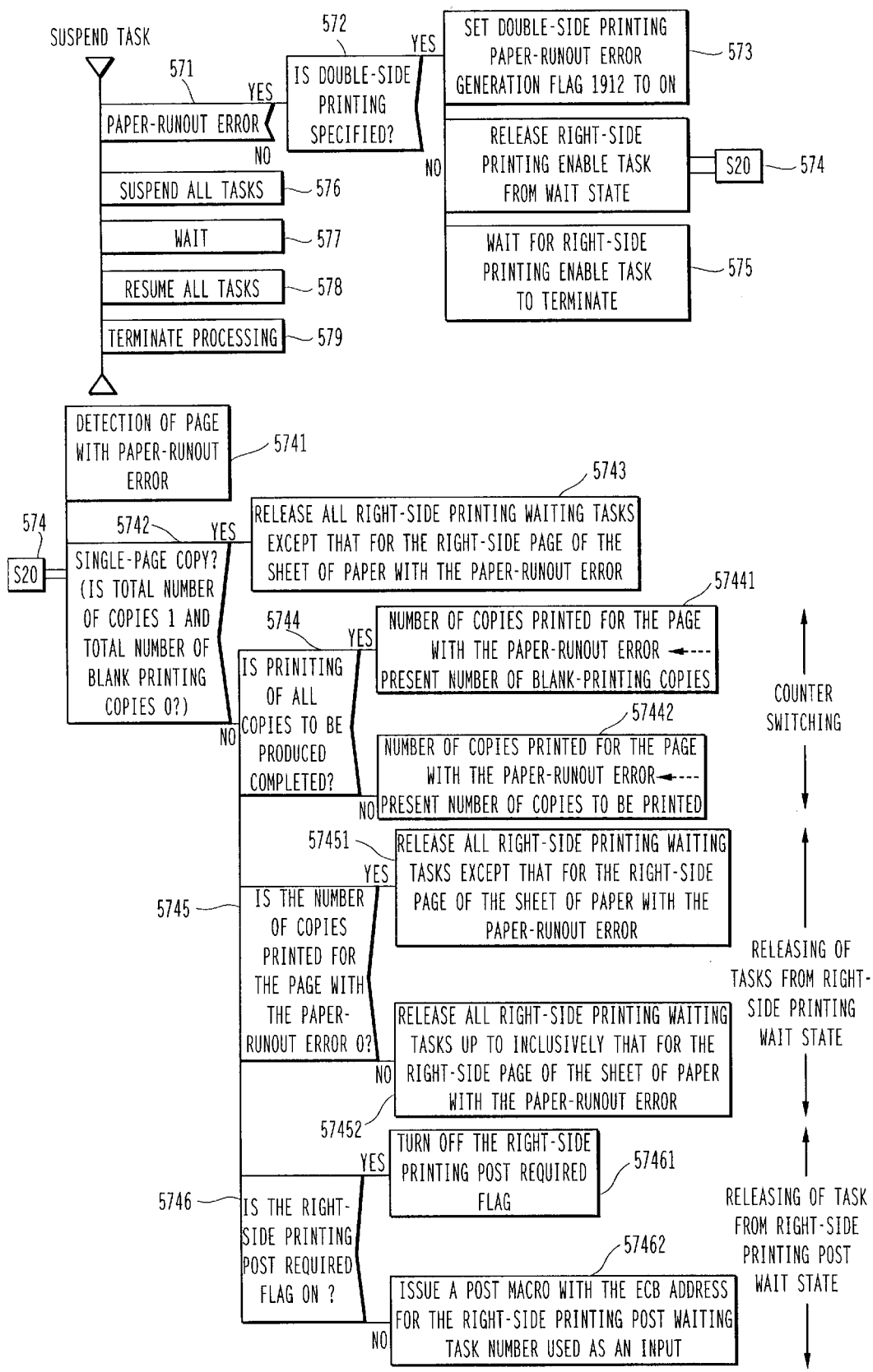
FIG. 57 is a diagram of a processing procedure for a suspend task.

3. Processing Outline As described above, the printing of sheets retained in the printer engine in the event of a paper-runout error is carried out by the suspend task. The procedure of the processing is shown in FIG. 57.

Next, a multi-page copy processing method of the double-side printing is explained by referring to FIGS. 58 to 67. First of all, a case, in which the number of right-side pages to be printed is equal to the number of reverse-side pages to be printed, is explained. The description is followed by explanation of a case, in which the number of right-side pages to be printed is not equal to the number of reverse-side pages to be printed.

(1) The number of right-side pages to be printed is equal to the number of reverse-side pages to be printed.

In the case wherein the number of right-side pages to be printed is equal to the number of reverse-side pages to be printed, the processing procedure explained so far can be used to implement a multi-page copy processing method. Processing-procedure examples for this case are shown in FIGS. 58 to 60 which can be interpreted in the same way as FIGS. 53 and 54 which have already been explained previously.

Figure 58:
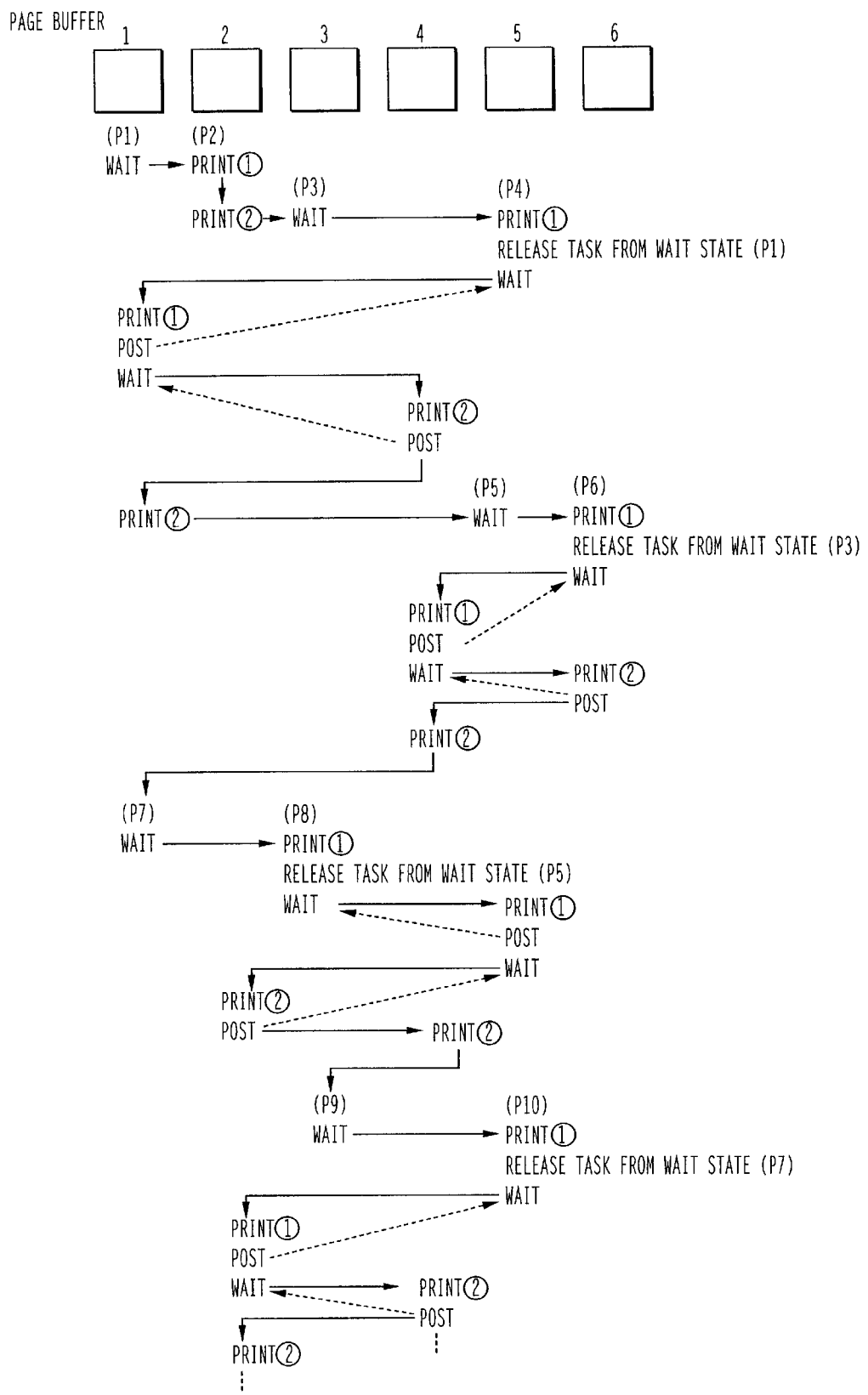
FIG. 58 is a diagram for explaining the processing of a multi-page copy.

FIG. 58 shows a case in which a composition to be printed comprises more than 6 pages, the number of copies to be printed is 2, the number of page buffers is 6, the maximum number of sheets retainable in the printer engine is 3 and the paper size is A4. The case shown in this figure is a case in which the number of copies to be printed is smaller than the maximum number of sheets retainable in the printer engine.

Figure 59:
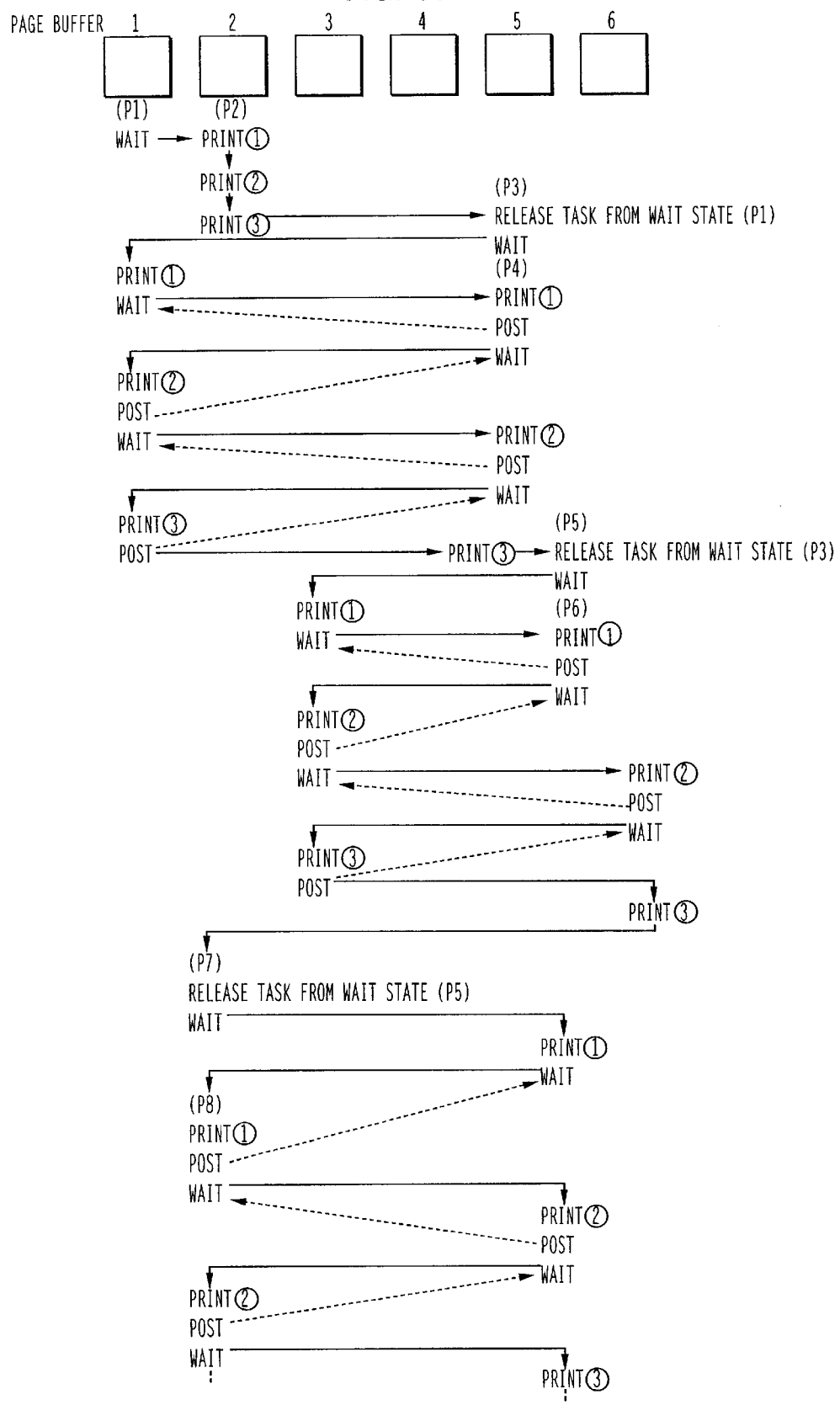
FIG. 59 is a diagram for explaining the processing of the multi-page copy.

FIG. 59 shows a case in which a composition to be printed comprises more than 6 pages, the number of copies to be printed is 3, the number of page buffers is 6, the maximum number of sheets retainable in the printer engine is 3 and the paper size is A4. The case shown in this figure is a case in which the number of copies to be printed is equal to the maximum number of sheets retainable in the printer engine.

Figure 60:
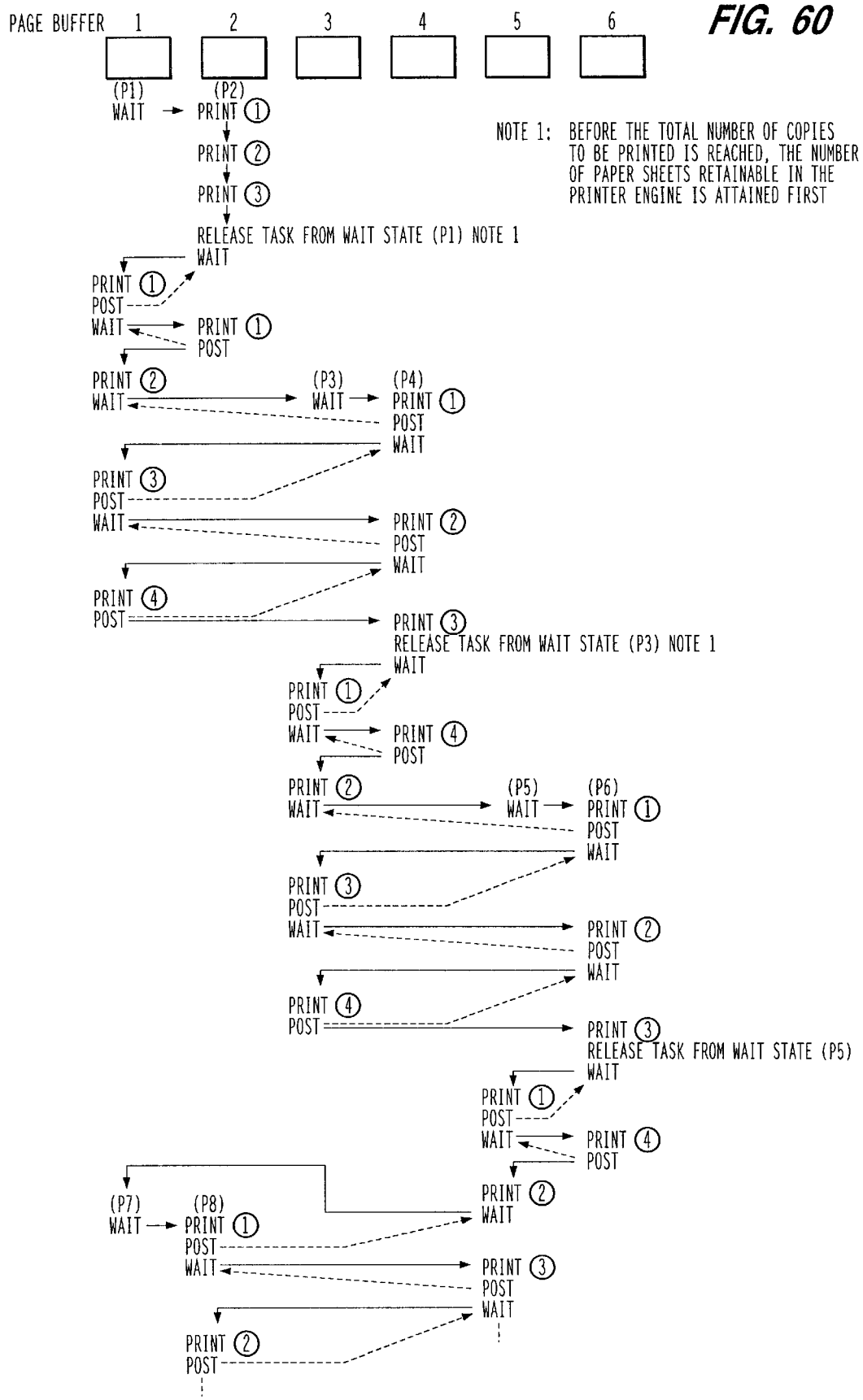
FIG. 60 is a diagram for explaining the processing of the multi-page copy.

FIG. 60 shows a case in which a composition to be printed comprises more than 6 pages, the number of copies to be printed is 4, the number of page buffers is 6, the maximum number of sheets retainable in the printer engine is 3 and the paper size is A4. The case shown in this figure is a case in which the number of copies to be printed is greater than the maximum number of sheets retainable in the printer engine.

(2) The number of right-side pages to be printed is not equal to the number of reverse-side pages to be printed.

In the case wherein the number of right-side pages to be printed is not equal to the number of reverse-side pages to be printed, the printing is carried out as follows. Let (a) and (b) be the smaller number of pages to be printed and the larger number of pages to be printed respectively. The pages of the greater count (b) are printed to actually produce as many as (b) copies. On the other hand, the pages of the smaller count (a) are printed as follows:

As many as (a) copies are actually printed.

Blank printing is carried out on as many as [(a)–(b)] copies, where [(a)–(b)] is the absolute difference between (a) and (b).

In order to implement the above processings, the page-buffer control table, the printer control table as well as printing tasks are utilized whereas the copy-count specifying command processing, the blank printing and the page-buffer read termination processing are implemented as follows.

(a) Page-buffer control table and printer control table

As shown in FIG. 16, the page-buffer control table 1141 includes information on the number of blank-printing copies to be produced 1410 and the number of blank-printing copies already produced 1411. As shown in FIG. 22, the printer control table 1161 also includes information on the number of blank-printing copies to be produced 1903 and the number of blank-printing copies already produced 1904.

(b) Copy-count specifying command processing

Figure 61:
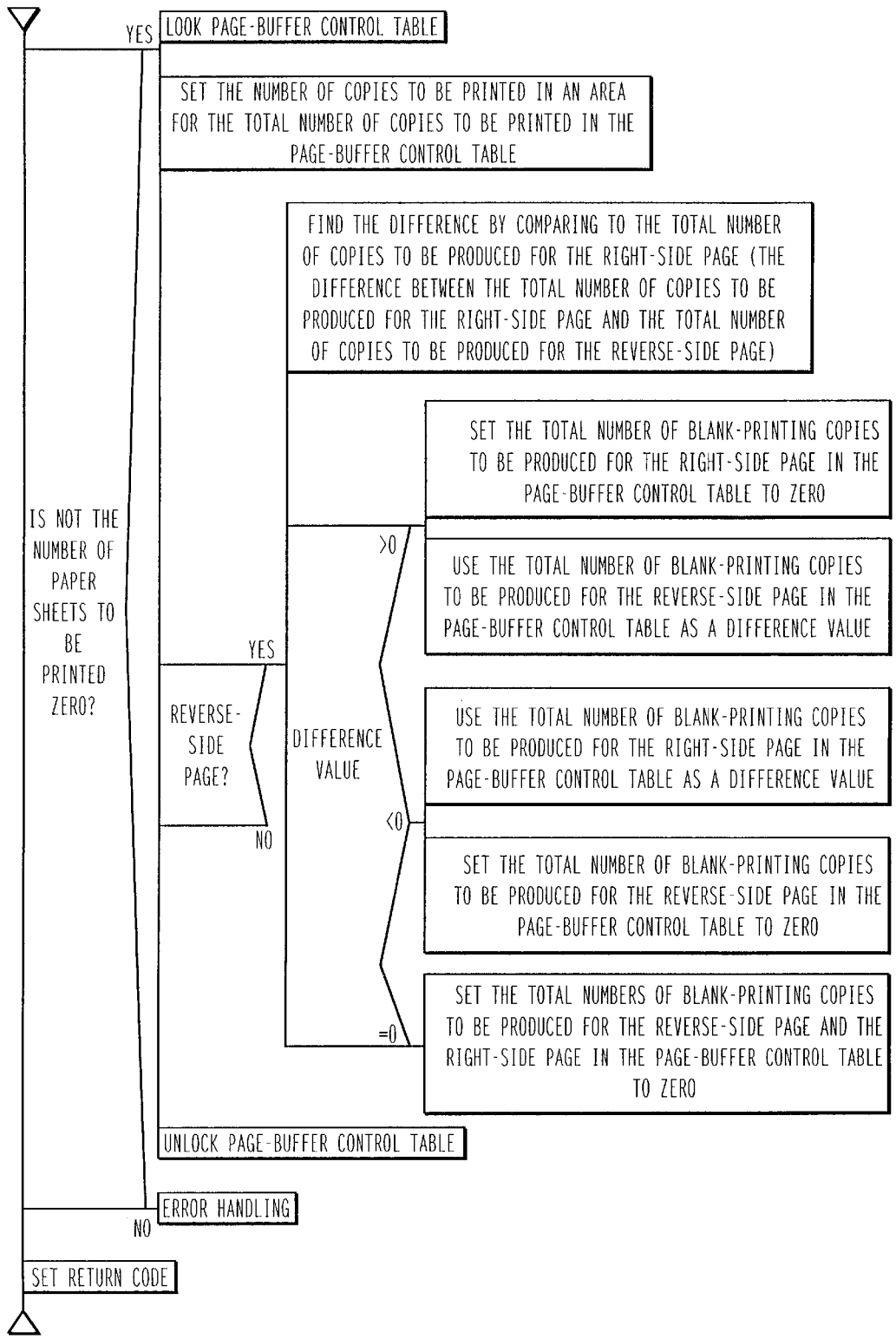
FIG. 61 is a diagram of a processing procedure for a copy-count specifying command.

The number of copies to be printed for a reverse-side page, if specified, is compared to the number of copies to be printed for the corresponding right-side page. The absolute value of the difference between the numbers is stored in the area 1410 of the page-buffer control table for the number of blank-printing copies to be produced. A processing procedure is shown in FIG. 61. It should be noted that the processing procedure of FIG. 33 described previously is applicable only to a case in which the number of right-side printing copies to be produced matches the number of reverse-side printing copies to be produced. The processing procedure shown in FIG. 61 can, on the other hand, be applied to both the case with the number of right-side printing copies to be produced matching the number of reverse-side printing copies to be produced and the case in which the number of right-side printing copies to be produced does not match the number of reverse-side printing copies to be produced.

(c) Blank-printing technique

Blank printing is implemented as follows:

An operation to read out the contents of a page buffer in use is carried out as many times as the total number of blank-printing copies to be produced in addition to the total number of copies to be printed specified by the user.

After data is read out from the page buffer in use for as many copies as the total number of copies to be printed, the contents of the page buffer are cleared to zeros. Then, zeros are read out from the cleared page buffer as many times as the total number of blank-printing copies to be produced.

After the contents of the page buffer in use are read out therefrom as many times as the sum of the total number of copies to be printed and the total number of blank-printing copies to be produced, the page buffer is released by a page-buffer free macro.

(d) Printing task

The processing procedure of a printing task is shown in FIGS. 35 to 44 and FIG. 51.

The printing task controls right and reverse-side printing operations by using printing control information stored in the printing-condition area 1900 and the like of the printer control table 1161. It should be noted that the total number of copies to be printed 1408 and the total number of blank-printing copies to be produced 1410 of the page-buffer control table 1141 are copied to the total number of copies to be printed 1901 and the total number of blank-printing copies to be produced 1903 of the printer control table for use in the control of the multi-page copy printing of the right and reverse-side pages being produced.

(e) Page-buffer read termination interrupt handling

Figure 62:
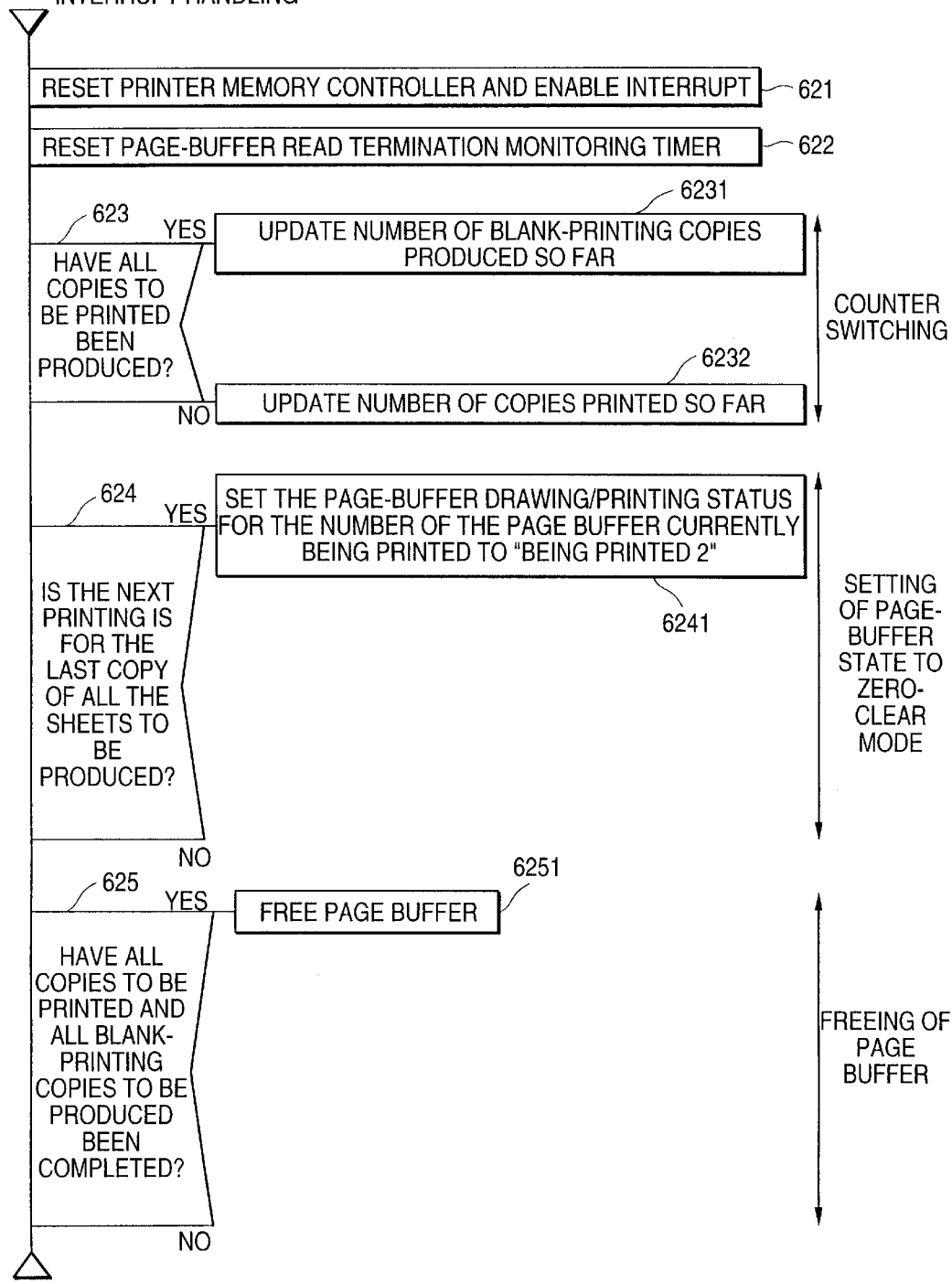
FIG. 62 is a diagram of a processing procedure for interrupting reading-out of page buffer.

The processing procedure of the page-buffer read termination interrupt handling is shown in FIG. 62. The interrupt handling is executed each time all data is read out from a page buffer. As shown in the figure, initially, a printer memory controller 97 is reset, the interrupt is enabled at a step 621 and a page-buffer read termination monitoring timer is reset at a step 622.

Subsequently, the flow of processing continues to a step 623 to determine whether or not the data has been read from the page buffer as many times as the total number of sheets to be printed 1901. If it is found at the step 623 that the data has not been read from the page buffer as many times as the total number of sheets to be printed 1901, the flow of processing continues to a step 6231 at which the number of blank-printing copies already produced 1411 for the number of the page buffer currently being printed is updated. As described above, the number of blank-printing copies already produced 1411 is stored in the page-buffer control table 1141. If it is found at the step 623 that the data has been read from the page buffer as many times as the total number of sheets to be printed 1901, on the other hand, the flow of processing continues to a step 6232 at which the number of sheets already produced 1409 for the number of the page buffer currently being printed is updated.

In either case, the flow of processing continues to a step 624 to determine whether or not the next printing is for the last copy of all the sheets to be produced. If the next printing is found at the step 624 to be for the last copy, the flow of processing continues to a step 6241 at which the page-buffer drawing/printing status for the number of the page buffer currently being printed is set to "Being printed 2".

At the time the actual printing for the total number of sheets to be printed and the blank printing for the total number of blank-printing copies to be produced are completed, the flow of processing continues to a step 6251 at which a page-buffer free macro for the number of the page buffer currently being printed is issued for releasing the print buffer.

The effects of applying the double-side printing processing technique described above to a case, in which the number of right-side printing copies to be produced is not equal to the reverse-side printing copies to be produced, are explained as follows.

Figure 63:
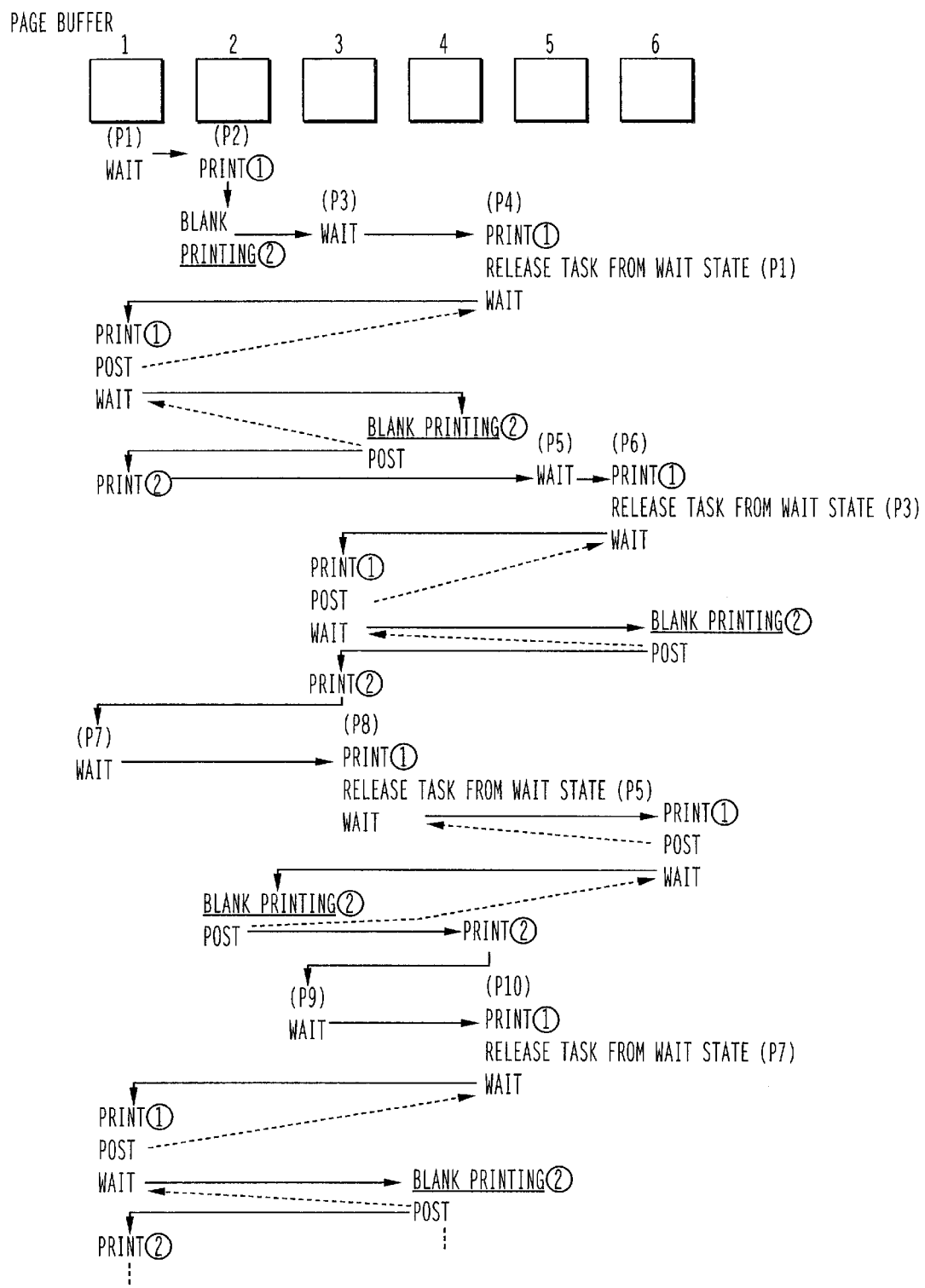
FIG. 63 is a diagram for explaining the processing of the multi-page copy under a first set of conditions.
Figure 64:
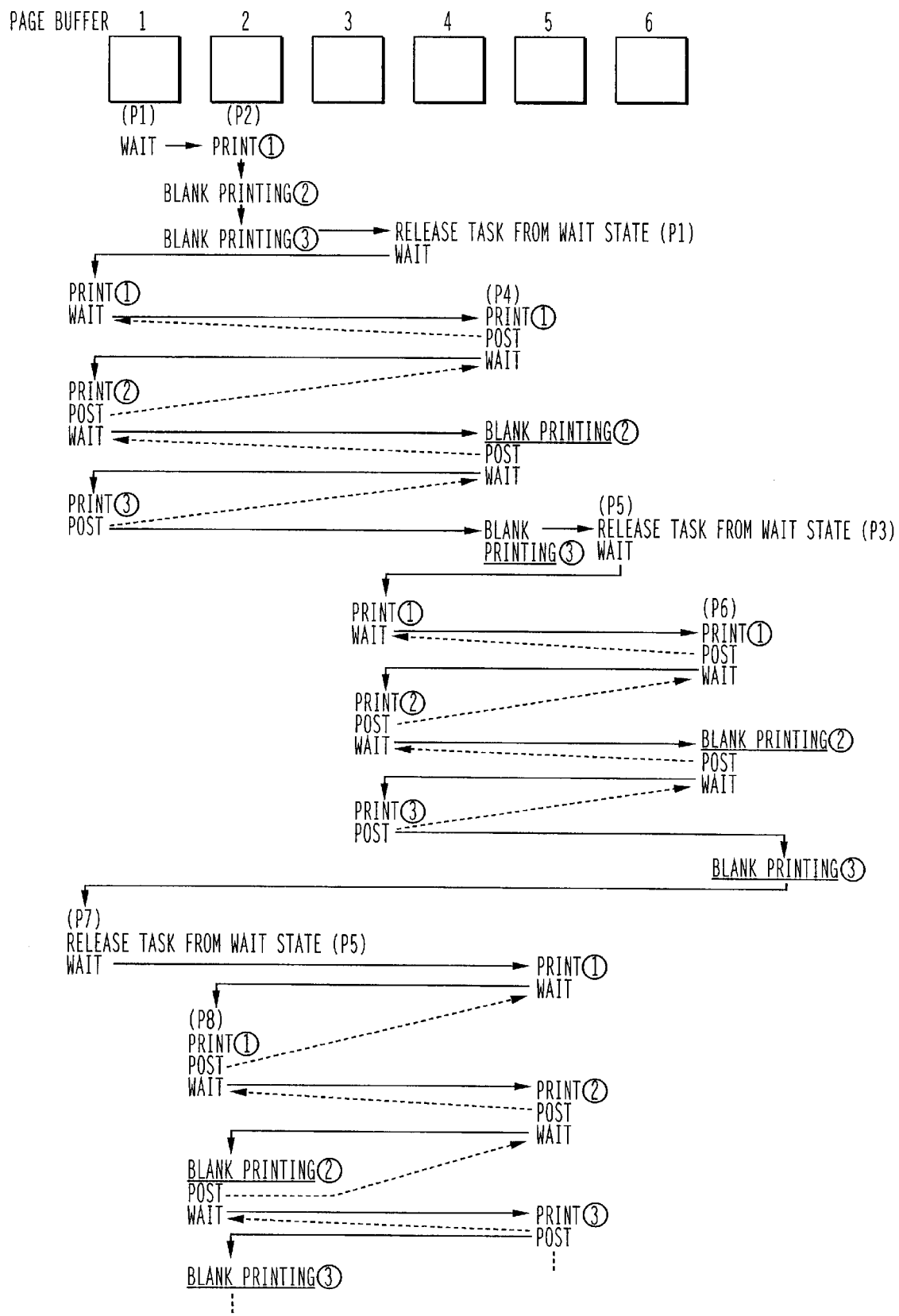
FIG. 64 is a diagram for explaining the processing of the multi-page copy under a second set of conditions.
Figure 65:
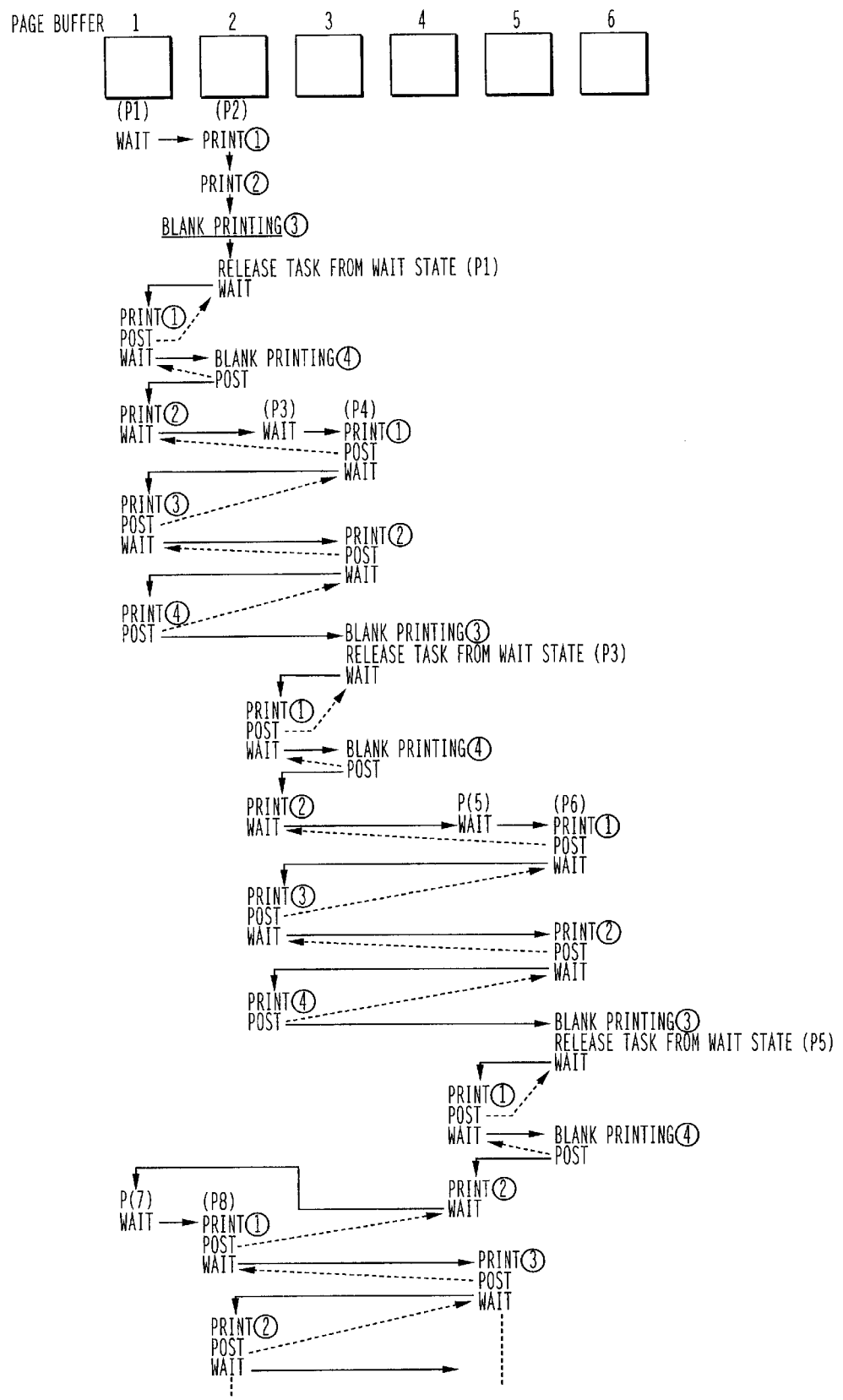
FIG. 65 is a diagram for explaining the processing of the multi-page copy under a third set of conditions.

First of all, typical processing states of the double-side printing, in which the number of right-side printing copies to be produced is greater than the reverse-side printing copies to be produced, are explained by referring to FIGS. 63 to 65. In this case, blank printing is carried out on as many reverse-side pages as the difference between the number of right-side printing copies to be produced and the number of reverse-side printing copies to be produced. FIGS. 63 to 65 are interpreted in the same way as FIGS. 53 and 54 which have already been described previously.

FIG. 63 shows a case in which a composition to be printed comprises more than 6 pages, the number of copies to be printed is 2, the number of page buffers is 6, the maximum number of print-paper sheets retainable in the printer engine is 3 and the paper size is A4. The case shown in this figure is a case in which the number of copies to be printed is smaller than the maximum number of sheets retainable in the printer engine.

FIG. 64 shows a case in which a composition to be printed comprises more than 6 pages, the number of copies to be printed is 3, the number of page buffers is 6, the maximum number of sheets retainable in the printer engine is 3 and the paper size is A4. The case shown in this figure is a case in which the number of copies to be printed is equal to the maximum number of sheets retainable in the printer engine.

FIG. 65 shows a case in which a composition to be printed comprises more than 6 pages, the number of copies to be printed is 4, the number of page buffers is 6, the maximum number of sheets retainable in the printer engine is 3 and the paper size is A4. The case shown in this figure is a case in which the number of copies to be printed is greater than the maximum number of sheets retainable in the printer engine.

Figure 66:
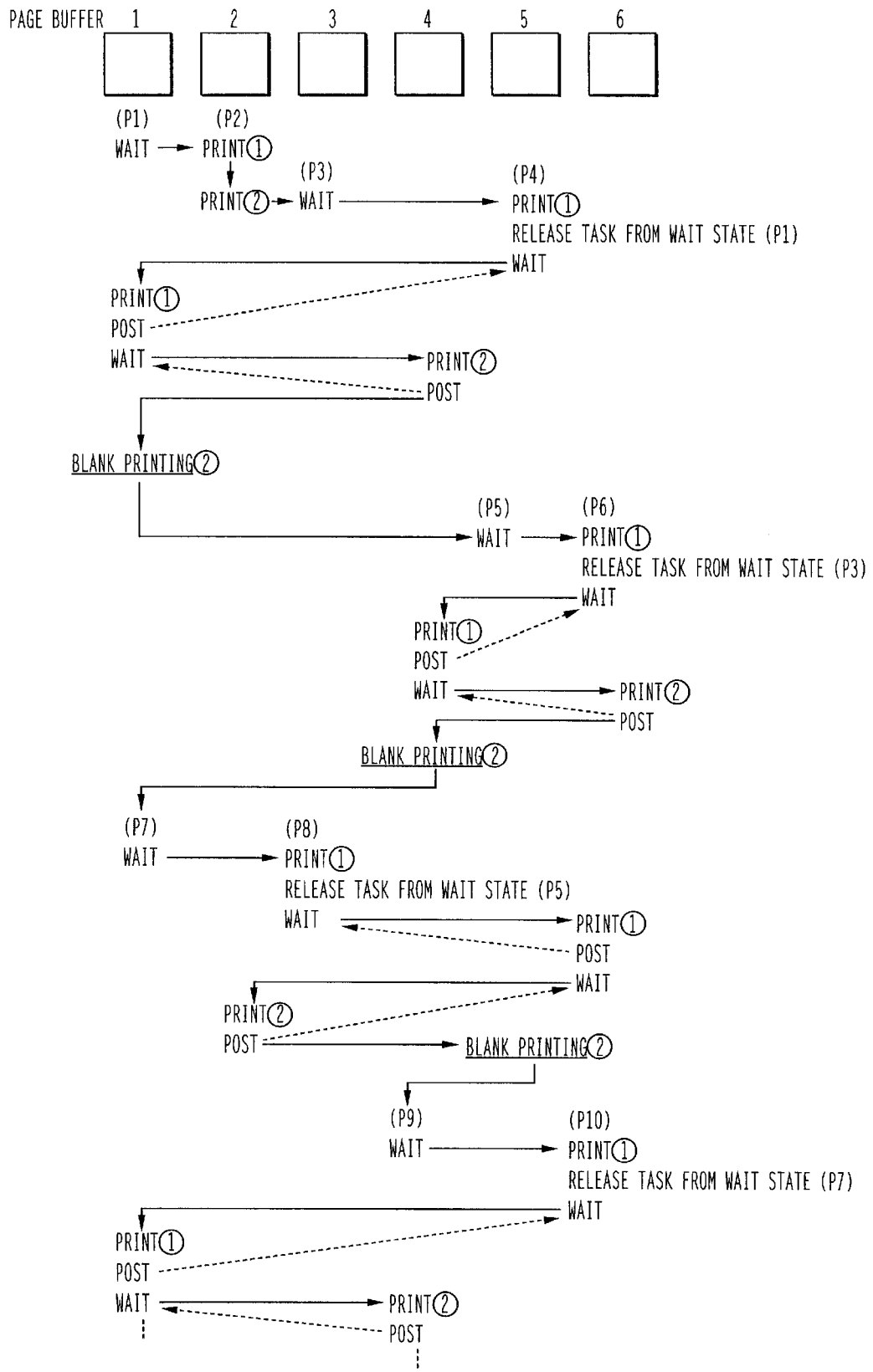
FIG. 66 is a diagram for explaining the processing of the multi-page copy under a fourth set of conditions.
Figure 67:
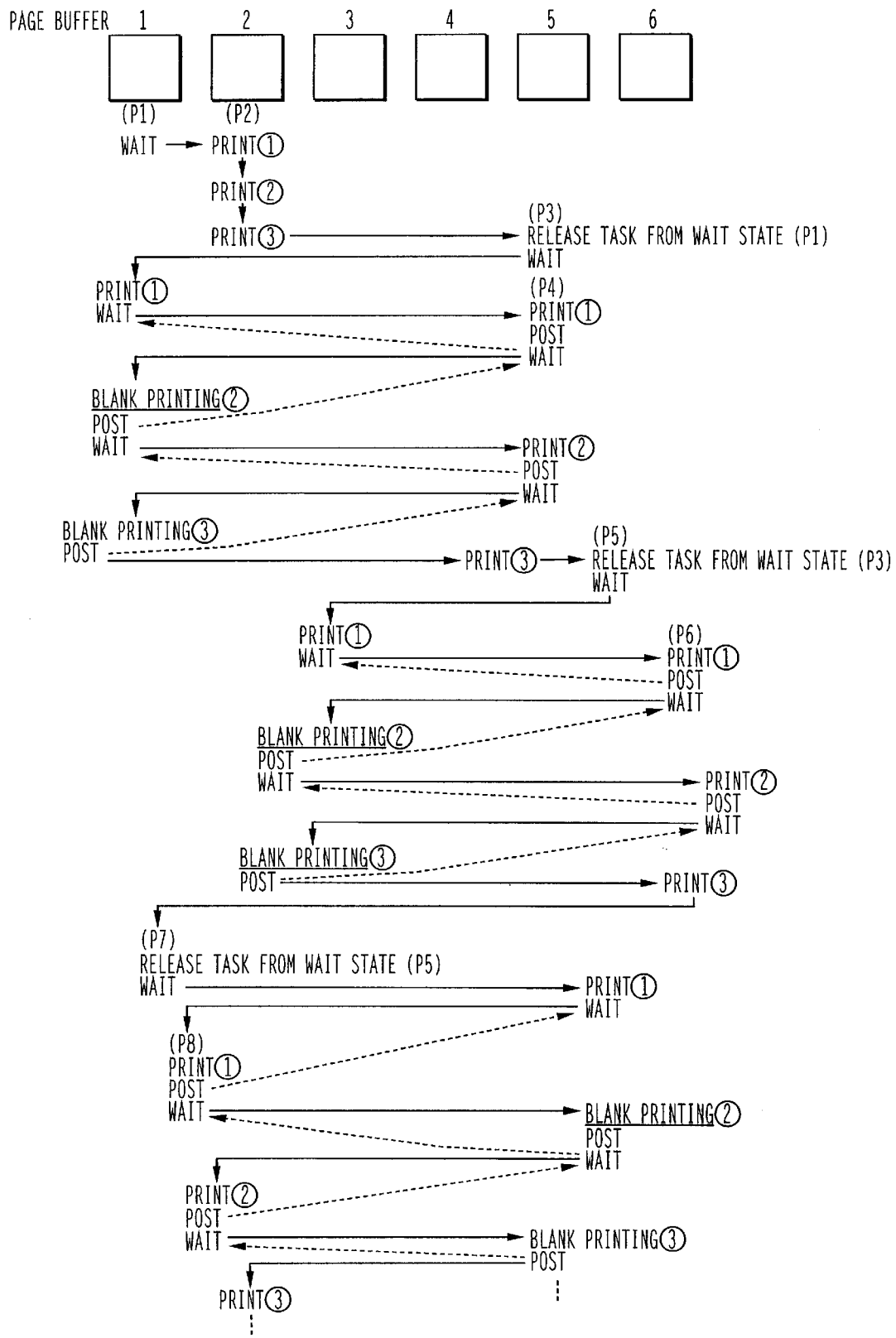
FIG. 67 is a diagram for explaining the processing of the multi-page copy under a fifth set of conditions.
Figure 68:
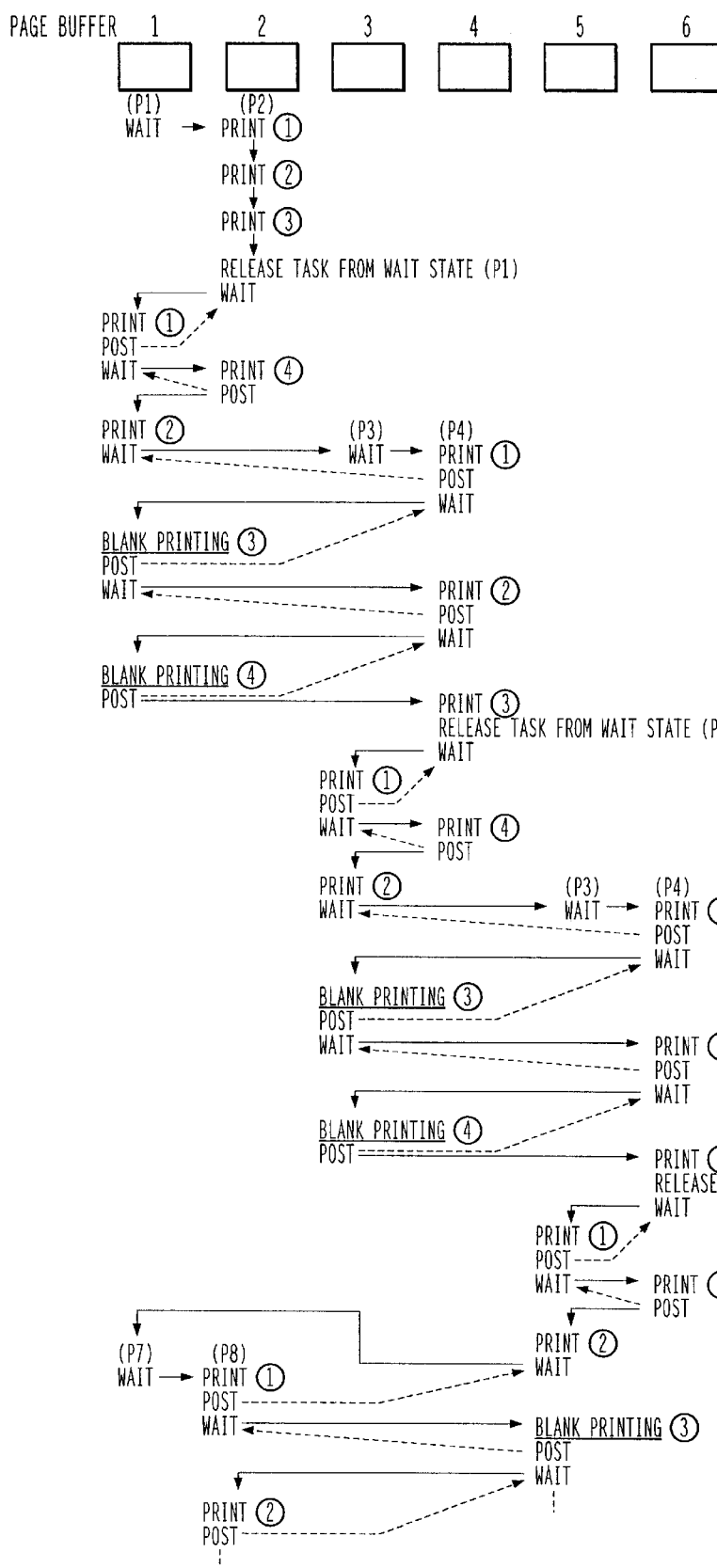
FIG. 68 is a diagram for explaining the processing of the multi-page copy under a sixth set of conditions.

Next, typical processing states of the double-side printing, in which the number of right-side printing copies to be produced is greater than the reverse-side printing copies to be produced, are explained by referring to FIGS. 66 to 68. In this case, blank printing is carried out on as many right-side pages as the absolute value of the difference between the number of right-side printing copies to be produced and the number of reverse-side printing copies to be produced. FIGS. 66 to 68 are interpreted in the same way as FIGS. 53 and 54 which have already been described previously.

FIG. 66 shows a case in which a composition to be printed comprises more than 6 pages, the number of copies to be printed is 2, the number of page buffers is 6, the maximum number of sheets retainable in the printer engine is 3 and the paper size is A4. The case shown in this figure is a case in which the number of copies to be printed is smaller than the maximum number of sheets retainable in the printer engine.

FIG. 67 shows a case in which a composition to be printed comprises more than 6 pages, the number of copies to be printed is 3, the number of page buffers is 6, the maximum number of sheets retainable in the printer engine is 3 and the paper size is A4. The case shown in this figure is a case in which the number of copies to be printed is equal to the maximum number of sheets retainable in the printer engine.

FIG. 68 shows a case in which a composition to be printed comprises more than 6 pages, the number of copies to be printed is 4, the number of page buffers is 6, the maximum number of print-paper sheets retainable in the printer engine is 3 and the paper size is A4. The case shown in this figure is a case in which the number of copies to be printed is greater than the maximum number of sheets retainable in the printer engine.

The following description explains how a multiple eject unit support function is implemented.

First of all, a technique of monitoring a paper-eject end is described. The printing task monitors the status of a sheet until it is ejected by an eject unit. A timer is used as a monitoring means. A time from the issuance of a print command to the printer engine to the ejecting of the sheet by an eject unit is set in the timer for paper-eject monitoring. Detection of no error prior to the time-out of the timer indicates that the sheet of print paper is ejected normally. In this case, the page sequence number is updated and other normal processings are carried out as usual. A printing sequence from the issuance of a print command to the completion of the ejecting is shown in FIG. 69.

Next, a technique of supporting a plurality of eject units is described.

In the case of a plurality of eject units, the eject time is different from unit to unit. When a sheet of print paper with a page sequence number n+1 is ejected from eject unit 2 after a sheet with a page sequence number n has been ejected from eject unit 1, the sheet with the page sequence number n+1 ejected later may get out off the eject unit earlier.

In the conventional technique of verifying a paper-eject end, a phenomenon of sheets of print paper ejected in such a reversed order results in incorrect tracking of the sequence number of the ejected sheet and incorrect timing of the printing task.

In order to solve the above problem, a function for supporting a plurality of paper-eject units is therefore provided. Based on paper-eject end monitoring information 1950 of the aforementioned printer control table 1161 shown in FIG. 24, the function for supporting a plurality of paper-eject units is implemented as follows:

(a) A plurality of paper-eject end monitoring timers are provided. As many paper-eject end monitoring timers as sheets retainable in the printer engine are employed. In the handling of a vertical synchronous signal request interrupt associated with a print-command macro issued by a printing task:
  (i) The sequence number of a print-paper page to be monitored and a specified paper-eject unit are entered in an area in the printer control table allocated toga paper-eject end monitoring timer associated with the print-paper page to be monitored.
  (ii) A paper-eject end monitoring timer associated with the print-paper page to be monitored is selected and a timer value is set therein. The timer value is determined by the paper-eject unit assigned to the timer and the paper size of the page. The paper-eject end monitoring timer is then activated.

(b) As described above, the printer control table includes an area for storing the page sequence number of a sheet most recently ejected by the paper-eject unit.

(c) In the handling of a paper-eject end monitoring timer interrupt, the page sequence number of a sheet most recently ejected by the paper-eject unit completing a paper-eject operation is updated to a new value based on data entered at the sub-step (i) of the step (a) described above. The page sequence number of a sheet most recently ejected by the paper-eject unit completing a paper-eject operation is a value stored in the printer control table at step (b).

(d) Let paper-eject units 1 to m are provided. Upon the completion of page printing or in the event of an error, the printing control apparatus sets the value −1 in each of the paper-eject end monitoring timers 1 to m as the sequence number of a page which would have normally completed the printing without a paper-eject interrupt. The value −1 is the minimum value of the page sequence number. Later on, the sequence number of a page completing printing or a retransmission resume page sequence number is set in a proper area of data to be reported by the printing control apparatus to a host computer at the upper level.

By utilizing the function for supporting a plurality of paper-eject units as described above, printing can be completed without giving rise to incorrect tracking of the sequence number of the ejected sheet of print paper and incorrect timing of the printing task even if a phenomenon of sheets of print paper ejected in a reversed order occurs.

In addition, this embodiment can also be implemented as extended functions of the embodiment of Japanese laid-open No. HEI 2-70465 and 3-178466 as shown in FIG. 50. That is, the processings in the drawing and printing-processing units are carried out in a multi-tasking environment which allows both parallel and concurrent processings. The parallel processing is pipeline processing executed by a single processor where as the concurrent processing is simultaneous processing using a plurality of processors. The following list shows elements used in the configuration of FIG. 1 which correspond to elements used in the configuration of FIG. 50. Elements on the left and right sides are those of the configurations shown in FIGS. 1 and 50 respectively.

(1) Host computer 100 versus host computer 100'

(2) Host-communication control unit 111 versus host-communication control unit 118'

(3) Command-buffer unit 112 versus command-buffer unit 11'

(4) Command processing unit 113 versus task processing unit 13'

(5) Drawing-processing unit 1131 versus drawing-task processing unit 131'

(6) Printing-processing unit 1132 versus printing-task processing unit 132'

(7) Page-buffer control unit 114 versus page-buffer control unit 116'

(8) Page-buffer unit 115 versus page-buffer unit 14'

(9) Printer-control unit 116 versus printer-control unit 117'

What is claimed is:

1. A double side printing control method of controlling a circulating printer for printing images on both sides of a sheet according to data received from a host computer connected to the printer, comprising the steps of:

receiving print data from the host computer as a series of print commands including a plurality of page portions corresponding to respective printed pages, each page portion including format data indicating a format of a sheet in the head of the page portion;

drawing first and second side images on a memory by interpreting each page portion of the received print data;

printing the first side image on the first side of the sheet according to a first side format indicated by the page portion;

detecting whether the first side format and a second side format of the second side image are acceptable as double side printing by analyzing the page portion; and recirculating the sheet and printing the second side image on the second side of the sheet when the first and second side formats are acceptable as double side printing, and printing the second side image on another sheet when the first and second side formats are not acceptable as double side printing.

2. A double side printing control method of controlling a circulating printer according to claim 1, wherein said first side is a right side, and said second side is a reverse side.

3. (twice amended) A double side printing control method of controlling a circulating printer according to claim 1, wherein said first side is a reverse side, and said second side is a right side.

4. A double side printing control method of controlling a circulating printer according to claim 1, wherein said first and second side formats of the first and second sides respectively are sizes of sheets to be printed, and the same size of the first side and the second side is acceptable as double side printing.

5. A double side printing control method of controlling a circulating printer according to claim 2, wherein said format of the reverse side which includes the specifications of a paper-supply unit is not acceptable as double side printing, and the reverse side image is printed with the specified paper-supply unit.

6. A double side printing control method of controlling a circulating printer according to claim 2, wherein said format of the reverse side which includes the specifications of a paper-eject unit is not acceptable as double side printing, and the reverse side image is printed with the specified paper-eject unit.

7. A double side printing control method of controlling a circulating printer according to claim 1, wherein said first and second side formats of the first and second sides are writing directions of sheets to be printed, and the same writing direction of the first side and the second side is acceptable as double side printing.

8. A double side printing control method of controlling a circulating printer for printing images on both sides of a sheet according to data received from a host computer connected to the printer, comprising the steps of:

receiving print data from the host computer as a series of print commands including a plurality of page portions corresponding to respective printed pages, each page portion including size data indicating a size of a sheet in the head of the page portion;

drawing first and second side images on a memory by interpreting each page portion of the received print data;

printing the first side image on the right side of the sheet, a type of which is indicated by the page portion, with a blank on a reverse side of the sheet; and printing the second side image on the right side of a second sheet, a type of which is indicated by the page portion, while recirculating the first sheet in the circulating printer.

9. A double side printing control method of controlling a circulating printer according to claim 8, wherein said first side is a right side, and said second side is a reverse side.

10. A double side printing control method of controlling a circulating printer according to claim 8, wherein said first side is a reverse side, and said second side is a right side.

11. A double side printing control method of controlling a circulating printer according to claim 8, wherein said types of sheets are writing directions of sheets.

12. A double side printing control method of controlling a circulating printer according to claim 8, wherein said types of sheets are sizes of sheets.

13. A double side printing control method of controlling a printer for printing images on both sides of a sheet according to data received from a host computer connected to the printer, comprising the steps of:

receiving print data from the host computer as a series of print commands including a plurality of page portions corresponding to respective printed pages, the print data including end data which indicates an end of double side printing for an end page;

drawing first and second side images on a memory by interpreting and executing the print data;

printing the first side image on a sheet according to the print data;

detecting whether said end data has been received; and ejecting retained sheets in the printer if sheets are retained in the printer when said end data has been detected.

14. A double side printing control method according to claim 13, wherein the second side image is printed on retained sheets in the printer before the ejecting.

15. A double side printing control method according to claim 13, wherein said first side is a right side, and said second side is a reverse side.

16. A double side printing control method according to claim 14, wherein said first side is a reverse side, and said second side is a right side.

17. A double side printing control method of controlling a printer for printing images on both sides of a sheet according to data received from a host computer connected to the printer, comprising the steps of:

receiving print data from the host computer as a series of print commands, each print command including data for indicating a number of copies to be printed on first and second sides of a printed sheets;

drawing first and second side images on a memory by interpreting and executing each of the print commands received from the host computer;

detecting from a print command whether the number of copies to be printed on the first side is different from the number of copies to be printed on the second side;

printing the indicated number of copies of the first side image to a corresponding number of the first side of a plurality of sheets;

printing a small number of blank images on the first side of a plurality of sheets if the number of copies to be printed on the second side is larger than the number of copies to be printed on the first side;

printing the indicated number of copies of the second side image by interpreting and generating an image corresponding to the print command on a corresponding number of the second side of a plurality of sheets; and printing a small number of blank images on the second side of a plurality of sheets if the number of copies to be printed on the first side is larger than the number of copies to be printed on the second side.

18. A double side printing control method according to claim 17, wherein said first side is a right side, and said second side is a reverse side.

19. A double side printing control method according to claim 17, wherein said first side is a reverse side, and said second side is a right side.

20. A printing apparatus for interpreting and executing a series of print commands received from a host computer, and printing images in accordance with the print commands with a rotation type double side printing mechanism, said printing apparatus comprising:

page buffers for storing data of a plurality of pages to be printed;

a drawing processing unit for drawing the data on the page buffers in accordance with print commands from a host computer, and requesting to start printing of the pages sequentially when each page of the data have been drawn on the page buffers;

means for detecting whether the drawn page is a first half page or a second half page;

means for starting printing of the data of the first half page if the first half page is detected by said detecting means, or setting a wait state if the second half page is detected; and means for releasing the wait state to start the second half page when a predetermined condition is detected.

21. A printing apparatus according to claim 20, wherein said predetermined condition is that the number of sheets retained in the printing mechanism has reached a predetermined maximum number.

22. A printing apparatus according to claim 20, wherein said predetermined condition is that a final page of a document has been detected by receiving a command indicating the end of a double side printing.

23. A printing apparatus according to claim 20, wherein said predetermined condition is that a change of sheet-sizes has been detected.

24. A printing apparatus according to claim 20, wherein said predetermined condition is that a change of paper supply units has been detected.

25. A printing apparatus according to claim 20, wherein said predetermined condition is that a change of paper-eject units has been detected.

26. A printer controller for controlling an image data transfer to a printer engine unit with a double side printing mechanism, comprising:

a command buffer unit for a series of print commands containing drawing commands for instructing a drawing operation and including printing operation commands for a page buffer unit for storing the image data drawn by said drawing commands;

a task process unit for executing said drawing commands and printing operation commands as a drawing task and a printing task:

a task control unit for performing a task controlling operation for processing each of said tasks in the task process unit;

a drawing-processing unit task for drawing the buffers in accordance with the print commands from a host requesting to start printing of the pages sequentially to a printing task when each page of the data have been drawn on the page buffers, and for detecting whether the drawn page is a first half page or a second half page by analyzing said print commands;

a printing processing unit for starting printing of the data of the first half page if the first half page is detected by said detecting means, or setting a wait state if the second half page is detected, and for releasing the wait state to start the second half page when a predetermined condition is detected.

27. A printer controller according to claim 26, wherein said predetermined condition is that the number of sheets retained in the printing mechanism has reached a predetermined maximum number.

28. A printer controller according to claim 26, wherein said predetermined condition is that a final page of a document has been detected by receiving a print command indicating the end of a double side printing.

29. A printer controller according to claim 26, wherein said predetermined condition is that a change of sheet-sizes has been detected.

30. A printer controller according to claim 26, wherein said predetermined condition is that a change of paper supply units has been detected.

31. A printer controller according to claim 26, wherein said predetermined condition is that a change of paper-eject units has been detected.

32. A printer controller according to claim 26, further comprising:
a task control table unit for holding task control information, wherein said task control unit performs a task controlling operation based on a content of said task control table unit.

33. A printer controller according to claim 26, further comprising:
a page buffer control table unit for holding page buffer control information; and
a printer control table unit for holding printer control information, wherein said task process unit performs a task processing operation according to contents of said page buffer control table unit and said printer control table unit.

34. A printer controller according to claim 26, wherein said page buffer unit includes a portion for a plurality of pages.

35. A printer controller according to claim 26, further comprising:
a page buffer control unit for controlling an empty condition of said page buffer unit including said plurality of page portions; and
a printer control unit for controlling an empty condition of said printer engine unit.

36. A printer controller for receiving a series of print commands from a host computer and for transmitting printing image data corresponding to said series of print commands to a printer engine unit with a double side printing mechanism, comprising:
a command buffer unit for storing a series of print commands containing drawing commands for instructing a drawing operation and including printing operation commands for instructing a printing operation, which is sent from said host computer;
a page buffer unit for storing image data of a plurality of pages which is drawn in accordance with said drawing commands;
a central processor unit for executing and controlling said drawing commands and printing operation commands as a drawing task and a printing task, wherein said central processing unit is operated in accordance with a task process program for executing said drawing commands and printing operation commands as a drawing task and a printing task, and a task control program for performing a task control of a task process in said task process program, a drawing task for drawing the data on the page buffers in accordance with said series of print commands from a host computer, requesting to start printing of the pages sequentially to a printing task when each page of the data have been drawn on the page buffers, for detecting whether the drawn page is a first half page or a second half page by analyzing said print commands, starting printing of the data of the first half page if the first page is detected by said detecting means, or setting a wait state if the second half page is detected, and releasing the wait state to start the second half page when a predetermined condition is detected.

37. A printer controller according to claim 36, wherein said predetermined condition is that the number of sheets retained in the printing mechanism has reached a predetermined maximum number.

38. A printer controller according to claim 36, wherein said predetermined condition is that a final page of a document has been detected by receiving a command indicating the end of a double side printing.

39. A printer controller according to claim 36, wherein said predetermined condition is that a change of sheet-sizes has been detected.

40. A printer controller according to claim 36, wherein said predetermined condition is that a change of paper supply units has been detected.

41. A printer controller according to claim 36, wherein said predetermined condition is that a change of paper-eject units has been detected.

42. A printer controller according to claim 36, further comprising:
a task control table for holding task control information, said task control program performing a task control in accordance with a content of said task control table.

43. A printer controller according to claim 36, wherein said central processing unit executes a page buffer control program for controlling an empty condition of said page buffer unit.

44. A printer controller according to claim 43, wherein said central processing unit executes a printer control program for controlling an empty condition of said printer engine unit.

45. A printer controller according to claim 44, further comprising:
a page buffer control table for holding page buffer control information and printer control information respectively, said page buffer control program and said printer control program being performed in accordance with said page buffer control table and said printer control table.

46. A method for printing an image data in a printing system including a printer engine unit with a double side printing mechanism and a double side printing buffer unit having a plurality of page buffers for storing the image data to be printed, a printer adapter means for outputting the image data stored in the buffer unit to the print engine unit, and a central processing unit for controlling to print the image data in response to a series or print commands including drawing commands and printing operation commands, the method comprising the step of:
creating a drawing task in response to the drawing commands;
acquiring an empty one of page buffers by said drawing task;
starting to draw the image data corresponding to said drawing task into said acquired page buffer in accordance with said print commands from a host computer; and requesting a printing task corresponding to the printing operation commands to start printing of the pages sequentially by said drawing task when detecting whether the drawn page is a first half page or a second half page;

starting printing of the data of the first half page if the first half page is detected by the above detecting step or setting a wait state if the second half page is detected; and releasing the wait state to start the second half page when a predetermined condition is detected.

47. A method for printing an image data according to claim 46, wherein said predetermined condition is that the number of sheets retained in the original mechanism has reached a predetermined maximum number.

48. A method for printing an image data according to claim 46, wherein said predetermined condition is that a final page of a document has been detected by receiving a command indicating the end of a double side printing.

49. A method for printing an image data according to claim 46, wherein said predetermined condition is that a change of sheet-sizes has been detected.

50. A method for printing an image data according to claim 46, wherein said predetermined condition is that a change of paper supply units has been detected.

51. A method for printing an image data according to claim 46, wherein said predetermined condition is that a change of paper-eject units has been detected.

52. A method for printing an image data according to claim 46, wherein said printing task has higher priority than said drawing task, said printing task initialized by said drawing task being executed under said priority.

53. A method for printing an image data according to claim 46, the method further comprising the step of:

generating a printing instruction to the printer adapter means by said printing task.

54. A method for printing an image data according to claim 53, the method further comprising the step of:

issuing a print starting command to the printer engine unit by the printer adapter means in response to said printing instruction and transferring said printing task which generates said printing instruction into a printing instruction to allow waiting conditions.

55. A method for printing an image data according to claim 54, the method further comprising the step of:

reading out the image data corresponding to said printing task stored in said one of page buffers by the printer adapter means to the printer engine unit after issuing said print starting command by the printer adapter means.

56. A method for printing an image data according to claim 55, the method further comprising the steps of:

monitoring the end of reading out the image data from one of page buffers by the adapter means; and issuing a page readout end interruption to the CPU at a time of detecting the end of reading out by the adapter means.

57. A method for printing an image data according to claim 56, the method further comprising the steps of:

releasing said page buffer by the CPU in response to said page readout end interruption; and releasing another drawing task in a page buffer empty waiting conditions, if said another drawing task exists in said page buffer empty waiting condition.

58. A method for printing an image data according to claim 57, the method further comprising the steps of:

monitoring the state of the printer engine unit by the printer adapter means: and issuing a printing instruction to allow interruption to the CPU when the printer adapter means detects that the printer engine unit becomes feasible to receive another print starting command.

59. A method for printing an image data according to claim 58, the method further comprising the step of:

releasing said printing task from said printing instruction allow waiting condition in response to said printing instruction allow interruption by the printer adapter means.

60. A method for printing an image data according to claim 59, the method further comprising the step of:

issuing another printing instruction by said print task which is released from said printing instruction allow waiting condition, when there is another page to be printed by said print task.

61. A method for printing an image data according to claim 60, the method further comprising the step of:

transferring said printing task into a sheet outputting end waiting condition, when a total number of pages to be printed is printed by said print task.

62. A method for printing an image data according to claim 61, the method further comprising the step of:

issuing a sheet outputting end interruption by the printer adapter means to the CPU, when the printer adapter means detects a sheet outputting end; and releasing said printing task from said sheet outputting end waiting condition.

63. A method for printing an image data according to claim 62, the method further comprising the step of:

updating a page number of said sheet outputting end.

64. A method for printing an image data according to claim 63, the method further comprising the steps of:

ending the process of said printing task which is released from said sheet outputting end waiting condition.

65. A method for printing an image data in a printing system including a printer engine unit with a double side printing mechanism, a buffer unit having a plurality of page buffers for storing the image data to be printed, a printer adapter means for outputting the image data stored in the buffer unit to the printer engine unit, and a CPU for controlling to print the image data in response to a series of print commands and including drawing commands and printing operation commands the method comprising the steps of:

creating a drawing task in response to the drawing commands starting to draw the image data of one page corresponding to said drawing task into one of said page buffers in response to a page read out interruption from the adapter means;

initializing a printing task corresponding to the printing operation command by said drawing task sequentially after said drawing task executes the drawing of the image data in said one of said page buffers;

detecting whether the drawn page is a first half page or a second half page by analyzing said print commands;

starting printing of the data of the first half page if the first half page is detected by said detecting means, or setting a wait state if the second half page is detected;

releasing the wait state to start the second half page when a predetermined condition is detected;

issuing a print starting command to the printer engine unit by the printer adapter means in response to said printing instruction transferring said printing task which generates said printing instruction into a printing instruction to allow waiting conditions; and releasing said printing task from a printing instruction to allow waiting condition in response to a printing instruction to allow interruption by the printer adapter means when the printer adapter means detects that the printer engine unit becomes feasible to receive another print starting command.

66. A method for printing an image data in a printing system including a printer engine unit with a double side printing mechanism according to claim 65, wherein said predetermined condition is that the number of sheets retained in the printing mechanism has reached a predetermined maximum number.

67. A method for printing an image data in a printing system including a printer engine unit with a double side printing mechanism according to claim 65, wherein said predetermined condition is that a final page of a document has been detected by receiving a command indicating the end of a double side printing.

68. A method for printer an image data in a printing system including a printer unit with a double side printing mechanism according to claim 65, wherein said predetermined condition is that a change of sheet-sizes has been detected.

69. A method for printing an image data in a printing system including a printer engine unit with a double side printing mechanism according to claim 65, wherein said predetermined condition is that a change of paper supply units has been detected.

70. A method for printing an image data in a printing system including a printer engine unit with a double side printing mechanism according to claim 65, therein said predetermined condition is that a change of paper-eject units has been detected.

71. A printer controller for controlling an image data transfer to a printer engine unit with a double side printing mechanism to print an image corresponding to the image data, comprising:

a command buffer unit for storing a series of print commands including a plurality of drawing commands for instructing a drawing operation and printing operation commands for instructing a printing operation;

a page buffer unit for storing the image data drawn by said drawing commands, said page buffer unit including a plurality of page buffers, a printer adapter means for outputting the image data stored in said page buffer unit to the printer engine unit; and a central processing unit including controlling means for controlling to process said drawing operation and said printing operation as a drawing task and a printing task, page buffer control means for controlling a use state of each of said page buffers, and printer control means for controlling a use state of the printer engine unit and an input/output control of the printer engine unit, wherein: said drawing task includes a means for initializing said printing ask corresponding to one of said page buffers after drawing the image data of one page in said one of said page buffers, and a means for drawing of the image data of a next page after acquiring another of said page buffers for the image data of said next page for detecting whether the drawn page is a first half page or a second half page by analyzing said print commands;

said printing task includes a means for starting printing of the data of the first half page if the first half page is detected by said detecting means, or setting a wait state if the second half page is detected; and a means for releasing the wait state to start the second half page when a predetermined condition is detected, said page buffer control means includes an acquiring means for acquiring an empty one of said page buffers, and a setting means for setting said drawing task to a wait state for waiting an empty one of said buffers when none of said page buffers can be acquired by said acquiring means; and said printing task includes a means for issuing a printing instruction to said printer control means for instructing said printer control means to print the image data drawn in said one of said page buffers.

72. A printer controller according to claim 71, wherein said predetermined condition is that the number of sheets retained in the printing mechanism has reached a predetermined maximum number.

73. A printer controller according to claim 71, wherein said predetermined condition is that a final page of a document has been detected by receiving a command indicating the end of a double-side printing.

74. A printer controller according to claim 71, wherein said predetermined condition is that a change of sheet-sizes has been detected.

75. A printer controller according to claim 71, wherein said predetermined condition is that a change of paper supply units has been detected.

76. A printer controller according to claim 71, wherein:

said printer control means includes a means for ordering said printer adapter means to issue a print starting command to the printer engine unit, and a means for transferring said printing task to a printing instruction to allow a waiting condition.

77. A printer controller according to claim 76, wherein:

said printer adapter means includes a means for issuing said print starting command to the printer engine unit and a means for outputting the image data drawn in said one of said page buffers to the printer engine unit after the issue of said print starting command by said issuing means.

78. A printer controller according to claim 77, wherein:

said printer adapter means further includes a means for monitoring the state of the printer engine unit and a means for issuing a printing instruction to allow interruption of said CPU at a time of detecting a printing instruction allow condition of the printer engine unit.

79. A printer controller according to claim 78, wherein:

said printer instruction allow interruption issuing means includes a means for detecting said printing instruction allow condition of the print engine unit with a timer for counting a predetermined time after issuing said print starting command.

80. A printer controller according to claim 78, wherein:

said printer instruction allow interruption issuing means includes a-means for detecting said printing instruction allow condition of the print engine unit with receiving a printing instruction allow signal provided from the printer engine unit.

81. A printer controller according to claim 78, wherein:

said printer adapter means further includes means for sending a page buffer reading end interruption to said CPU after reading out the image data from said one of said page buffers in response to said printing instruction issued by said printing task.

82. A printing controller according to claim 81, wherein:
said page buffer control means includes a means for setting said page buffer, the image data of which is read out, into an empty state in response to said page buffer reading end interruption and a means for releasing another drawing task from a page buffer empty waiting condition when there exists said another drawing task which is in said buffer empty waiting condition.

83. A printer controller according to claim 82, wherein:
said controlling means includes a means for releasing said printing task in said printer instruction allow waiting condition in response to said printer instruction allow interruption.

84. A printer controller according to claim 83, wherein:
said printing task which is released from said printing instruction allow waiting condition reissues another printing instruction, when there is another page to be printed by said print task.

85. A printer controller according to claim 83, wherein;
said printing task which is released from said printing instruction allow waiting condition is transferred to a sheet outputting end waiting condition.

86. A printer controller according to claim 85, wherein:
said printer adapter means includes a means for issuing a sheet outputting end interruption to said CPU, when said printer adapter means detects a sheet outputting end.

87. A printer controller according to claim 86, wherein:
said controlling means releases said printing task from said sheet outputting end waiting condition in response to said sheet outputting end interruption.

88. A printer controller according to claim 87, wherein:
said controlling means updates a page number of said sheet-outputting end.

89. A printer controller according to claim 88, wherein:
said printing task which is released from said sheet outputting end waiting condition finishes the process thereof.

90. A printer controller for controlling an image data transfer to a printer engine unit with a double side printing mechanism, comprising:
a print data detect means for detecting print data to each first and second side of a sheet to be printed;
a manage means for managing an ejected page number as a serial number, counting ejected page numbers when each page is printed and ejected from the printing apparatus and updating the ejected page number when the printer printing both sides of the sheet have been printed if the detected means detecting print data on both sides of the sheet;
the manage means updating the ejected page number updating when the first side of the sheet has been printed if the detect means print data only the first side of the sheet.

91. A printer controller according to claim 90, wherein:
the printer engine reprinting from error page is done using the print data stored in the host computer or the printer and the error page is decided on the basis of the ejected page number.

92. A controller for controlling an image data transfer to a printer engine unit with a rotation type double sided printing mechanism for printing an image corresponding to the image data, comprising:

a command buffer unit for storing a series of print commands including a plurality of drawing commands for instructing a drawing operation and printing operation commands for instructing a printing operation;
a page buffer unit for storing the image data drawn by said drawing commands, said page buffer unit including a plurality of page buffers,
a printer adapter means for outputting the image data stored in said page buffer unit to the printer engine unit; and
a central processing unit including controlling means for controlling to process said drawing operation and said printing operation as a drawing task and a printing task, page buffer control means for controlling a use state of each of said page buffers, and printer control means for controlling a use state of the printer engine unit and an input/output control of the printer engine unit, wherein:
said drawing task includes a means for initializing said printing task corresponding to one of said page buffers after drawing the image data of one page in said one of said page buffers, and means for drawing of the image data of a next page after acquiring another of said page buffers for the image data of said next page for detecting whether the drawn page is a first half page or a second half page by analyzing said print commands;
said printing task includes means for starting printing of the data of the first half page if the first half page is detected by said detecting means, or setting a wait state if the second half page is detected; and
means for releasing the wait state to start the second half page when a predetermined condition is detected,
said page buffer control means includes an acquiring means for acquiring an empty one of said page buffers, and a setting means for setting said drawing task to a wait state for waiting an empty one of said buffers when none of said page buffers can be acquired by said acquiring means; and
said printing task includes means for issuing a printing instruction to said printer control means for instructing said printer control means to print the image data drawn in said one of said page buffers.

93. A printer controller according to claim 92, wherein said predetermined condition is that the number of sheets retained in the printing mechanism has reached a predetermined maximum number.

94. A printer controller according to claim 92, wherein said predetermined condition is that a final page of a document has been detected by receiving a command indicating the end of a double-side printing.

95. A printer controller according to claim 92, wherein said predetermined condition is that a change of sheet-sizes has been detected.

96. A printer controller according to claim 92, wherein said predetermined condition is that a change of paper supply units has been detected.

97. A printer controller according to claim 92, wherein:
said printer control means includes a means for ordering said printer adapter means to issue a print starting command to the printer engine unit, and a means for transferring said printing task to a printing instruction to allow a waiting condition.

98. A printer controller according to claim 97, wherein:
said printer adapter means includes a means for issuing said print starting command to the printer engine unit and a means for outputting the image data drawn in said one of said page buffers to the printer engine unit after the issue of said print starting command by said issuing means.

99. A printer controller according to claim 97, wherein:
said printer adapter means further includes a means for monitoring the state of the printer engine unit and a means for issuing a printing instruction to allow interruption of said CPU at a time of detecting a printing instruction allow condition of the printer engine unit.

100. A printer controller according to claim 99, wherein:
said printer instruction allow interruption issuing means includes a means for detecting said printing instruction allow condition of the print engine unit with a timer for counting a predetermined time after issuing said print starting command.

101. A printer controller according to claim 99, wherein:
said printer instruction allow interruption issuing means includes a means for detecting said printing instruction allow condition of the print engine unit with receiving a printing instruction allow signal provided from the printer engine unit.

102. A printer controller according to claim 99, wherein:
said printer adapter means further includes means for sending a page buffer reading end interruption to said CPU after reading out the image data from said one of said page buffers in response to said printing instruction issued by said printing task.

103. A printing controller according to claim 102, wherein:
said page buffer control means includes a means for setting said page buffer, the image data of which is read out, into an empty state in response to said page buffer reading end interruption and a means for releasing another drawing task from a page buffer empty waiting condition when there exists said another drawing task which is in said buffer empty waiting condition.

104. A printer controller according to claim 103, wherein:
said controlling means includes a means for releasing said printing task in said printer instruction allow waiting condition in response to said printer instruction allow interruption.

105. A printer controller according to claim 104, wherein:
said printing task which is released from said printing instruction allow waiting condition reissues another printing instruction, when there is another page to be printed by said print task.

106. A printer controller according to claim 104, wherein:
said printing task which is released from said printing instruction allow waiting condition is transferred to a sheet outputting end waiting condition.

107. A printer controller according to claim 106, wherein:
said printer adapter means includes a means for issuing a sheet outputting end interruption to said CPU, when said printer adapter means detects a sheet outputting end.

108. A printer controller according to claim 107, wherein:
said controlling means releases said printing task from said sheet outputting end waiting condition in response to said sheet outputting end interruption.

109. A printer controller according to claim 108, wherein:
said controlling means updates a page number of said sheet outputting end.

110. A printer controller according to claim 109, wherein:
said printing task which is released from said sheet outputting end waiting condition finishes the process thereof.

111. A printing apparatus executing a series of print command transferred from a host computer and printing images in accordance with the print commands, said printing apparatus comprising:
page buffers, each storing data of plurality of page to be printed in accordance with print commands transferred from a host computer;
a drawing processing unit for making images in accordance with the data on the page buffers, and outputting the images; and
a rotation type double side printing mechanism for printing on the basis of said images outputted from the drawing processing unit, said rotation type double side printing mechanism comprising:
a printer printing on a half page of a supplied paper;
first paper-supply path supplying paper to the printer and printing a half page on the paper;
a rotator turning over an inserted paper by rotating the inserted paper;
a first paper-eject path ejecting a paper from said printer and discharging the paper from said rotation type double side printing mechanism;
a second paper-eject path ejecting a paper from said printer and supplying the paper to said rotator when printing on a second half page on the paper is requested after printing on a first half of the paper is finished; and
a second paper-supply path supplying a paper to printer which is supply from said rotator.

* * * * *